United States Patent
Enomoto et al.

(10) Patent No.: US 7,468,945 B2
(45) Date of Patent: Dec. 23, 2008

(54) CONGESTION CONTROL FOR COMMUNICATION

(75) Inventors: Nobuyuki Enomoto, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 1130 days.

(21) Appl. No.: 10/272,943

(22) Filed: Oct. 18, 2002

(65) Prior Publication Data

US 2003/0076781 A1    Apr. 24, 2003

(30) Foreign Application Priority Data

Oct. 18, 2001    (JP)    ............................. 2001-320723

(51) Int. Cl.
*H04L 1/00* (2006.01)
*H04L 12/26* (2006.01)
*H04L 12/28* (2006.01)
*H04L 12/56* (2006.01)

(52) U.S. Cl. .................... 370/231; 370/230.1; 370/237; 370/404

(58) Field of Classification Search ......... 370/229–231, 370/235–237, 404
See application file for complete search history.

(56) References Cited

U.S. PATENT DOCUMENTS

| | | | |
|---|---|---|---|
| 6,215,765 B1 * | 4/2001 | McAllister et al. | 370/217 |
| 6,977,899 B1 * | 12/2005 | Matragi et al. | 370/237 |
| 7,158,480 B1 * | 1/2007 | Firoiu et al. | 370/235 |
| 2005/0002392 A1 * | 1/2005 | Vijeh et al. | 370/389 |

FOREIGN PATENT DOCUMENTS

| | | |
|---|---|---|
| EP | 1 056 244 A2 | 11/2000 |
| JP | 6-311172 A | 11/1994 |
| JP | 7-250088 A | 9/1995 |
| JP | 7-303117 A | 11/1995 |
| JP | 7-327035 A | 12/1995 |

(Continued)

OTHER PUBLICATIONS

Mayer A. et al. : "Approximating max-min fair rates via distributed local scheduling with partial information" Proceedings of IEEE Infocom 1996. Conference on Computer Communications. Fifteenth Annual Joint Conference of the IEEE Computer and Communications Societies. Networking the Next Generation. San Francisco, Mar. 24-28, 1996, Proceedings of Infocom, L, vol. vol. 2 Conf. 15, Mar. 24, 1996, pp. 928-936, XP010158159.

(Continued)

*Primary Examiner*—Ronald Abelson
(74) *Attorney, Agent, or Firm*—Sughrue Mion, PLLC

(57) ABSTRACT

In a congestion control system for congestion controlling communications on a network, a congestion control node has a congestion detection part for detecting a congestion level of the communications in the congestion control node in question and a congestion notifying part for notifying other congestion control nodes on the network of congestion information detected by the congestion detection part. The congestion control node further has a part for receiving the congestion information from the other congestion control nodes and a congestion flow estimating part for estimating, with reference to the congestion information and a routing table for designating a transfer path to destination, a flow having the congestion level that is not less than a predetermined level in the transfer path to the destination.

46 Claims, 22 Drawing Sheets

FOREIGN PATENT DOCUMENTS

| | | |
|---|---|---|
| JP | 11-261643 A | 9/1999 |
| JP | 11-298530 A | 10/1999 |
| JP | 2000-49802 A | 2/2000 |
| JP | 2000-209268 A | 7/2000 |
| JP | 2000-278305 A | 10/2000 |

OTHER PUBLICATIONS

Chandra P. et al.: "Experimental evaluation of ATM congestion control mechanisms" Infocom 97. Sixteenth Annual Joint Conference of the IEEE Computer and Communications Societies. Driving the Information Revolution., Proceedings IEEE Kobe, Japan Apr. 7-11, 1997, Los Alamitos, CA, USA, IEEE Comput. Soc, US, vol. 3, Apr. 7, 1997, pp. 1324-1332, XP010251956.

Douligeris C. et al.: "Fairness issues in the networking environment" Computer Communications, Elsevier Science Publishers BV, Amsterdam, NL vol. 18, No. 4, Apr. 1995, pp. 288-299, XP004032492.

Chen J. S-C et al.: "A Local Fairness Algorithm for Giagabit Lan's/Man's With Spatial Reuse" IEEE Journal on Selected Area in Communications, IEEE Service Center, Piscataway, NJ, US, vol. 11, No. 8, Oct. 1, 1993, pp. 1183-1192, XP000491814.

Albert Herrera Lantern Communications Russ White Cisco Systems Pankaj K JHA Cypress Semiconductor Raj SH: "A Framework for IP over Resilient Packet Rings" IETF Standard-Working-Draft, Internet Engineering Task Force, IETF, CH, vol. iporpr, No. 1, Jun. 2001, pp. 1-17, XP015020472.

"Dynamic Packet Transport Technology and Applications Overview" Internet Citation, [Online] Feb. 1999, XP002143361.

D. Tsiang et al., "The Cisco SRP MAC Layer Protocol", Network Working Group Request for Comments: 2892, Cisco System, Aug. 2000, pp. 1,9 and 28-32.

"The ATM Forum Technical Committee Traffic Management Specification Version 4.0", af-tm-0056.000, Apr. 1996, pp. 38-48.

"Dynamic Packet Transport Technology and Performance", Cisco System, Inc. (2000), pp. 1-7.

\* cited by examiner

CONGESTION CONTROL FOR COMMUNICATION

BACKGROUND OF THE INVENTION

This invention relates to a congestion control for communications and, more particularly, to a congestion control system, a congestion control node, and a congestion control program for controlling congestion of communications in a ring-shaped network.

In prior art, a congestion control system of the type described carries out a congestion control in a network having ring-shaped topology and is used to avoid congestion of a ring band.

Various congestion control systems of the type are already known. By way of example, a congestion control system is described by D. Tsiang & G. Suwala in a standardized document published from IETF, Request for Comments: 2892, Cisco Systems, August 2000, pages 9 and 28-32 under the title of "The Cisco SRP MAC Layer Protocol." In the congestion control system described in this standardized document, each congestion control node comprises a single transmission queue. When a congestion is detected in a transfer/transit buffer, the congestion control node restricts or limits a frame output amount of frames from a transmission queue of an upstream node so as to be equal to a frame output amount from a transmission queue of the congestion detected node. As a result, it is possible to control the congestion. In addition, each congestion control node compares an output amount of the transit buffer with an output amount of each transmission queue to determine whether or not transfer of congestion notification should be carried out. This standardized document is herein called a first prior art.

However, the first prior art is disadvantageous in that an amount of transmission frames is restricted or limited on a flow which is not related to congestion and utility efficiency of a link is degraded. This is because only one transmission queue is prepared and granularity of control is rough. Although the granularity of control is made fine, it is difficult to identify the flows which become restriction candidate in the congestion detection node because of a large processing load. In addition, the first prior art is disadvantageous in that there is a case where the congestion notification is transferred to a node which is not related to congestion. This is because each node compares the flow from the transit buffer with the flow from the transmission buffer and continues to transfer the congestion notification as far as the flow from the transit buffer is lower than the flow from the transmission buffer.

Another congestion control system is described in a standardized document of af-tm-0056.000, April 1996, pages 38-48 under the title of "The ATM Forum Technical Committee Traffic Management Specification Version 4.0." In this standardized document, a congestion control notification is transmitted for each flow for the sake of unbiased congestion control. This standardized document is herein called a second prior art.

However, the second prior art is disadvantageous in that there is some possibility that the amount of the transmission frames in the node for the congestion control is restricted or limited so as to be too small more than necessary when the amount of the transmission frames of the congestion detection node is small. This is because an amount of transmittable frames is determined by the amount of the transmission frames in the congestion detection node. In addition, the second prior art is disadvantageous in that an amount of control frames explosively increases when the number of the flows increases. If congestion occurs in a link where a plurality of flows flow, it is necessary to send the congestion notification to all of nodes which flow the flows related to the congestion. When links are connected in a multi-stage fashion, a mass of flows flow in each link. Accordingly, if the congestion notification is sent in flow, a link band is used in vain and it resulted in a waste of CPU of the node or other resources.

Still another congestion control system is disclosed in a specification by Cisco Systems, Inc. 2000, which has a title of "Dynamic Packet Transport Technology and Performance." In this specification, the congestion control system is applied each ring independently, when two or more rings are mutually connected. It is possible to transfer frames which are laid across the two or more rings. This specification is herein called a third prior art.

However, the third prior art is disadvantageous in that there is a case where the congestion notification is not transferred before the congestion notification arrives at a node related to congestion. This is because each node compares the flows from the transit buffer with the flows from the transmission buffer and stops transfer of the congestion notification when the flows from the transit buffer is less than the flows from the transmission buffer. In the third prior art, on mutually connecting the two or more rings, a frame loss occurs in a node connecting the two rings when a destination ring is congested than a sender ring. As a result, the third prior art is disadvantageous in that there is some possibility that stripped useless frames flow in the sender ring after all. This is because the congestion control is carried out each ring independently and a flow passing through the two or more rings is handled without distinction of a flow settling within a single ring.

Various related arts are already known. For example, Japanese Unexamined Patent Publication of Tokkai No. Hei 7-303,114 or JP-A 7-303114 proposes a packet communication system which minimizes abort of a packet due to congestion by distributing a load depending on a congestion state of a plurality of lines between communication apparatuses. According to JP-A 7-303114, counters are used to discriminate a congestion state of a packet section based on the number of packets stored in buffer memories and informs congestion notice control sections of a packet transmission section of the occurrence of congestion when congestion occurs. The packet transmission section writes congestion information to a congestion notice area of a transmission packet and makes a request of load distribution to an opposite party when a load is not concentrated in a specific line. Furthermore, an opposite equipment state management section of a packet reception section detects congestion information written in a packet from the opposite party, sends a packet to other line of the same destination to avoid the congestion thereby distributing the packet depending on the congestion state of the destination. However, when all lines to the same destination are in congestion, the opposite equipment state management section stops tentatively the transmission of a packet.

However, JP-A 7-303114 merely discloses a technical idea for minimizing about of the packet due to congestion by distributing a load depending on the congestion state of the plurality of lines between the communication apparatuses.

Japanese Unexamined Patent Publication of Tokkai No.2000-278,305 or JP-A 2000-278305 proposes "FAULT EVADING METHOD FOR ROUTER AND ROUTER NODE" which is capable of evading a faulty node by declaring the soundness of the faulty node which is disconnected, and validating an internal routing table of the faulty node and implementing the function of the faulty node instead. According to JP-A 2000-278305, a ring-shaped duplex system comprises first through fourth nodes A, B, C, and D. The first node A has a first routing table and processing process (a) therefor and second and fourth routing tables and processing processes (b) and (d) for the second and the fourth nodes B and D adjacent to the first node A. The second node B has the second routing table and processing process (b) therefor and the first and third routing table and processing processes (a) and (c) for the first and the third nodes A and C adjacent to the second node B. The third node C has the third routing table and processing process (c) therefor and the second and the fourth routing tables and processing processes (b) and (d) for the second and the fourth node B and d adjacent to the third node C. The fourth node D has the fourth routing table and processing process (d) therefor and the first and the third routing tables and processing processes (a) and (c) for the first and the third nodes A and C adjacent to the fourth node D. If a fault occurs, the second node B is disconnected form a loop network and a network excluding the second node B is reconstituted. At the first and the second nodes A and B at both the ends of the faulty node B, the second routing table of the second node B and its processing process (b) are validated in addition to the first and the third processing processes (a) and (c). Consequently, the second processing process (b) present at the first node A behaves the first processing process (a) and the second processing process (b) present at the third node C behaves for the third processing process (c) as if the second node B were in normal operation. Therefore the first and the second nodes A and B carry out the routing process of a network layer that the second node B originally should perform.

However, JP-A 2000-278305 merely discloses a technical idea for evading the faulty node by carrying out change of topology in only a data link layer without awareness of a higher network layer.

Japanese Unexamined Patent Publication of Tokkai No. Hei 6-311,172 or JP-A 6-311172 proposes an access controller which is capable of keeping the fairness of an access by receiving transmission interval information of the node from downstream at the time of the congestion of a transmission line, saving the transmission of its own node at the time of judging that its own node to transmit more than normal and working directly upon an adjacent node without lowering transmission efficiency. According to JP-A 6-311172, when normal data sending is generated from an access controller to a first transmission line, the free state of a cell on a second transmission line is checked from a free state display part on a cell header and if the cell is free, it is sent by mounting data. On the other hand, a transmission interval measuring part always measures an interval of sending the cell, successively calculates it as a transmission interval average value and holds a latest transmission interval average value. A transmission monitoring part monitors a transmission queue and sends the latest transmission interval average value data to an informing part when the number of transmission waiting cells reaches a threshold value. The informing part informs the pieces of data to an upstream node. A comparing part compares an average transmission interval time with the average transmission time of its own node and at the time of sending at short intervals, a control part is controlled to transmit at fixed intervals.

However, JP-A 6-311172 merely discloses a technical idea for keeping the fairness of the access by directly making approaches to adjacent nodes without degradation of transmission efficiency.

Japanese Unexamined Patent Publication of Tokkai No. Hei 7-250,088 or JP-A 7-250088 proposes a virtual path capacity management system which is capable of reducing a ratio occupied by invalid cells without receiving the report of a capacity from a user and of accurately controlling a virtual path (VP) capacity by providing a VP capacity management device inside a network. According to JP-A 7-250088, a reset signal monitoring part monitors cells to which reset signals are mounted, measures the length of the generation interval of the reset signals and sends the length of the generation interval to an ATM cell generation control part. In the ATM cell generation control part, a threshold value set beforehand is compared with the generation interval, instructions for increasing the capacity of the VP when the length of the generation interval exceeds an upper limit value and decreasing the capacity when the length of the generation interval falls below a lower limit value are sent to an ATM cell generation part and the generation amount of the cells is controlled. In the ATM cell generation part, the cells are generated, information to be transmitted is received from an ATM cell terminating part and mounted to the cells and the cells are sent out through an interface part to an access multiplex device which is a downstream node.

However, JP-A 7-250088 merely discloses a technical idea for automatically setting the virtual path (VP) capacity without the report from the user.

Japanese Unexamined Patent Publication of Tokkai No. Hei 7-327,035 or JP-A 7-327035 proposes an access controller for ring type ATM node which implements impartial and efficient transfer by providing an idle band information extract means, a transmission band limit means and an idle band information insert means in the controller to change the access band of the ring-shaped ATM network depending on a data quantity to be sent. According to JP-A 7-327035, an idle band information extract section informs an access control section of idle band information circulating on a relay transmission line without interruption. When a band operating rate in an allocated band is very small by a transmission band control section, an access section decides a new small transmission band based on the band operating rate and it is reported to the transmission band control section to reduce the transmission band and the reduced band is reporter to an idle band insert section as idle band information and inserted into a relay transmission line. When a and operating rate is very high, the access control section increases the transmission band and informs the transmission band control section of it and the idle band information is reduced by the increased band and it is reported to the idle band insert section, which inserts the band to the relay transmission line.

However, JP-A 7-327035 merely discloses a technical idea for implementing impartial and efficient transfer by dynamically changing the access band of the ring-shaped ATM network depending on the date quantity to be sent.

SUMMARY OF THE INVENTION

It is a first object of this invention to provide a congestion control system which is capable of restricting or limiting an amount of transmission frames of only flows affecting congestion by estimating the flows effecting the congestion using a ring characteristic.

It is a second object of this invention to provide a congestion control system which generates the optimum congestion control command in consideration of both of an amount of transmission frames and an amount of transfer frames and in which drastic degradation of a rate is not occurred.

It is a third object of this invention to provide a congestion control system which is capable of fairly and quickly canceling congestion by certainly transferring a congestion notification to all of nodes which might affect the congestion.

It is a fourth object of this invention to provide a congestion control system where a control frame does not waste a ring band by breaking off transfer of a congestion notification in no expectation of any effect using a ring characteristic in a node on the way.

It is a fifth object of this invention to provide a congestion control system where the times of the sending of congestion notifications do not increase although flows increase (independent on the number of the flows) by sending the congestion notification each congestion control node and by estimating the flows effecting the congestion using a ring characteristic in a node receiving the congestion notification.

It is a sixth object of this invention to provide a congestion control system which is capable of restricting or limiting stripped useless frames suffering restriction in a node between a transmission node and a reception node before flowing them in a ring by transmitting congestion occurred in an arbitrary ring to another arbitrary ring when two or more rings are connected and by carrying out restriction of a sending amount of frames at the transmission node or a connection node adjacent to the transmission node.

Other candidates of this invention will become clear as the description proceeds.

According to a first aspect of this invention, a congestion control system congestion controls communications on a network. The congestion control system comprises a plurality of congestion control nodes on the network. Each of the congestion control nodes carries out congestion control of communication data for transmitting or repeating. Each of the congestion control nodes comprises a routing table for designating a transfer path for destination and a congestion detection arrangement for detecting a congestion level of communications in the congestion control node in question to produce detected congestion information. Connected to the congestion detection arrangement, a congestion notifying arrangement notifies other congestion control nodes of the detected congestion information. Each of the congestion control nodes further comprises a congestion receiving arrangement for receiving congestion information from the other congestion control nodes to produce received congestion information. Connected to the congestion receiving arrangement and the routing table, a congestion flow estimation arrangement estimates, with reference to the received congestion information and the routing table, as an estimated flow, a flow having the congestion level which is not less than a predetermined level in the transfer path for the destination. The congestion flow estimation arrangement produces an estimated result indicative of the estimated flow.

In a congestion control system according to a second aspect of this invention, each of the congestion control nodes further comprises a determining arrangement, connected to the congestion flow estimation arrangement, for determining the estimated flow as a restriction candidate flow for restricting a transmission amount. Connected to the determining arrangement, an output adjusting arrangement carries out restriction of the transmission amount for data in the restriction candidate flow in question each restriction candidate flow.

In a congestion control system according to a third aspect of this invention, each of the congestion control nodes further comprises a classification processing arrangement for classifying flows on the network into restriction candidate flows for restricting a transmission amount and non-restriction candidate flows for doing not restrict the transmission amount. Connected to the classification processing arrangement, a flow number measuring arrangement measures the number of the restriction candidate flows and of the non-restriction candidate flows to produce a measured result. Connected to the flow number measuring arrangement, a weighting determining arrangement determines a weighting of restriction in the transmission amount for the restriction candidate flows on the basis of the measured result to produce a weighted result. Connected to the congestion flow estimation arrangement and the weighting determining arrangement, an output adjusting arrangement restricts the transmission amount for each of the restriction candidate flows on the basis of the estimated result and the weighted result.

In a congestion control system according to a fourth aspect of this invention, each of the congestion control nodes further comprises a classification processing arrangement for classifying flows on the network to relate to queues. Connected to the classification processing arrangement, a flow number measuring arrangement measures the number of the flows passing through the queues for each of the queues to produce a measured result. Connected to the flow number measuring arrangement, a weighting determining arrangement determines, on the basis of the measured result, a weighting of restriction in the transmission amount for the flows passing through the queues for each of the queues to produce a weighted result. Connected to the congestion flow estimation arrangement and the weighting determining arrangement, an output adjusting arrangement restricts, on the basis of the estimated result and the weighted result, the transmission amount for each of the queues.

In a congestion control system according to a fifth aspect of this invention, each of the congestion control nodes further comprises a transfer/transit buffer for use in transfer of the communication data between adjacent nodes on the network. The congestion detection arrangement carries out processing for detecting the congestion level of the communications on the basis of a used amount of the transit buffer.

In a congestion control system according to a sixth aspect of this invention, each of the congestion control nodes further comprises a transmission buffer for holding communication data until a transmission possible time instant. Connected to the transmission buffer, an output measuring arrangement measures an amount of the transmission data produced by the transmission buffer. The output measuring arrangement produces a buffer output measured amount. The congestion notifying arrangement comprises a command generating arrangement, connected to the transit buffer and the output measuring arrangement, for generating, on the basis of the used amount of the transit buffer, a data amount produced by the transit buffer, and the buffer output measured amount, a control command for instructing restriction of communications for other congestion control nodes on the network. Connected to the command generating arrangement, a command transmitting arrangement transmits the control command to the other congestion control nodes on the network with the control command added to the congestion information. Each of the congestion control nodes further comprises a command receiving arrangement for receiving, from the other congestion control nodes on the network, the congestion information to which the control command is added. The command receiving arrangement produces a received control command. Connected to the command receiving arrangement, a command execution arrangement executes the received control command.

In a congestion control system according to a seventh aspect of this invention, each of the congestion control nodes further comprises a failure detection arrangement for detecting a failure where communications cannot make on the network to produce section information indicative a section on the network where the failure is occurred. Connected to the failure detection arrangement, a failure notifying arrangement notifies the other congestion control nodes on the network of a failure notification as the section information.

In a congestion control system according to an eighth aspect of this invention, each of said congestion control nodes further comprises a failure receiving arrangement for receiving the failure notification from other congestion control nodes on the network to produce a received failure notification. Connected to the failure receiving arrangement, a failure processing arrangement changes the routing table on the basis of the received failure notification to make the section where the failure is detected in the network avoid from the transfer path.

In a congestion control system according to a ninth aspect of this invention, each of the congestion control nodes further comprises an arrangement for canceling transfer of the failure notification for a particular congestion control node transferred on the network when the failure occurs in the transfer path to the particular congestion control node.

In a congestion control system according to a tenth aspect of this invention, the congestion flow estimation arrangement makes the estimated flow communication between the congestion control nodes on the network.

In a congestion control system according an eleventh aspect of this invention, the congestion flow estimation arrangement makes the estimated flow include communication between each of the congestion control nodes on the network and a client connected to the congestion control node in question.

In a congestion control system according to a twelfth aspect of this invention, the congestion control system controls the congestion of the communication data for each packet.

In a congestion control system according to a thirteenth aspect of this invention, the congestion control system controls the congestion of the communication data for each frame for transferring a packet using a lower layer.

In a congestion control system according to a fourteenth aspect of this invention, the network is a ring-shaped network.

In a congestion control system according to a fifteenth aspect of this invention, the network is a network where a plurality of ring-shaped networks are mutually connected to one another.

In a congestion control system according to a sixteenth aspect of this invention, the network comprises an arrangement for repeating communications between the plurality of ring-shaped networks.

In a congestion control system according to a seventeenth aspect of this invention, each of the congestion control units further comprises a ring identifying arrangement for identifying an input source ring where the flow is inputted. The ring identifying arrangement produces an identified result. The congestion flow estimation arrangement carries out estimation processing for the flow on the basis of the identified result, the congestion information, and the routing table for designating the transfer path to the destination.

According to a first aspect of this invention, a congestion control node carries out congestion control for communications on a network. The congestion control node comprises a receiving arrangement for receiving, from another node on the network, congestion information of the communication generated from the other node and a routing table for designating a transfer path for communication data to a destination. Connected to the receiving arrangement and the routing table, a congestion flow estimation arrangement estimates, with reference to the congestion information and the routing table, as an estimated flow, a flow having a congestion level which is not less than a predetermined level in a node of the transfer path to the destination to produce an estimated result.

In a congestion control node according to a second aspect of this invention, the congestion control node further comprises a determining arrangement, connected to the congestion flow estimation arrangement, for determining the estimated flow as a restriction candidate flow for restricting a transmission amount. Connected to the determining arrangement, an output adjusting arrangement carries out restriction of the transmission amount for data in the restriction candidate flow.

In a congestion control node according to a third aspect of this invention, the congestion control node further comprises a classification processing arrangement for classifying flows on the network into restriction candidate flows where a transmission amount is restricted and non-restriction candidate flows where the transmission amount is not restricted. Connected to the classification processing arrangement, a flow number measuring arrangement measures the number of the restriction candidate flows and of the non-restriction candidate flows. The flow number measuring arrangement produces a measured result. Connected do the flow number measuring arrangement, a weighting determining arrangement determines a weighting of restriction in the transmission amount for the restriction candidate flows on the basis of the measured result. The weighting determining arrangement produces a weighted result. Connected to the weighting determining arrangement and the congestion flow estimation arrangement, an output adjusting arrangement restricts the transmission amount on the basis of the estimated result and the weighted result for each of the restriction candidate flows.

In a congestion control node according to a fourth aspect of this invention, the congestion control node further comprises a classification processing arrangement for classifying flows on the network to relate to queues. Connected to the classification processing arrangement, a flow number measuring arrangement measures the number of the flows passing through the queues each queue. The flow number measuring arrangement produces a measured result. Connected to the flow number measuring arrangement, a weighting determining arrangement determines, on the basis of the measured result, a weighting in restriction of the transmission amount for the flows passing through the queues each queue. The weighting determining arrangement produces a weighted result. Connected to the congestion flow estimation arrangement and the weighting determining arrangement, an output adjusting arrangement restricts the transmission amount each queue on the basis of the estimated result and the weighted result.

In a congestion control node according to a fifth aspect of this invention, the congestion control node further comprises a congestion detection arrangement for detecting a congestion level in communications to produce detected congestion information indicative of the congestion level. Connected to the congestion detection arrangement, a congestion notifying arrangement notifies other nodes on the network of the detected congestion information.

In a congestion control node according to a sixth aspect of this invention, the congestion control node further comprises a transmission buffer for use in transferring the communication data between adjacent nodes on the network. The congestion detection arrangement carries out a processing for detecting the congestion level of the communications on the basis of a used amount of the transit buffer.

In a congestion control node according to a seventh aspect of this invention, the congestion control node further comprises a transmission buffer for holding the communication data until a transmission possible time instant. Connected to the transmission buffer, an output measuring arrangement measures an amount of the transmission data produced by the transmission buffer. The output measuring arrangement produces a buffer output measured amount. The congestion notifying arrangement comprises a command generating arrangement, connected to the transit buffer and the output measuring arrangement, generates, on the basis of the used amount of the transmission buffer, a data amount produced by the transit buffer, and the buffer output measured amount, a control command instructing restriction of the communications for other nodes on the network. The congestion notifying arrangement transmits the control command to the other nodes on the network with the control command included in the detected congestion information.

In a congestion control node according to an eighth aspect of this invention, the congestion control node further comprises a failure detection arrangement for detecting a failure where communications cannot make on the network. The failure detection arrangement produces section information indicative of a section on the network where the failure occurs. Connected do the failure detection arrangement, a failure notifying arrangement notifies other nodes on the network of the section information as a failure notification.

In a congestion control node according to a ninth aspect of this invention, the congestion control node further comprises a failure receiving arrangement for receiving the failure notification from the other nodes on the network to produce a received failure notification. Connected to the routing table and the failure receiving arrangement, a failure processing arrangement changes the routing table on the basis of the received failure notification to avoid the section where the failure is detected on the network from the transfer path.

In a congestion control node according to a tenth aspect of this invention, the congestion control node further comprises a transfer canceling arrangement for canceling transfer of the failure notification for a particular node transferred on the network when the failure occurs in the transfer path to the particular node.

In a congestion control node according to an eleventh aspect of this invention, the congestion flow estimation arrangement makes the estimated flow communication between the nodes on the network.

In a congestion control node according to a twelfth aspect of this invention, the congestion flow estimation arrangement makes the estimated flow include communication between each node and a client connected to said node.

In a congestion control node according to a thirteenth aspect of this invention, the network is a ring-shaped network.

In a congestion control node according to a fourteenth aspect of this invention, the network is a network where a plurality of ring-shaped networks are mutually connected one another.

In a congestion control node according to a fifteenth aspect of this invention, the network comprises an arrangement for repeating communications between the plurality of ring-shaped networks.

In a congestion control node according to a sixteenth aspect of this invention, the congestion control node further comprises a ring identifying arrangement for identifying an input source ring where the flows are inputted. The ring identifying arrangement produces an identified result. The congestion flow estimation arrangement carries out a processing for estimating the flow on the basis of the identified result, the congestion information, and the routing table.

According to a first aspect of this invention, a congestion control program controls, by controlling a computer, congestion of communications in a congestion control node which is connected to a network and which replays the communications by a client. The congestion control program comprises a receiving function for receiving, from another node on the network, congestion information of the communication generated from the other node and a congestion flow estimation function for estimating, with reference to the congestion information and a routing table for designating a transfer path for communication data to a destination, as an estimated flow, a flow having a congestion level which is not less than a predetermined level in a node of the transfer path to the destination to produce an estimated result.

In a congestion control program according to a second aspect of this invention, the congestion control program further comprises a determining function for determining the estimated flow as a restriction candidate flow for restricting a transmission amount and an output adjusting function for carrying out restriction of the transmission amount for data in the restriction candidate flow.

In a congestion control program according to a third aspect of this invention, the congestion control program further comprises a classification processing function for classifying flows on the network into restriction candidate flows where a transmission amount is restricted and non-restriction candidate flows where the transmission amount is not restricted, a flow number measuring function for measuring the number of the restriction candidate flows and of said non-restriction candidate flows to produce a measured result, a weighting determining function for determining a weighting of restriction in the transmission amount for the restriction candidate flows on the basis of the measured result to produce a weighted result, and an output adjusting function for restricting the transmission amount on the basis of the estimated result and the weighted result for each of the restriction candidate flows.

In a congestion control program according to a fourth aspect of this invention, the congestion control program further comprises a classification processing function for classifying flows on the network to relate to queues, a flow number measuring function for measuring the number of the flows passing through the queues each queue to produce a measured result, a weighting determining function for determining, on the basis of the measured result, a weighting in restriction of the transmission amount for the flows passing through the queues each queue to produce a weighted result, and an output adjusting function for restricting the transmission amount each queue on the basis of the estimated result and the weighted result.

In a congestion control program according to a fifth aspect of this invention, the congestion control program further comprises a congestion detection function for detecting a congestion level in communications to produce detected congestion information indicative of the congestion level and a congestion notifying function for notifying other nodes on the network of the detected congestion information.

In a congestion control program according to a sixth aspect of this invention, the congestion detection function carries out a processing for detecting the congestion level of the communications on the basis of a used amount of a transmission buffer for use in transferring the communication data between adjacent nodes on the network.

In a congestion control program according to a seventh aspect of this invention, the congestion control program further comprises an output measuring function for measuring an amount of the transmission data produced by a transmission buffer for holding the communication data until a transmission possible time instant. The output measuring function produces a buffer output measured amount. The congestion notifying function comprises a command generating function for generating, on the basis of the used amount of the transit buffer, a data amount produced by the transit buffer, and the buffer output measured amount, a control command instructing restriction of the communications for other nodes on the network and a function for transmitting the control command to the other nodes on the network with the control command included in the detected congestion information.

In a congestion control program according to an eighth aspect of this invention, the congestion control program further comprises a failure detection function for detecting a failure where communications cannot make on the network to produce section information indicative of a section on the network where the failure occurs and a failure notifying function for notifying other nodes on the network of the section information as a failure notification.

In a congestion control program according to a ninth aspect of this invention, the congestion control program further comprises a failure receiving function for receiving the failure notification from the other nodes on the network to produce a received failure notification and a failure processing function for changing the routing table on the basis of the received failure notification to avoid the section where the failure is detected on the network from the transfer path.

In a congestion control program according to a tenth aspect of this invention, the congestion control program further comprises a transfer canceling function for canceling transfer of the failure notification for a particular node transferred on the network when the failure occurs in the transfer path to the particular node.

In a congestion control program according to an eleventh aspect of this invention, the network is a ring-shaped network.

In a congestion control program according to a twelfth aspect of this invention, the network is a network where a plurality of ring-shaped networks are mutually connected one another.

In a congestion control program according to a thirteen aspect of this invention, the congestion control program further comprises a function for repeating communications between the plurality of ring-shaped networks.

In a congestion control program according to a fourteenth aspect of this invention, the congestion control program further comprises a ring identifying function for identifying an input source ring where the flows are inputted. The ring identifying function produces an identified result. The congestion flow estimation function carries out a processing for estimating the flow on the basis of the identified result, the congestion information, and the routing table.

A first congestion control system according to this invention estimates a flow affected congestion by using a routing table and a specific characteristic of a ring and carries out restriction of a transmission frame amount in only the flow affected to the congestion. Accordingly, it is possible to achieve the first object of this invention.

A second congestion control system according to this invention prepares the optimum congestion control command in consideration of both of a transmission frame amount and a transfer frame amount and never occurs a drastic rate degradation. Accordingly, it is possible to achieve the second object of this invention.

A third congestion control system according to this invention certainly transfers congestion notification to all of nodes which might affect the congestion and can cancel the congestion impartially and quickly. Accordingly, it is possible to achieve the third object of this invention.

A fourth congestion control system according to this invention can decrease an amount of control frames by discontinuing transfer of the congestion notification where any effect is not expected in a node on the way using a ring characteristic. As a result, it is possible to achieve the fourth object of this invention.

A fifth congestion control system according to this invention sends congestion notification each congestion control node and estimates, in the node receiving the congestion notification, a flow affecting the congestion using the ring characteristic. As a result, the times of sending of the congestion notification are not increased although flows increase. Accordingly, it is possible to achieve the fifth object of this invention.

A sixth congestion control system according to this invention transmits congestion occurring in any one ring to other rings when two or more rings are connected and carries out restriction of a frame sending amount at a transmission node or a connection node near to the transmission node. As a result, it is possible to restrict a useless frame abandoned at a node between the transmission node and a reception node before flowing in a ring. Accordingly, it is possible to achieve the sixth object of this invention.

DESCRIPTION OF THE PREFERRED EMBODIMENTS

Throughout the instant specification hereinafter, although information flowing a link is called a frame, not only the frame but also a packet or other data are collectively called a frame. In addition, there is a case where a congestion control node may have a function of a client group which will later be described. Throughout the instant specification, to transmit congestion occurred in an arbitrary ring to another arbitrary ring is called congestion notification extending between the rings.

In addition, a flow is defined as whole of frames which flow from an arbitrary congestion control node laid on an arbitrary ring to a different arbitrary congestion control node laid on an arbitrary ring.

Figure 1:
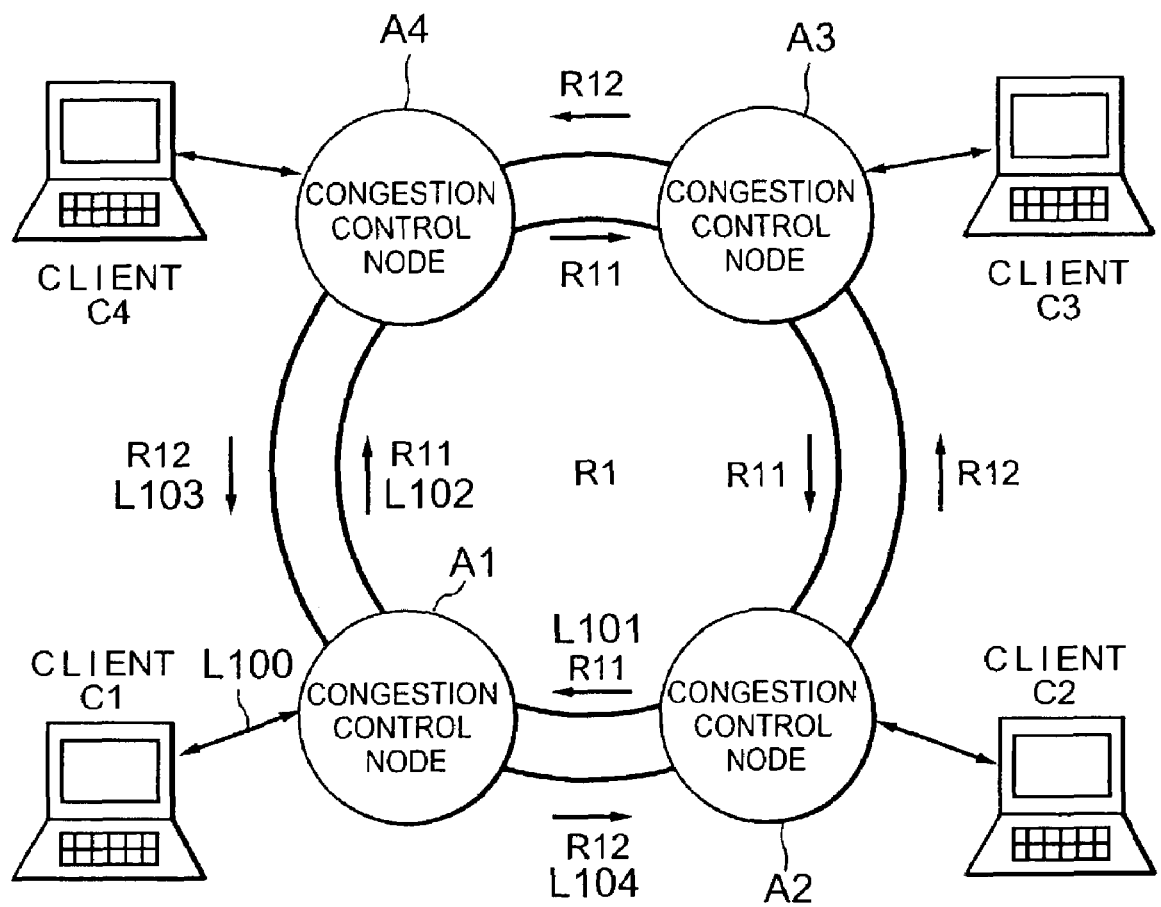
FIG. 1 is a block diagram of a congestion control system according to a first embodiment of this invention.

Referring to FIG. 1, the description will proceed to a congestion control system according to a first embodiment of this invention. The illustrated congestion control system comprises a ring-shaped network R1, first and fourth client groups C1, C2, C3, and C4, and first through fourth congestion control nodes A1, A2, A3, and A4. The first through the fourth client groups C1 to C4 are connected to the first through the fourth congestion control nodes A1 to A4 through two-way links L100, respectively.

The ring-shaped network R1 comprises a first one-way ring R11 turning around or flowing in a clockwise direction and a second one-way ring R12 turning around or flowing in a counterclockwise direction in the opposite direction to the first one-way ring R11. The first and the second one-way rings R11 and R12 are collectively called the ring-shaped network R1. The ring-shaped network R1 has a function for transferring frames sent from one of the first through the fourth congestion control nodes A1 to A4 to a different one of the first through the fourth congestion control nodes A1 to A4.

In the example being illustrated, the first one-way ring R11 includes first and second one-way links L101 and L102 while the second one-way ring R12 includes third and fourth one-way links L103 and L104. The first one-way link L101 is for connecting the second congestion control node A2 with the first congestion control node A1. The second one-way link L102 is for connecting the first congestion control node A1 with the fourth congestion control node A4. The third one-way link L103 is for connecting the fourth congestion control node A4 with the first congestion control node A1. The fourth one-way link L104 is for connecting the first congestion control node A1 with the second congestion control node A2.

The first client group C1 is a set of one or more clients and has a function for carrying out transmission/reception of frames between the first congestion control node A1 and the first client group C1.

Each of the second through the fourth client groups C2 to C4 is similar in structure and operation to the first client group C1. That is, the second client group C2 has a function for carrying out transmission/reception of frames between the second congestion control node A2 and the second client group C2. Similarly, the third client group C3 has a function for carrying out transmission/reception of frames between the third congestion control node A3 and the third client group C3. The fourth client group C4 has a function for carrying out transmission/reception of frames between the fourth congestion control node A4 and the fourth client group C4. Although the description will proceed to only the first client group C1 in behalf of the first through the fourth client groups C1 to C4, the description regarding to the second through the fourth client groups C2 to C3 is omitted. The description regarding to the first client group C1 is similarly applicable to the second through the fourth client groups C2 to C4 for without particularly notice.

The first congestion control node A1 is implemented by a central processing unit (CPU) controlled by a program and has first through seventh functions depicted at (1) through (7) as follows:

(1) The first congestion control node A1 receives a frame from the first client group C1 through the two-way link L100 and transfers the frame on the ring-shaped network R1 via the second one-way link L102 or the fourth one-way link L104;

(2) The first congestion control node A1 receives a frame flowing in the ring-shaped network R1 via the first one-way link L101 or the third one-way link L103 and transfers the frame to the first client group C1 via the two-way link L100 as the need arises;

(3) The first congestion control node A1 re-transfers a frame flowing on the first one-way link L101 to the second one-way link L102 and re-transfers a frame flowing on the third one-way link L103 to the fourth one-way link L104;

(4) The first congestion control node A1 detects congestion of frames on the ring-shaped network R1, namely, on the second one-way link L102 and the fourth one-way link L104;

(5) The first congestion control node A1 sends congestion notification toward the second through the fourth congestion control nodes A2 to A4 laid on the ring-shaped network R1 via the second one-way link L102 or the fourth one-way link L104;

(6) The first congestion control node A1 receives the congestion notification via the ring-shaped network R1, namely, the first one-way link L101 or the third one-way link L103 and carries out adjustment of an amount of frames which is transmitted from it's own node to the ring-shaped network R1 (the second one-way link L102 and the fourth one-way link L104); and (7) The first congestion control node A1 transfers the congestion notification received from the ring-shaped network R1 (the first and the third one-way links (L101 and L103) to adjacent nodes (the second congestion control node A2 or the fourth congestion control node A4) laid on the ring-shaped network R1 via the fourth or the second one-way links L102 or L104.

Each of the second through the fourth congestion control nodes A2, A3, and A4 is similar in structure and operation to the first congestion control node A1. Although the description will proceed to only the first congestion control node A1 in behalf of the first through the fourth congestion control nodes A1 to A4, the description regarding to the second through the fourth congestion control nodes A2 to A3 is omitted. The description regarding to the first congestion control node A1 is similarly applicable to the second through the fourth congestion control node A2 to A4 for without particularly notice.

The two-way link L100 is a two-way link for linking the first client group C1 with the first congestion control node A1 and for linking the first congestion control node A1 with the first client group C1.

The first one-way link L101 is a one-way link for linking the second congestion control node A2 with the first congestion control node A1 and belongs to the first one-way ring R11.

The second one-way link L102 is a one-way link for linking the first congestion control node A1 with the fourth congestion control node A4 and belongs to the first one-way ring R11.

The third one-way link L103 is a one-way link for linking the fourth congestion control node A4 with the first congestion control node A1 and belongs to the second one-way ring R12.

The fourth one-way ling L104 is a one-way link for linking the first congestion control node A1 with the fourth congestion control node A4 and belongs to the second one-way ring R12.

Figure 2:
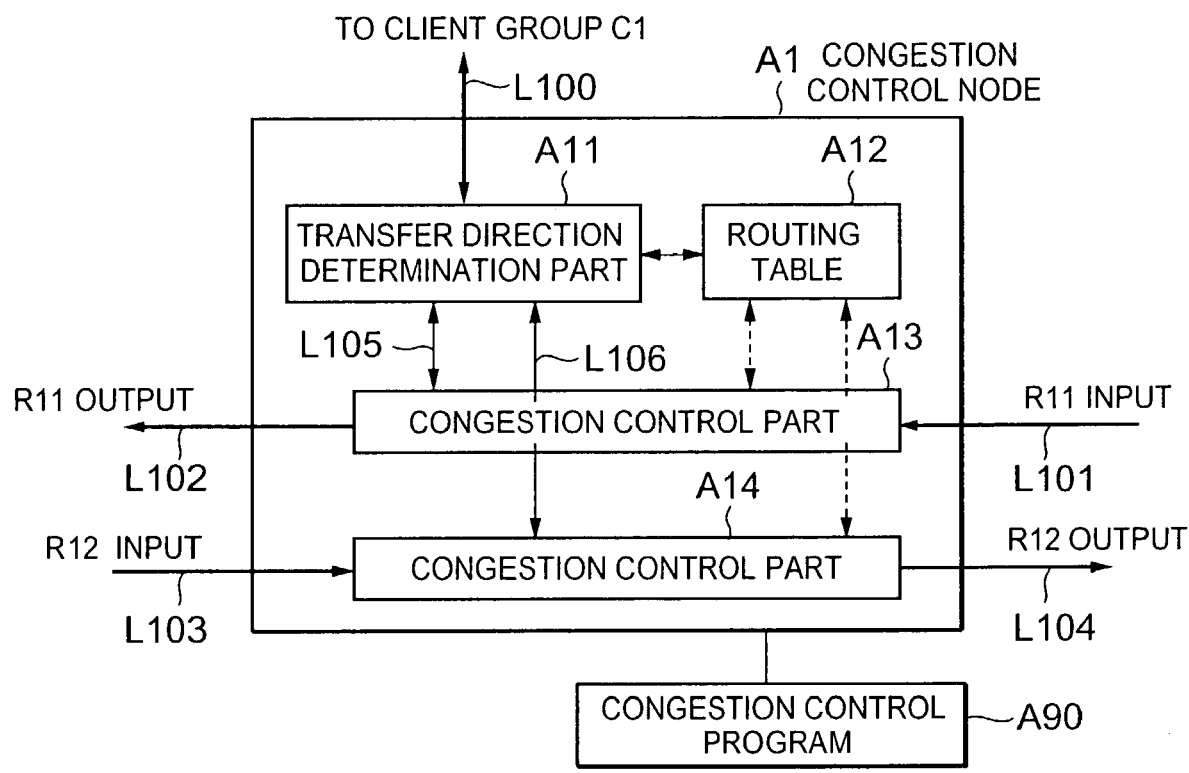
FIG. 2 is a block diagram of a congestion control node for use in the congestion control system illustrated in FIG. 1.

FIG. 2 is a block diagram showing the first congestion control node A1. The first congestion control node A1 comprises a transfer/transit direction determination part A11, a routing table A12, a first congestion control part A13, a second congestion control part A14, and first and second internal two-way links L105 and L106.

The transfer direction determination part A11 has a function as follows. That is, the transfer direction determination part A11 receives, as received frames, frames from the first client group C1, the first congestion control part A13, and the second congestion control part A14. The transfer direction determination part A11 determines a destination node address for the received frames. The transfer direction determination part A11 transfers the received frames toward the first client group C1, the first congestion control node A13, and the second congestion control node A14 in accordance with description of the routing table A12. In addition, all of frames going from the first one-way ring R11 to the second one-way ring R12, frames going the second one-way ring R12 to the first one-way ring R11, and frames where the first client group C1 is a destination or a sender go by way of the transfer direction determination part A11.

The routing table A12 has a function for memorizing a cost up to each destination congestion control node and an ID of a sending one-way ring. The ID of the sending one-way ring indicates either the first one-way ring R11 or the second one-way ring R12. Information of the routing table A12 is used by the transfer direction determination part A11, and the first and the second congestion control parts A13 and A14. At any rate, the routing table A12 designates a transfer path for destination.

The first congestion control part A13 has first through fifth functions depicted at (1) through (5) as follows:

(1) The first congestion control part A13 is supplied with, an input frame, a frame from the transfer direction determination part A11 via the first internal two-way link L105 and transfers the input frame to the second one-way link L102;

(2) The first congestion control part A13 extracts, as an extracted frame, a frame supplied from the first one-way link L101 from the first one-way ring R11 as the need arises and transfers the extracted frame to the transfer direction determination part A11 via the first internal two-way link L105;

(3) The first congestion control part A13 detects congestion occurring in the second one-way link L102 and transmits congestion notification toward the second congestion control node A2 via the first internal two-way link L105, the transfer direction determination part A11, the second internal two-way link L106, the second congestion control part A14, and the fourth one-way link L104;

(4) The first congestion control part A13 receives congestion notification generated or transferred from the fourth congestion control node A4 via the third one-way link L103, the second congestion control part A14, the second internal two-way link L106, the transfer direction determination part A11, and the first internal two-way link L105 and carries out adjustment of an amount of frames which are transmitted from the first congestion control node A1 to the second one-way link L102; and (5) The first congestion control part A13 transfers congestion notification received from the first one-way ring R11 to the second congestion control node A2 via the first internal two-way link L105, the transfer direction determination part A11, the second internal two-way link L106, the second congestion control part A14, and the fourth one-way link L104 as the need arises.

The second congestion control part A14 has a congestion control function similar in structure and operation to the first congestion control part A13. Although the description will proceed to only the first congestion control part A13 in behalf of the first and the second congestion control parts A13 and A14, the description regarding to the second congestion control part A14 is omitted. The description regarding to the first congestion control part A13 is similarly applicable to the second congestion control part A14 to A4 for without particularly notice.

The first internal two-way link L105 is a two-way link for linking the transfer direction determination part A11 with the first congestion control part A13.

The second internal two-way link L106 is a two-way link for linking the transfer direction determination part A11 with the second congestion control part A14.

Although the first congestion control node A1 is implemented by hardware, the first congestion control node A1 may be implemented by loading a congestion control program A90 which are a computer program comprising each function in a memory of a computer processing unit. The congestion control program A90 is stored in a magnetic disk, a semiconductor memory, or other recording media. In addition, the above-mentioned functions are implemented by loading the congestion control program A90 from the recording medium in the computer processing unit to control operations of the computer processing unit.

Figure 3:
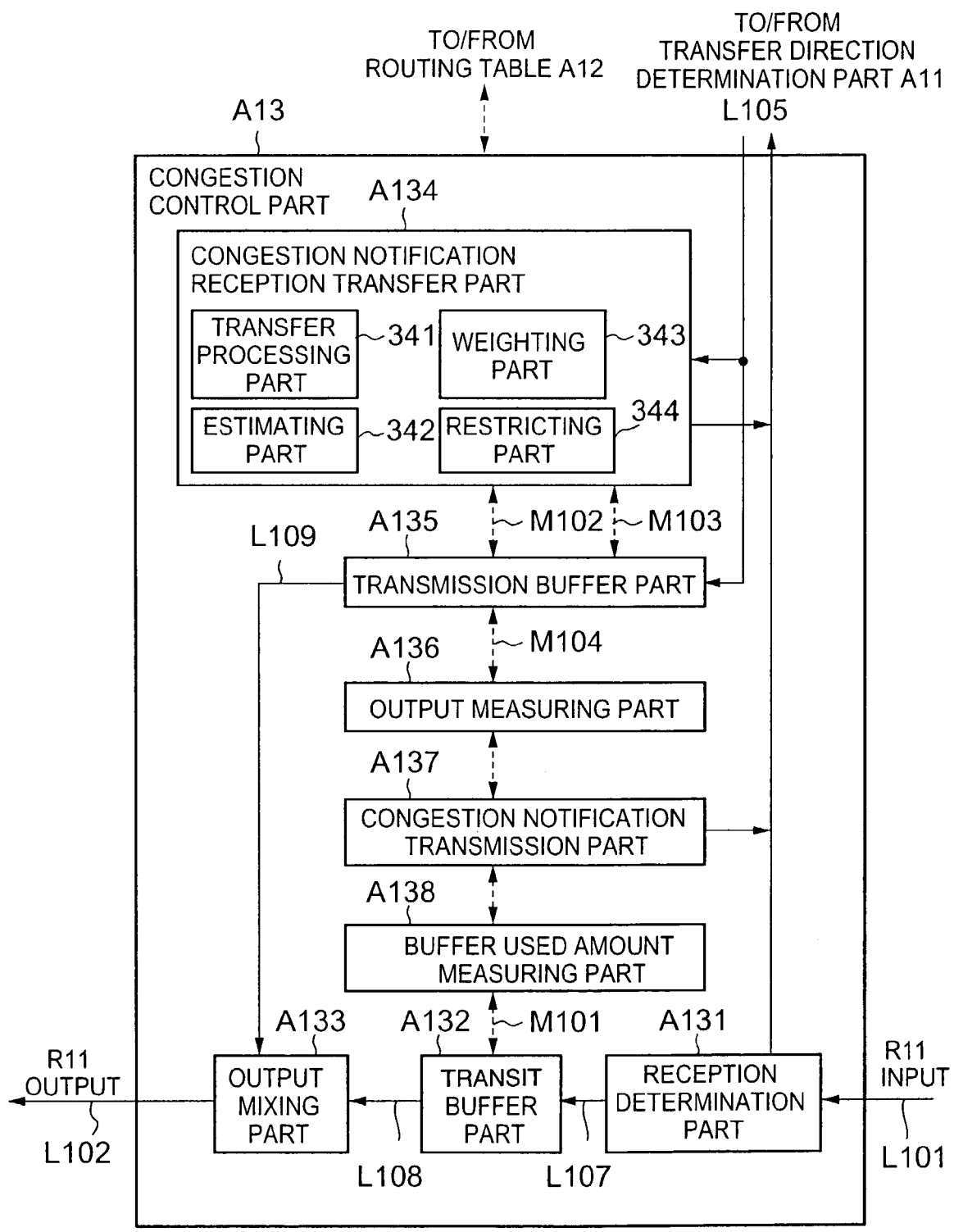
FIG. 3 is a block diagram of a congestion control part for use in the congestion control node illustrated in FIG. 2.

FIG. 3 is a block diagram showing the first congestion control part A13. The first congestion control part A13 comprises a reception determination part A131, a transfer/transit buffer part A132, an output mixing part A133, a congestion notification reception transfer part A134, a transmission buffer part A135, an output measuring part A136, a congestion notification transmission part A137, a buffer used amount measuring part (a congestion detection part) A138, first through third internal one-way links L107, L108, and L109, and first through fourth notifying lines M101, M102, M103, and M104.

The reception determination part A131 receives, as a received frame, a frame from the first one-way link L101 belonging to the first one-way ring A11 to determine a destination of the received frame. When the destination of the received frame is the first congestion control node A1, a broadcast, or a multicast, the reception determination part A131 transfers the received frame toward the transfer direction determination part A11. Remaining frames, which are not transferred toward the transfer direction determination part A11, are transferred to the transit buffer part A132. If necessary, the reception determination part A131 carries out reproduction of the received frame.

The transit buffer part A132 has first and second functions depicted at (1) and (2) as follows:

(1) The transit buffer part A132 stores, stored frames, frames supplied from the reception determination part A131 via the first internal one-way link L107 until a timing which enables to send to the second one-way link L102 belonging to the first one-way ring R11 and transfers the stored frames toward the output mixing part A133 via the second internal one-way link L108 at a sendable timing; and (2) Responsive to a request from the buffer used amount measuring part A138, the transit buffer part A132 notifies the buffer used amount measuring part A138 via the first notifying line M101 of the number of the stored frames in the transit buffer part A132, the number of bits, the number of bytes, or the like.

The output mixing part A133 extracts, as an extracted frame, a frame from the transit buffer part A132 or the transmission buffer part A135 in accordance with priority or weighting which are preliminarily set or dynamically change and transfers the extracted frame toward the second one-way link L102 belonging to the first one-way ring R11.

The congestion notification reception transfer part A134 comprises a transfer processing part 341, an estimating part 342, a weighting part 343, and a restricting part 344.

The transfer processing part 341 receives congestion notification from the second one-way ring R12 via the transfer direction determination part A11 and the first internal two-way link L105. If necessary, the transfer processing part 341 re-transmits the congestion notification to the second one-way ring R12 via the first internal two-way link L105 and the transfer determination part A11.

The estimating part 342 determines, with reference to the congestion notification and information of the routing table A12, a restriction amount of transmission frames each queue and an accommodation transmitter queue each flow.

The weighting part 343 multiplies the restriction amount of the transmission frames each queue by the number (weighting) of the flows accommodated in each queue.

The restricting part 344 notifies the transmission buffer part A135 by means of the second and the third notifying lines M102 and M103.

The transmission buffer part A135 has first through fourth functions depicted at (1) to (4) as follows:

(1) The transmission buffer part A135 stores, as stored frames, frames supplied from the transfer direction determination part A11 via the first internal two-way link L105 up to a timing enable to send to the second one-way link L102 belonging to the first one-way ring R11 to transfer the stored frames toward the output mixing part A133 via the third internal one-way link L109 at a sending possible timing;

(2) The transmission buffer part A135 restricts the number of transmission frames so that the number of the transmission frames is less than an amount of sending possible frames set by the congestion notification reception transfer part A134 via the second notifying line M102;

(3) The transmission buffer part A135 stores designated flows in a queue set by the congestion notification reception transfer part A134 via the third notifying line M103; and (4) Responsive to a request from the output measuring means A136 via the fourth notifying part M104, the transmission buffer part A135 notifies the output measuring means A136 via the fourth notifying line M104 of the number of frames transferred from the transmission buffer part A135 to the output mixing part A133, the number of bits, the number of bytes, the number of transmission queues each storing one or more frames, and so on.

The output measuring part A136 periodically requests the transmission buffer part A135 so that the transmission buffer part A135 notifies the output measuring part A136 of the frame numbers, the bit numbers, and the byte numbers of the frames transferred from the transmission buffer part A135 to the output mixing part A133, the number of the transmission queues each storing one or more frames. The output measuring part A136 stores the values notified from the transmission buffer part A135 until the next notification.

The congestion notification transmitting part A137 prepares congestion notification frames using a congestion generation detected result received from the buffer used amount measuring part A138, an amount of transmission frames measured by the output measuring part A136. The congestion notification transmitting part A137 transmits the congestion notification frames via the first internal tow-way link L105 and the transfer direction determination part A11 using the second one-way ring R12 toward the congestion control node laid in the upper stream of the first one-way ring R11.

Responsive to a request from the congestion notification transmitting part A137, the buffer used amount measuring part A138 requests the transit buffer part A132 to notify of the number of frames stored in the transit buffer part A132, the bit number, the byte number thereof. The buffer used amount measuring part A138 determines whether or not congestion occurs on the basis of its result (information of congestion degree) (or determines whether or not the congestion degree is not less than a predetermined degree) and notifies the congestion notification transmitting part A137 of a determined result.

At any rate, a combination of the transit buffer part A132 and the buffer used amount measuring part A138 serves as a congestion detection arrangement for detecting a congestion level of communications in the first congestion control node A1 to produce detected congestion information. The congestion notification transmission part A137 serves as a congestion notifying arrangement for notifying other congestion control nodes of the detected congestion information. The transfer processing part 341 serves as a congestion receiving arrangement for receiving congestion information from the other congestion control nodes to produce received congestion information.

The estimating part 342 serves as a congestion flow estimation arrangement for estimating, with reference to the received congestion information and the routing table A12, as an estimated flow, a flow having the congestion level which is not less than a predetermined level in the transfer path in the destination. The congestion flow estimation arrangement produces an estimated result indicative of the estimated flow. The congestion flow estimation arrangement makes the estimated flow communication between the congestion control nodes on the network. The congestion flow estimation arrangement makes the estimated flow include communication between each of the congestion control nodes on the network and a client connected to the congestion control node in question.

In addition, the restriction part 344 acts as a determining arrangement for determining the estimated flow as a restriction candidate flow for restricting a transmission amount.

In other words, the transit buffer part A132 acts as a transit buffer for use in transfer of the communication data between adjacent nodes on the network. The buffer used amount measuring part A138 carries out processing for detecting the congestion level of the communications on the basis of a used amount of the transmission buffer A132.

The transmission buffer part A135 serves as a transmission buffer for holding communication data until a transmission possible time instant. The output measuring part A136 serves as an output measuring arrangement for measuring an amount of the transmission data produced by the transmission buffer A135. The output measuring arrangement produces a buffer output measured amount. The congestion notification transmission part A137 serves as a command generating arrangement for generating, on the basis of the used amount of the transit buffer A132, a data amount produced by the transit buffer A132, and the buffer output measured amount, a control command for instructing restriction of communications for other congestion control nodes on the network. The congestion notification transmission part A137 also serves as a command transmitting arrangement for transmitting the control command to the other congestion control nodes on the network with the control command added to the congestion information. The transfer processing part 341 serves as a command receiving arrangement for receiving, from the other congestion control nodes on the network, the. congestion information to which the control command is added. The command receiving arrangement produces a received control command. The restricting part 344 serves as a command execution arrangement for executing the received control command.

The first internal one-way link L107 is a one-way link for linking the reception determination part A131 with the transit buffer part A132 and comprises a part of the first one-way ring R11.

The second internal one-way link L108 is a one-way link for linking the transit buffer part A132 with the output mixing part A133 and comprises a part of the first one-way ring R11.

The third internal one-way link L109 is a one-way link for linking the transmission buffer part A135 with the output mixing part A133.

The first notifying line M101 is a notifying line between the transit buffer part A132 and the buffer used amount measuring part A138.

The second notifying line M102 is a notifying line between the congestion notification reception transfer part A134 and the transmission buffer part A135.

The third notifying line M103 is a notifying line between the congestion notification reception transfer part A134 and the transmission buffer part A135.

The fourth notifying line M104 is a notifying line between the transmission buffer part A135 and the output measuring part A136.

Figure 4:
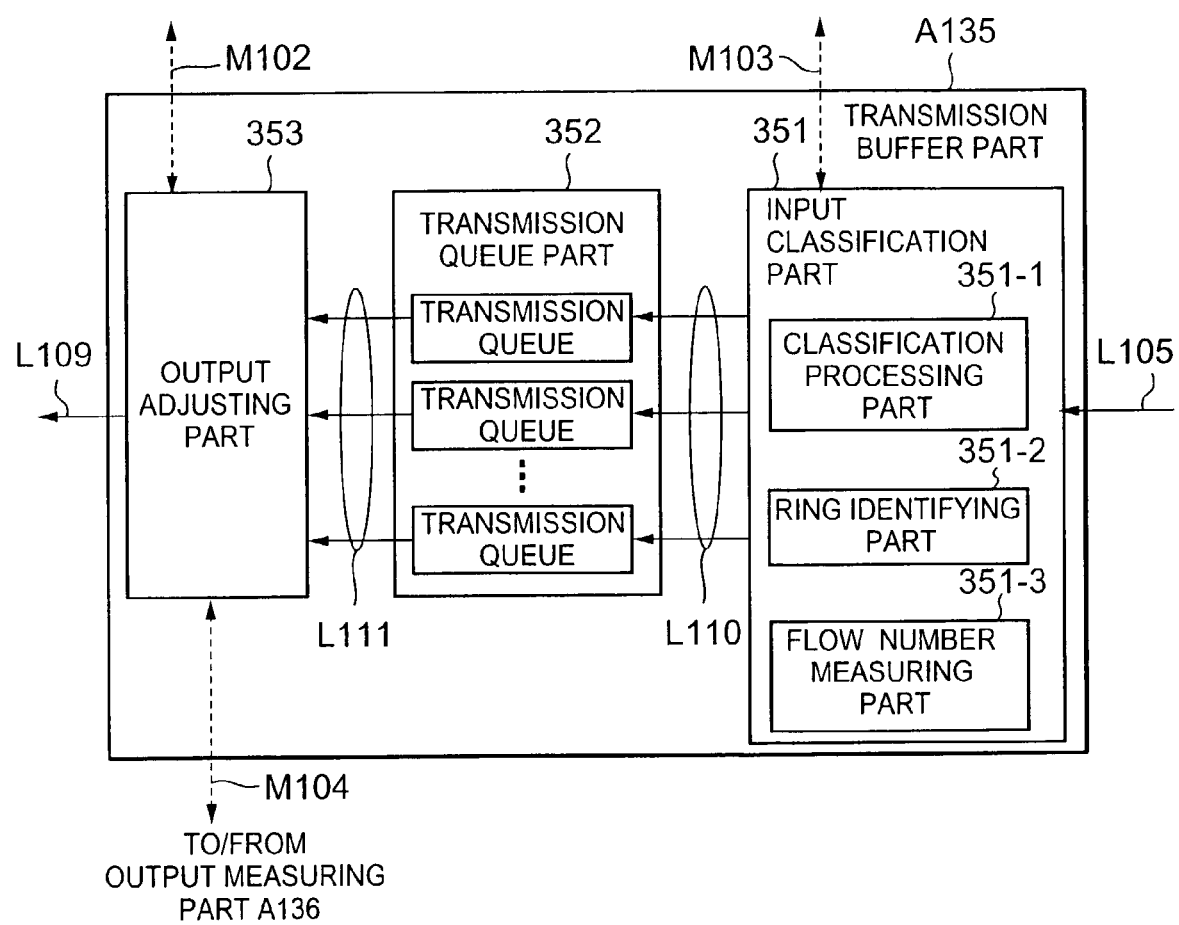
FIG. 4 is a block diagram of a transmission buffer part for use in the congestion control part illustrated in FIG. 3.

FIG. 4 is a block diagram showing the transmission buffer part A135. The illustrated transmission buffer part A135 comprises an input classification part 351, a transmission queue part 352, an output adjusting part 353, first and second internal one-way link groups L110 and L111. In the example being illustrated, the transmission queue part 352 comprises transmission queues which are equal in number to destination congestion control nodes.

The input classification part 351 comprises a classification processing part 351-1, a ring identifying part 351-2, and a flow number measuring part 351-3.

The classification processing part 351-1 classifies frames supplied from the transfer direction determination part A11 into classified frames in accordance with the destination congestion control nodes to transfer the classified frame to the transmission queue part 352 in accordance with destination congestion control node addresses.

Responsive of a request from the congestion notification reception transfer part A134 via the third notifying line M103, the ring identifying part 351-2 notifies the congestion notification reception transfer part A134 of a ring ID of an input source each flow supplied to the transmission buffer part A135 via the third notifying line M103.

Responsive to a request from the congestion notification reception transfer part A134 via the third notifying line M103, the flow number measuring part 351-3 notifies the congestion notification reception transfer part A134 via the third notifying line M103 of the number of available transmission queues and the number of flows passing through each transmission queue.

The transmission queue part 352 comprises the transmission queues prepared for respective destination congestion control nodes. The transmission queue part 352 has a function for storing the input frames classified by the input classification part 351 for the respective destination congestion control nodes until a request from the output adjusting part 353.

The output adjusting part 353 has first through fourth functions depicted at (1) to (4) as follows:

(1) The output adjusting part 353 restricts an output amount of frames so that the output amount of the frames is not less than a set output amount for each queue by the congestion notification reception transfer part A134 via the second notifying line M102;

(2) The output adjusting part 353 adjusts the output amount of the frames so as to follow a weighting, priority, or the like which is preliminarily set or dynamically changes as well as the restriction of the above-mentioned function (1);

(3) The output adjusting part 353 extracts, as extracted frames, frames from each queue of the transmission queue part 352 via the second internal one-way link group L111 in accordance with a set restriction amount to transfer the extracted frames toward the output mixing part A133 via the third internal one-way link L109; and (4) Responsive to a request from the output measuring part A136 via the fourth notifying line M104, the output adjusting part 353 notifies the output measuring part A136 via the fourth notifying line M104 of the number of frames transferred from the transmission queue part 352 to the output mixing part A133, the bit number, the byte numbers thereof, the number of the transmission queues each storing one or more frames.

At any rate, the output adjusting part 353 acts as an output adjusting arrangement for carrying out restriction of the transmission amount for data in the restriction candidate flow in question each restriction candidate flow.

In addition, the classification processing part 351-1 serves as a classification processing arrangement for classifying flows on the network to related to queues. The flow number measuring part 351-3 serves as a flow number measuring arrangement for measuring the number of the flows passing through the queues for each of the queues produce a measured result. The weighting part 343 in FIG. 3 acts as a weighting determining arrangement for determining, on the basis of the measured result, a weighting of restriction in the transmission amount for the flows passing through the queues for each of the queues to produce a weighted result. The output adjusting part 353 acts ad an output adjusting arrangement for restricting, on the basis of the estimated result and the weighted result, the transmission amount for each of the queues.

The ring identifying part 351-2 acts as a ring identifying arrangement for identifying an input source ring where the flow is inputted. The ring identifying arrangement produces an identified result. The estimating part 342 in FIG. 3, which serves as the congestion flow estimation arrangement, carries out estimation processing for the flow on the basis of the identified result, the congestion information, and the routing table A12 for designating the transfer path to the destination.

The first internal one-way link group L110 names generally links for going toward the transmission queue part 352 from the input classification part 354.

The second internal one-way link group L111 names generally links for going toward the output adjusting part 353 from the transmission queue part 352.

Figure 5:
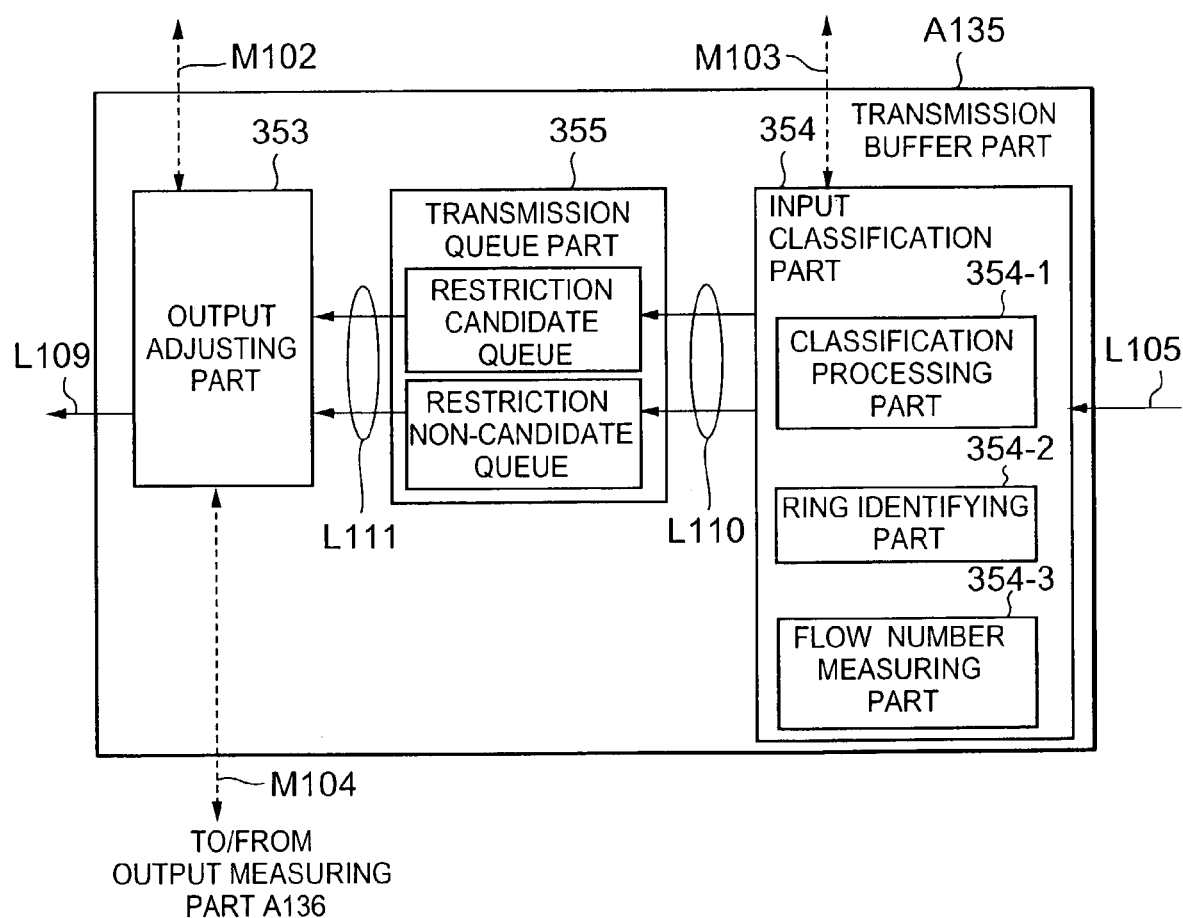
FIG. 5 is a block diagram of a transmission buffer part for use in the congestion control part illustrated in FIG. 3.

FIG. 5 is a block diagram of a second example of the transmission buffer part A135. The transmission buffer part A135 comprises an input classification part 354, a transmission queue part 355, the output adjusting part 353, and the first and the second internal one-way link groups L110 and L111. In the second example being illustrated, the transmission queue part 355 comprises two queues, namely, a restriction candidate queue and a restriction non-candidate queue.

The input classification part 354 comprises a classification processing part 354-1, a ring identifying part 354-2, and a flow number measuring part 354-3.

The classification processing part 354-1 sets flows designated by the congestion notification reception transfer part A134 via the third notifying line M103 to transfer to a transmission queue designated by the congestion notification reception transfer part A134 via the third notifying line M103. The classification processing part 354-1 classifies frames supplied from the transfer direction determination part A11 via the first internal two-way link L105 into frames for a transfer amount restriction candidate destination node and frames except for the transfer amount restriction candidate destination node in accordance with an above-mentioned designated method, a predefined classification method, or a dynamically changing classification method. The classification processing part 341-1 transfers the classified frames to the transmission queue part 355 in accordance with a classified result via the first internal one-way link group L110.

Responsive to a request from the congestion notification reception transfer part A134 via the third notifying line M103, the ring identifying part 354-2 notifies the congestion notification reception transfer part A134 via the third notifying line M103 of a ring ID of an input source each flow supplied to the transmission buffer part A135.

Responsive to a request from the congestion notification reception transfer part A134 via the third notifying line M103, the flow number measuring part 354-3 notifies the congestion notification reception transfer part A134 via the third notifying line M103 of the number of available transmission queue or the number of flows passing through each transmission queue.

The transmission queue part 355 comprises two queues, namely, the transfer amount restriction candidate queue and the transfer amount restriction non-candidate queue. The transmission queue part 355 has a function for storing the input frames classified to the restriction candidate and the restriction non-candidate from the input classification part 354 until a request from the output adjusting part 353.

The output adjusting part 353 is similar to that illustrated in FIG. 4.

At any rate, the classification processing part 354-1 serves as a classification processing arrangement for classifying flows on the network into restriction candidate flows for restriction a transmission amount and non-restriction candidate flows for doing not restrict the transmission path. The flow number measuring part 354-3 serves as a flow number measuring arrangement for measuring the number of the restriction candidate flows and of the non-restriction candidate flows to produce a measured result. The weighting part 343 in FIG. 3 serves as a weighting determining arrangement for restriction in the transmission amount for the restriction candidate flows on the basis of the measured result to produce a weighted result. The output adjusting part 353 serves as an output adjusting arrangement for restricting the transmission amount for each of the restriction candidate flows on the basis of the estimated result and the weighted result.

The ring identifying part 354-2 acts as a ring identifying arrangement for identifying an input source ring where the flow is inputted. The ring identifying arrangement produces an identified result. The estimating part 342 in FIG. 3, which serves as the congestion flow estimation arrangement, carries out estimation processing for the flow on the basis of the identified result, the congestion information, and the routing table A12 for designating the transfer path to the destination.

The first internal one-way link group L110 names generally links for going toward the transmission queue part 355 from the input classification part 354.

The second internal one-way link group L111 names generally links for going toward the output adjusting part 353 from the transmission queue part 355.

Figure 6:
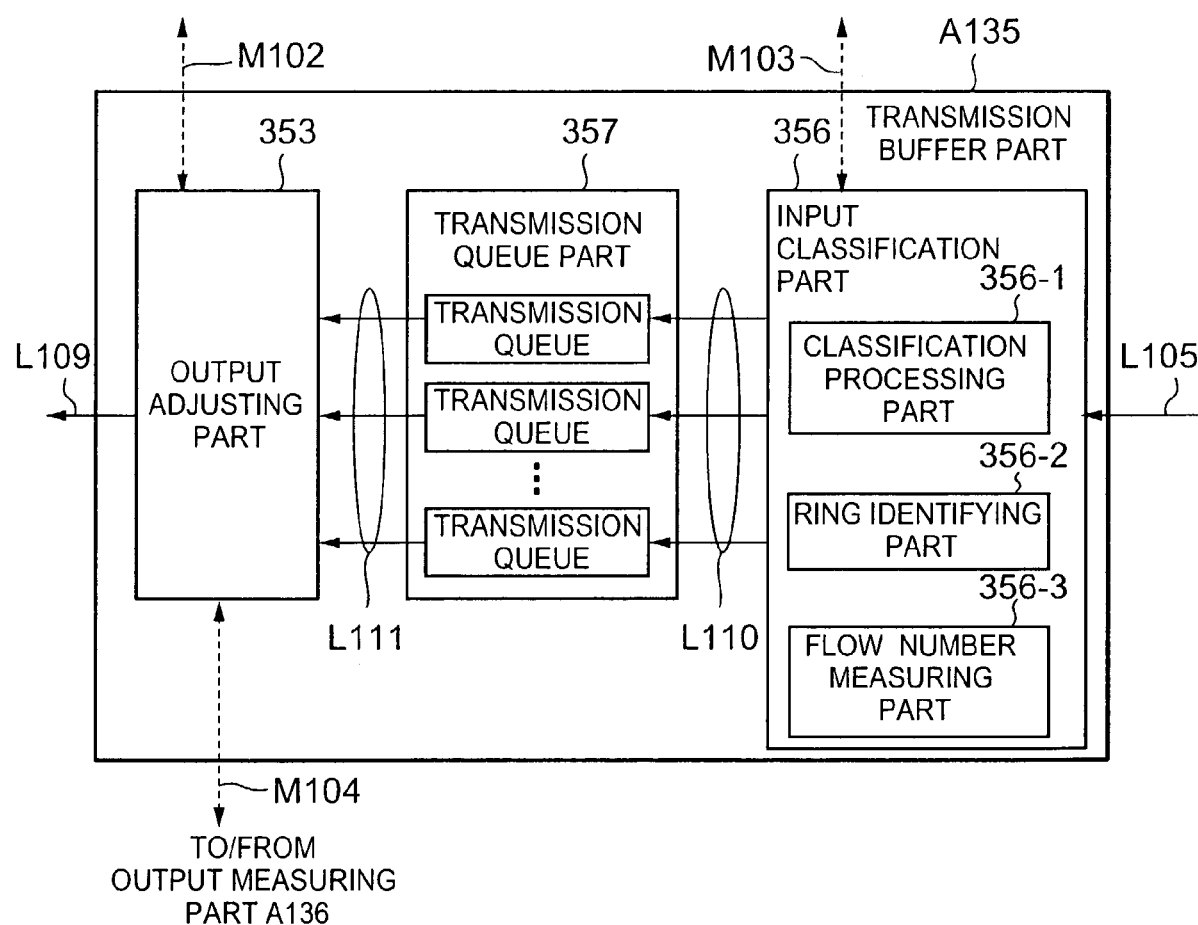
FIG. 6 is a block diagram of a transmission buffer part for use in the congestion control part illustrated in FIG. 3.

FIG. 6 is a block diagram showing a third example of the transmission buffer part A135. The illustrated transmission buffer part A135 comprises an input classification part 356, a transmission queue part 357, the output adjusting part 353, and the first and the second internal one-way link groups L110 and L111. In the third example being illustrated, the transmission queue part 357 comprises any number of transmission queues each client, each node group, each destination ring, each cost, each IP flow number, or each other unit.

The input classification part 356 comprises a classification processing part 356-1, a ring identifying part 356-2, and a flow number measuring part 356-3.

The classification processing part 356-1 carries out a set so that frames supplied from the first internal two-way link L105 are classified into each transmission queue in accordance with a method designated by the congestion notification reception transfer part A134, any pre-defined method or a dynamically changing method each destination client ID, each destination group ID, each node group ID, each IP address, each IP port number, or the like. The classification processing part 356-1 classifies the input frames from the transfer direction determination part A11 via the first internal two-way link 105 in accordance with the above-mentioned set method to transfer the classified frames to the transmission queue part 357 in accordance with a classified result using the first internal one-way link group L110.

Responsive to a request from the congestion notification reception transfer part A134 via the third notifying line M103, the ring identifying part 356-2 notifies the congestion notification reception transfer part A134 via the third notifying line M103 of a ring ID of an input source each flow supplied to the transmission buffer part A135.

Responsive to a request from the congestion notification reception transfer part A134 via the third notifying line M103, the flow number measuring part 356-3 notifies the congestion notification reception transfer part A134 via the third notifying line M103 of the number of available transmission queue or the number of flows passing through each transmission queue.

The transmission queue part 357 comprises the queues each destination client ID, each destination group ID, a node group ID, an IP address, an IP port number, or the like. The transmission queue part 357 has a function for storing the input frames classified each destination client from the input classification part 356 until a request from the output adjusting part 353.

The output adjusting part 353 is similar to that illustrated in FIG. 4.

At any rate, the classification processing part 356-1 acts as a classification processing arrangement for classifying flows on the network to relate to queues. The flow number measuring part 356-3 acts as a flow number measuring arrangement for measuring the number of the flows passing through the queues for each queue to produce a measured result. The weighting part 343 in FIG. 3 acts as a weighting determining arrangement for determining, on the basis of the measured result, a weighting of restriction in the transmission amount for the flows passing through the queues for each of the queues to produce a weighted result. The output adjusting part 353 acts as an output adjusting arrangement for restricting, on the basis of the estimated result and the weighted result, the transmission amount for each of the queues.

The ring identifying part 356-2 acts as a ring identifying arrangement for identifying an input source ring where the flow is inputted. The ring identifying arrangement produces an identified result. The estimating part 342 in FIG. 3, which serves as the congestion flow estimation arrangement, carries out estimation processing for the flow on the basis of the identified result, the congestion information, and the routing table A12 for designating the transfer path to the destination.

The first internal one-way link group L110 names generally links for going toward the transmission queue part 357 from the input classification part 356.

The second internal one-way link group L111 names generally links for going toward the output adjusting part 353 from the transmission queue part 357.

Figure 7:
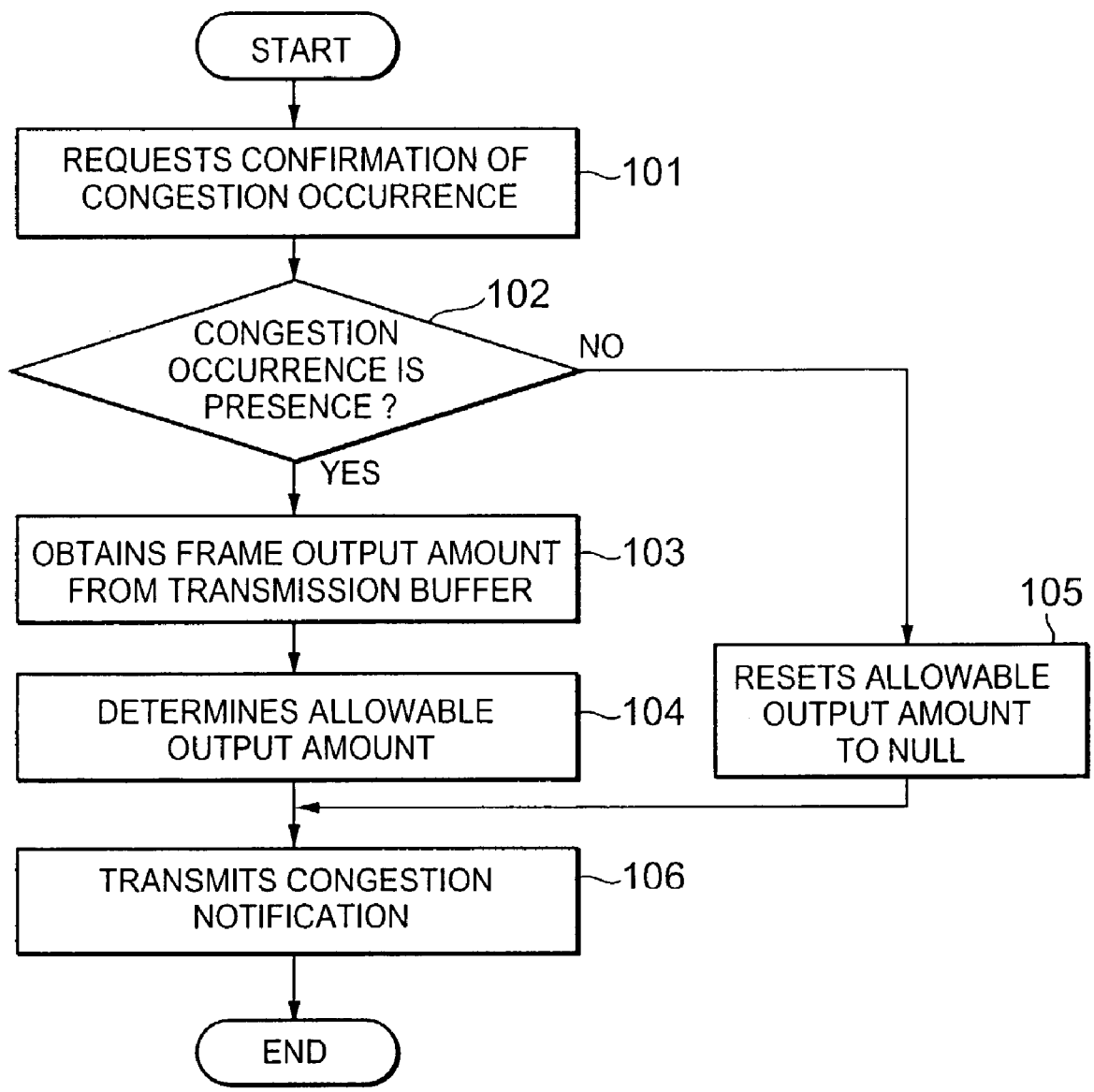
FIG. 7 is a flowchart for use in describing operation on transmission of congestion notification in the congestion control system illustrated in FIG. 1.

Referring now to FIG. 7, the description will proceed to operation in the congestion notification transmitting part A137 in a case where a congestion control function is effective in the congestion notification transmitting part A137 in detailed.

The congestion notification transmitting part A137 periodically makes the buffer used amount measuring part A138 confirm the presence or absence of congestion generation (step 101).

The congestion notification transmitting part A137 receives notice of the presence or absence of the congestion generation from the buffer used amount measuring part A138 (step 102). When the notice is the presence of the congestion generation, a processing is shifted from the step 102 to a step 103. When the notice is the absence of the congestion generation, a processing is shifted from the step 102 to a step 105.

The congestion notification transmitting part A137 requests, of the output measuring part A136, a notice of a total transmission frame amount U of frames transferred from the transmission buffer part A135 to the output mixing part A133 and a notice of a destination congestion control node number D (step 103).

The congestion notification transmitting part A137 determines, using the transmission frame amount U and the destination congestion control node number D, a maximum frame insertion amount for the first one-way ring R11 of a measurement candidate that is allowed in each transmission queue of each congestion control node (step 104). Specifically, the congestion notification transmitting part A137 determines the maximum frame insertion amount as an average transmission frame amount per one flow inserted in the first one-way ring R11 by the first congestion control node A1, namely, "the transmission frame amount U÷the destination node number D." The maximum frame insertion amount will be called hereinafter an allowable output amount.

When the congestion generation notification is not received in the buffer used amount measuring part A138 at the step 102, the congestion notification transmitting part A137 considers that the congestion is not generated and resets the allowable output amount into a NULL value (step 105). Although the congestion is not generated, the congestion notification is transmitted with the NULL value substituted for the allowable output amount.

The congestion notification transmitting part A137 notifies the congestion control node laid in an input side of the first one-way ring R11 via the second one-way ring R12 of the allowable output amount determined at the steps 140 and 105 (step 106). This congestion notification includes not only the allowable output amount but also an address for a notification generation node. In addition, the address for the notification generation node does not change although the congestion notification is transferred in another node.

Figure 8:
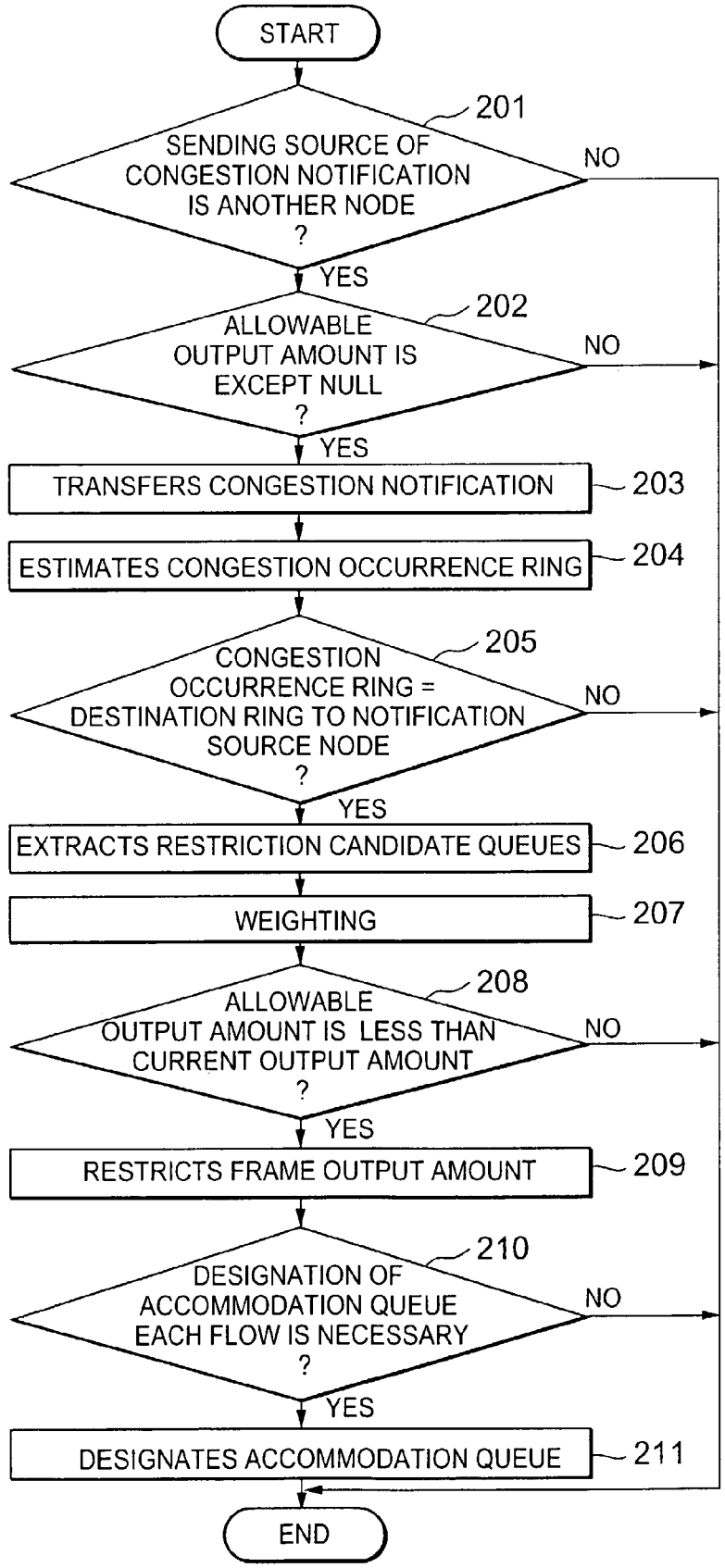
FIG. 8 is a flowchart for use in describing operation on reception of congestion notification in the congestion control system illustrated in FIG. 1.

Referring now to FIG. 8, the description will proceed to operation in the congestion notification reception transfer part A134 on reception of the congestion notification in detailed.

When the congestion control function is effective in the congestion notification reception transfer part A134, the congestion control reception transfer part A134 always waits for the congestion notification to arrive from the transfer direction determination part A11. When the congestion notification is received in the congestion notification reception transfer part A134, a processing is carried out in the congestion notification reception transfer part A134 in order illustrated in FIG. 8.

Steps 201 and 202 are an operation for determining whether or not a received congestion notification frame is received. A step 203 is an operation for transferring the received congestion notification frame to an adjacent node. Steps 204 to 206 are an operation for determining a queue acting as a restriction candidate. Steps 207 to 209 are an operation for actually carrying out restriction of a sending frame amount for the restriction candidate queue. Steps 210 and 211 are an operation for carrying out a setting for classifying each flow into each transmission queue.

The congestion notification reception transfer part A134 refers the notification generation node address included in the congestion notification at the step 201. When the notification generation node is its own node, a processing comes to an end. Therefore, a frame making a circuit of the ring or a frame turned back to the notification generation under any circumstances is abrogated.

When the generation node is another node by referring the notification generation node address included in the congestion notification at the step 201, the step 201 is followed by the step 202 at which the congestion notification reception transfer part A134 checks the allowable output amount.

When the allowable output amount is the NULL value, the congestion notification reception transfer part A134 comes to an end of a processing.

When the allowable output amount is not the NULL value at the step 202, the step 202 is succeeded by the step 203 at which the congestion notification reception transfer part A134 transfers the received congestion notification to the adjacent congestion control node laid in the input side of the first one-way ring R11 at it is using the second one-way ring R12. In this even, any changing is nod added to the notification generation node address, the notification generation node address included in the received congestion notification is substituted.

The step 203 proceeds to the step 204 at which the congestion notification reception transfer part A134 checks the ring ID (which indicates R11 or R12 herein) of the one-way ring via which the congestion notification is received and estimates that the congestion occurs in the ring flowing in the opposite direction of the ring receiving the notification. This is because the node where the congestion is detected always transmits the congestion notification using the ring of the opposite direction of the congestion generated node and the node transferring the congestion notification always transfers the congestion notification using the ring via which notification is received.

The step 204 is followed by the step 205 at which the congestion notification reception transfer part A134 refers the notification generation node address of the congestion notification and refers a hopping number up to the notification node and a frame sending ring ID using the routing table A12. When the congestion generation ring estimated at the step 204 is identical with the frame sending ring ID for the notification generation node referred at this time, a processing is continued. Otherwise, the processing is stopped. This operation is carried out in order to determine whether or not a flow sent from its own node passes through the congestion node.

The step 205 is succeeded by the step 206 at which the congestion notification reception transfer part A134 determines that flows for nodes having a hopping number more than the hopping number up to the notification generation node within flows for the destination nodes transmitting using the congestion generation ring passes through the congestion link due to a ring characteristic and extracts the node where these flows accommodate as restriction candidate queues.

The step 206 proceeds to the step 207 at which the congestion notification reception transfer part A134 checks that respective queues are available by how many of flows for each flow acting as the restriction candidate. It will be assumed that the flows passing through are equal in number to F. In this event, a value obtained by multiplying the allowable output amount U/D by the flow number F is called a restriction output amount. This operation is carried out each queue acting as the restriction candidate.

The step 207 is followed by the step 208 at which the congestion notification reception transfer part A134 determines whether or not the restriction output amount is less than a present set restriction output amount (which will be called an old restriction output amount). When the restriction output amount is more than the old restriction output amount, a processing is came to an end.

When the restriction output amount is less than the old restriction output amount at the step 208, the step 208 is succeeded by the step 209 at which the restriction notification reception transfer part A134 sets for the output adjusting part 353 of the transmission buffer part A135 so as to restrict the output frame amount to the restriction output amount determined at the step 207 for each queue acting as the restriction candidate.

The step 209 proceeds to the step 210 at which the congestion notification reception transfer part A134 inquires of the transmission buffer part A135 a classification method of the transmission queue and determines whether or not it is necessary to set an accommodation queue each flow in a case where the transmission queues are classified into two of control/non-control and so on.

When the congestion notification reception transfer part A134 determines that it is unnecessary to individually set the accommodation queue each flow or each other unit at the step 210, a processing is came to an end.

When the congestion notification reception transfer part A134 determines that it is necessary to individually set the accommodation queue each flow or each other unit at the step 210, the step 210 is followed by the step 211 at which the congestion notification reception transfer part A134 designates the accommodation queue for the transmission buffer part A135 each flow or each other unit.

The restriction output amount of all queues periodically increase until the restriction output amount reaches a maximum restriction output amount. In addition, when the transmission queues are classified into two of restriction/non-restriction, a flow entered in the restriction queue shifts to the non-restriction queue after a lapse of a predetermined time interval or when the flow has an output frame amount equal to or more than that of the non-restriction queue.

Referring to FIG. 1, the description will be made as regards operation of the congestion control in a case where the transmission queues are set each destination congestion control node using a concrete example in detailed.

In FIG. 1, it will be assumed that a rate of each link for linking the first client group C1 with the first congestion control node A1, for linking the second client group C2 with the second congestion control node A2, for linking the third client group C3 with the third congestion control node A3, and for linking the fourth client group C4 with the fourth congestion control node A4 is equal to 100 Megabit/sec while a rate of the first one-way ring R11 and of the second one-way ring R12 is equal to 10 Megabit/sec.

Now, it will be assumed that a client belonging to the third client group C3 transmits frames each having a rate of 8 Megabit/sec toward a client belonging to the first client group C1 via the first one-way ring R11. In this event, inasmuch as a frame transmission rate is less than a bandwidth of the first one-way ring R11, no congestion occurs.

Under the circumstances, all of the frames transmitted toward the client group C1 from the third client group C3 in the third congestion control node A3 pass through the transmission buffers for the congestion control node A1.

Subsequently, it will be assumed that a client belonging to the second client group C3 transmits frames each having a rate of 8 Megabit/sec toward a client belonging to the first client group C1 via the first one-way ring R11.

In this event, as far as a used amount of the transit buffer which packets flowing the first one-way ring R11 use does not exceed a lower limit value (which is herein 5 kilobits) in the second congestion control node A2, the frames supplied from the second client group C2 and produced to the first one-way ring R11 are transmitted toward the first one-way ring R11 in preference to frames supplied from the one-way ring R11. Therefore, in the second congestion control node A2, all of frames transmitted from the second client group C2 toward the first client group C1 pass through the transmission buffers for the first congestion control node A1.

Inasmuch as the frames transmitted from the third client group C1 already flow in the first one-way ring R11, the output frame amount for the first one-way ring R11 in the second congestion control node A2 is more than the bandwidth of the first one-way ring R11 and congestion occurs at an output side for the first one-way ring R11 in the second congestion node A2.

It will be assumed that the used amount for the transit buffer in the second congestion control node A2 does not reach the lower limit. Inasmuch as the frames transmitted from the second client group C2 is in preference to the frames supplied from the first one-way ring R11 to the second congestion control node A2, the frames supplied from the first one-way ring R11 to the second congestion control node A2 are stored in the transmission buffer of the second congestion control node A2.

It will be assumed that the used amount for the transit buffer in the second congestion control node A2 exceeds the lower limit. In this event, priority is reversed and the frames supplied from the first one-way ring R11 to the second congestion control node A2 becomes in preference to the frames which are transmitted from the second client group C2 and which flow in the first one-way ring R11.

It will be assumed that an input for the second congestion control node A2 is excessive in the second congestion control node A2. In this event, although the priority is reversed, a stored frame amount for the transit buffer in the second congestion control node A2 exceeds an upper limit (which is herein equal to 8 kilobits). Under the circumstances, the second congestion control node A2 detects congestion occurrence in the first one-way ring R11. In this embodiment, detection of the congestion occurrence is carried out in the transit buffer and detection of the congestion occurrence is not carried out in the transmission buffer.

The second congestion control node A2 measures a transmission rate and a destination node number (or a flow number) of the frames which are supplied from the second client group C2 and which are transferred to the first one-way ring R11. Subsequently, the second congestion control node A2 transmits a congestion notification to the third congestion control node A3 using the second one-way ring R12 with a "the transmission rate÷the flow number" acting as the allowable output amount. It is herein assumed that the frame amount transferred from the second client group C2 to the first one-way ring R11 is equal to 2 Megabit/sec. In this event, inasmuch as the destination node is equal to one of the first congestion control node A1, the second congestion control node A2 transmits, as the allowable output amount, 2 megabits/sec÷1=2 megabits/sec.

The second congestion control node A2 periodically sends the allowable output amount toward the third congestion control node A3 while the second congestion control node A2 detects the congestion in the output side of the first one-way ring R11.

Inasmuch as the second congestion control node A2 does not detect congestion at an output side of the second one-way ring R12, the second congestion control node A2 periodically sends congestion notification indicative of no congestion occurrence (NULL) toward the first congestion control node A1 using the first one-way ring R11.

The first congestion control node A1 receives the congestion notification including NULL information and cancels this notification.

The second congestion control node A3 receives the congestion notification including the allowable output amount, confirms that a sending source of the congestion notification is not its own node, confirms that the contents of the notification is not NULL, and transmits the congestion notification to the fourth congestion control node A4 using the second one-way ring R12.

Transmitted from the third congestion control node A3, the congestion notification is successively received and transferred in the fourth congestion control node A4 and the first congestion control node A1 and is turned back to the second congestion control node A2 by travelling around the second one-way ring R12. When the second congestion control node A2 receives the congestion notification which its own node sends, the second congestion control node A2 cancels this notification and closes transfer of the congestion notification.

Inasmuch as the third congestion control node A3 receives the congestion notification from the second one-way ring R12, the third congestion control node A3 estimates that congestion occurs in the first one-way ring R11. Inasmuch as the first one-way ring R11 is used for a path to the second congestion control node A2 acting as a sending source node of notification by referring to the routing table, the third congestion control node A3 recognizes that its own node relates to the congestion.

Inasmuch as the sending source of the congestion notification is the second congestion control node A2, the third congestion control node A3 estimates that the congestion occurs in the output side of the second congestion control node A2 in the first one-way ring R11. In addition, the third congestion control node A3 estimates, by referring to the routing table, that the frames which are transmitted toward the first one-way ring R11 and which are node destination having a cost larger than a cost (which is herein equal to 1) for the second congestion control node A2 pass through the congestion link.

It will be assumed that a path for the first congestion control node A1, which is set in the routing table of the third congestion control node A3, is the first one-way ring R11 and a cost therefor is equal to 2. In this event, the third congestion control node A3 estimates that the frames for the first congestion control node A1 pass through the congestion link.

Inasmuch as the flow number flowing in the first congestion control node A1 is equal to 1 in the third congestion control node A3 and the flow number flowing the first congestion control node A1 is equal to 1, a weighing factor is equal to 1. As a result, the third congestion control node A3 restricts an output of the transmission buffer for the first congestion control node A1 so as to 2 megabits/sec which is the allowable output amount notified by the congestion notification.

Inasmuch as all of the frames transmitted from the third client group C3 toward the first client group C1 pass through the transmission queue for the first congestion control node A1 in the third congestion control node A3, an output of this queue is restricted to 2 Megabits/sec and the frames transmitted from the third client group C2 toward the first client group C1 are supplied to the second congestion control node A2 at a rate of 4 Megabits/sec.

Inasmuch as the rate of the frame supplied from the first one-way ring R11 is decreased to 4 megabits/sec in the second congestion control node A2, it is possible for the second congestion control node A2 to transmit the frames supplied from the second client group C2 toward the first one-way ring R11 at a rate of 8 megabits/sec.

Inasmuch as the rate of the frames supplied from the first one-way ring R11 is decreased to 2 megabits/sec in the second congestion control node A2, the used amount of the transit buffer in the second congestion control node A2 becomes lower. When the used amount of the transit buffer is not more than a threshold value, the second congestion control node A2 removes the congestion detection in the output side of the first one-way ring R11.

When all of nodes do not receive the congestion notification where the allowable output amount is designated, all of nodes periodically ease restriction of the buffer output amount.

When the third congestion control node A3 raises a rate of the output in the transmission queue, the congestion is detected in the second congestion control node A2 again and the above-mentioned operation is repeated. When there is no change in the flows where the client groups transmit, the allowable output amount gradually increases whenever the congestion is detected, the output amounts of the second congestion control node A2 and of the third congestion control node A3 gradually converge so as to approach 5 megabits/sec obtained by dividing the ring band into two equal parts, and an unbiased band division is carried out.

Referring now to FIG. 1, the description will be made as regards operation of the congestion control in a case where only two types of the transmission queues of control/non-control are set using a concrete example in detailed.

A case where only two types as the transmission queues are set, in comparison with a case where the transmission queues are set each destination congestion control node, differs in a point where the set queues are few and a memory amount is little and a point where a setting for classifying each flow into two transmission queues "with restriction" and "without restriction" is carried out.

In FIG. 1, it will be assumed that a rate of each link for linking the first client group C1 with the first congestion control node A1, the second client group C2 with the second congestion control node A2, the third client group C3 with the third congestion control node A3, and the fourth client group C4 with the fourth congestion control node A4 is equal to 100 Megabits/sec and a rate of the first one-way ring R11 and of the second one-way ring R12 is equal to 10 megabits/sec.

It will be assumed that a client belonging to the third client group C3 transmits frames having a rate of 8 Megabits/sec toward a client belonging to the first client group C1 via the first one-way ring R11. In this state, inasmuch as the frame transmission rate is less than the bandwidth of the first one-way ring R11 and no congestion occurs.

In the third congestion control node A3, all of the frames transmitted from the client group C3 toward the first client group C1 pass through the transmission buffer of "without restriction."

It will be assumed that a client belonging to the second client group C2 transmits frames having a rate of 8 Megabits/sec toward a client belonging to the first client group C1 via the first one-way ring R11.

As far as the used amount of the transit buffer used in packets flowing in the first one-way ring R11 does not exceed a lower limit (which is herein equal to 5 kilobits) in the second congestion control node A2, the frames supplied with the second client group C2 and delivered to the first one-way ring R11 are transmitted toward the first one-way ring R11 in preference to the frames supplied from the first one-way ring R11.

In the second congestion control node A2, all of the frames transmitted from the second client group C2 toward the first client group C1 pass through the transmission buffer of "without restriction."

Inasmuch as the frames transmitted from the third client C3 already flow in the output side of the first one-way ring R11 in the second congestion control node A2, the output frame amount for the first one-way ring R11 in the second congestion control node A2 is more than the bandwidth of the first one-way ring R11 and congestion occurs in the output side for the first one-way ring R11 in the second congestion control node A2.

It will be assumed that the used amount of the transit buffer in the second congestion control node A2 does not reach the lower limit. Inasmuch as the frames transmitted from the second client group C2 is in preference to the frames supplied to the second congestion control node A2 via the first one-way ring R11, the frames supplied to the second congestion control node A2 via the first congestion control node A2 are stored in the transit buffer of the second congestion control node A2.

It will be assumed that the used amount of the transit buffer in the second congestion control node A2 exceeds the lower limit. In this event, a priority is reversed and the frames supplied to the second congestion control node A2 via the first one-way ring R11 is in preference to the frames which are transmitted from the second client group C2 and which flow in the first one-way ring R11.

It will be assumed that an input to the second congestion control node A2 is excessive. In this event, a stored frame amount for the transit buffer in the second congestion control node A2 exceeds an upper limit (which is herein equal to 8 kilobits). Under the circumstances, the second control node A2 detects congestion occurrence in the first one-way ring R11.

The second congestion control node A2 measures a transmission rate and a destination node number (that is, a flow number) of the frames which are supplied from the second client group C1 and which are transferred to the first one-way ring R11. In addition, the second congestion control node A2 calculates "the transmission rate÷the flow number" as the allowable output amount and transmits congestion notification with the allowable output amount to the third congestion control node A3 using the first one-way ring R11. Herein, it will be assumed that the amount of the frames transferred from the second client group C2 to the first one-way ring R11 is equal to 2 megabits/sec. Inasmuch as the destination node is one of the first congestion control node A1, the second congestion control node A2 transmits 2 megabits/sec÷1=2 megabits/sec as the allowable output amount.

While the second congestion control node A2 detects the congestion in the output side of the first one-way ring R11, the second congestion control node A2 periodically sends the allowable output amount toward the third congestion control node A3.

Inasmuch as the second congestion control node A2 does not detect congestion in the output side of the second one-way ring R12, the second congestion control node A2 periodically sends the congestion notification indicative of no congestion occurrence (NULL) toward the first congestion control node A1 via the first one-way ring R11.

The first congestion control node A1 receives the congestion notification including NULL information and cancels this notification.

The third congestion control node A3 receives the congestion notification including the allowable output amount from the second one-way ring R12, confirms that a sending source of the congestion notification is not its own node, confirms that contents of the notification is not NULL, and transfers the congestion notification to the fourth congestion control node A4 using the second one-way ring R12.

Sent from the third congestion control node A3, the congestion notification is successively received and transferred in the fourth congestion control node A4 and the first congestion control node A1 and turns buck to the second congestion control node A2 by traveling around the second one-way ring R12. When the second congestion control node A2 receives the congestion notification generated from its own node, the second congestion control node A2 cancels this notification and closes transfer of the congestion notification.

Inasmuch as the third congestion control node A3 receives the congestion notification from the second one-way ring R12, the third congestion control node A3 estimates that the congestion occurs in the first one-way ring R11. In addition, inasmuch as the first one-way ring R11 is used as a path for the second congestion control node A2 by referring the routing table, the third congestion control node A3 recognizes that there is a possibility that its own node relates to the congestion.

Inasmuch as the sending source of the congestion notification is the second congestion control node A2, the third congestion control node A3 estimates that the congestion occurs in the output side of the second congestion control node A2. In addition, by referring the routing table, the third congestion control node A3 estimates that the frames which are transmitted toward the first one-way ring R11 and which are for the node having a cost larger than a cost (which is herein equal to 1) for the second congestion control node A2 pass through the congestion link.

It will be assumed that a path for the first congestion control node A1 set in the routing table of the third congestion control node A3 is the first one-way ring R11 and a cost thereof is equal to 2. In this event, the third congestion control node A3 estimates that the frames for the first congestion control node A1 pass through the congestion link.

Inasmuch as the flow number passing through the congestion link is equal to 1 in the third congestion control node A3, a weighting factor is equal to 1. As a result, the third congestion control node A3 restricts an output of the buffer "with restriction" so as to become 2 Megabits/sec which is the allowable output amount notified by the congestion notification. In this event, the third congestion control node A3 carries out setting of the input classification part so that the flow passing through the congestion link passes through the transmission queue with restriction.

Inasmuch as all of the frames transmitted from the third client group C3 toward the first client group C1 pass through the transmission queue "with restriction" in the third congestion control node A3, an output of this queue is restricted to 2 megabits/sec and the frames transmitted from the third client group C3 toward the first client group C1 are supplied to the second congestion control node A2 at a rate of 2 megabits/sec.

Inasmuch as the rate of the frames supplied from the first one-way ring R11 is decreased to 2 Megabits/sec in the second congestion control node A2, it is possible for the second congestion control node A2 to transmit the frames supplied from the client group C2 toward the first one-way ring R11 at a rate of 8 megabits/sec.

Inasmuch as the rate of the frames supplied from the first one-way ring R11 decreases to 2 Megabits/sec in the second congestion control node A2, the used amount for the transit buffer in the second congestion control node A2 becomes lower. When the used amount for the transit buffer is more than a threshold value, the second congestion control node A2 releases the congestion detection in the output side of the first one-way ring R11.

When all of nodes do not receive the congestion notification where the allowable output amount is designated, all of nodes periodically ease restriction of the buffer output amount. The third congestion control node A3 gradually increases an output of the transmission queues with restriction that is restricted to 2 megabits/sec.

If the output amount of the queues with restriction and of the queue without restriction are equal to each other by easing the restriction, a use of the queue with restriction is stopped and all of flows are classified into the queue without restriction.

When the third congestion control node A3 raises a rate of the output in the transmission queue, the congestion is detected in the second congestion control node A2 again and the above-mentioned operation is repeated. When there is no change in the flows where the client groups transmit, the allowable output amount gradually increases whenever the congestion is detected, the output amounts of the second congestion control node A2 and of the third congestion control node A3 gradually converge so as to approach 5 Megabits/sec obtained by dividing the ring band into two equal parts, and an unbiased band division is carried out.

Referring to FIG. 1, the description will be made as regards operation of the congestion control in a case where the transmission queues are set each cost for a destination node using a concrete example in detailed.

A case where the transmission queues are set each cost for a destination node, in comparison with a case where the transmission queues are set each destination congestion control node, differs a point that set queues are few and a used memory amount is little. Compared with a case where the queues are classified into two transmission queues such as "with restriction" and "without restriction", the case where the transmission queues are set each cost for the destination node differs a point that more detailed control can be made.

In FIG. 1, it will be assumed that a rate of each link for linking the first client group C1 with the first congestion control node A1, for linking the second client group C2 with the second congestion control node A2, for linking the third client group C3 with the third congestion control node A3, and for linking the fourth client group C4 with the fourth congestion control node A4 is equal to 100 Megabit/sec while a rate of the first one-way ring R11 and of the second one-way ring R12 is equal to 10 Megabit/sec.

Now, it will be assumed that a client belonging to the third client group C3 transmits frames each having a rate of 8 Megabits/sec toward a client belonging to the first client group C1 via the first one-way ring R11. In this event, inasmuch as a frame transmission rate is less than a bandwidth of the first one-way ring R11, no congestion occurs.

It will be assumed that costs for the first, the second, and the fourth congestion control nodes A1, A2, and A4 are set with 25, 12, and 8 in the routing table of the third congestion control node A3 and the transmission queues are divided into three divisions of costs 0-9, 10-19, and 20-29.

Inasmuch as all of the frames transmitted from the third client group C3 toward the first client group C1 pass through the transmission buffer having the cost of 20-29 because the cost for the first congestion control node A1 is equal to 25.

Subsequently, it will be assumed that a client belonging to the second client group C2 transmits frames each having a rate of 8 Megabits/sec toward a client belonging to the first client group C1 via the first one-way ring R11.

In this event, as far as a used amount of the transit buffer which packets flowing the first one-way ring R11 use does not exceed a lower limit value (which is herein 5 kilobits) in the second congestion control node A2, the frames supplied from the second client group C2 and produced to the first one-way ring R11 are transmitted toward the first one-way ring R11 in preference to frames supplied from the one-way ring R11.

It will be assumed that costs for the first, the third, and the fourth congestion control nodes A1, A3, and A4 are set with 13, 12, and 20 in the routing table of the second congestion control node A2 and the transmission queues are divided into three divisions of costs 0-9, 10-19, and 20-29.

Inasmuch as all of the frames transmitted from the second client group C2 toward the first client group C1 pass through the transmission buffer having the cost of 10-19 because the cost for the first congestion control node A1 is equal to 13.

Inasmuch as the frames transmitted from the third client group C3 already flow in the first one-way ring R11, the output frame amount for the first one-way ring R11 in the second congestion control node A2 is more than the bandwidth of the first one-way ring R11 and congestion occurs at an output side for the first one-way ring R11 in the second congestion node A2.

It will be assumed that the used amount for the transit buffer in the second congestion control node A2 does not reach the lower limit. Inasmuch as the frames transmitted from the second client group C2 is in preference to the frames supplied from the first one-way ring R11 to the second congestion control node A2, the frames supplied from the first one-way ring R11 to the second congestion control node A2 are stored in the transmission buffer of the second congestion control node A2.

It will be assumed that the used amount for the transit buffer in the second congestion control node A2 exceeds the lower limit value. In this event, priority is reversed and the frames supplied from the first one-way ring R11 to the second congestion control node A2 becomes in preference to the frames which are transmitted from the second client group C2 and which flow in the first one-way ring R11.

It will be assumed that an input for the second congestion control node A2 is excessive in the second congestion control node A2. In this event, a stored frame amount for the transit buffer in the second congestion control node A2 exceeds an upper limit value (which is herein equal to 8 kilobits). Under the circumstances, the second congestion control node A2 detects congestion occurrence in the first one-way ring R11.

The second congestion control node A2 measures a transmission rate and a destination node number (or a flow number) of the frames which are supplied from the second client group C2 and which are transferred to the first one-way ring R11. Subsequently, the second congestion control node A2 calculates "the transmission rate÷the flow number" as the allowable output amount and transmits a congestion notification to the third congestion control node A3 using the second one-way ring R12 with the allowable output amount. It is herein assumed that the frame amount transferred from the second client group C2 to the first one-way ring R11 is equal to 2 megabits/sec. In this event, inasmuch as the destination node is equal to one of the first congestion control node A1, the second congestion control node A2 transmits, as the allowable output amount, 2 megabits/sec÷1=2 megabits/sec.

The second congestion control node A2 periodically sends the allowable output amount toward the third congestion control node A3 while the second congestion control node A2 detects the congestion in the output side of the first one-way ring R11.

Inasmuch as the second congestion control node A2 does not detect congestion at an output side of the second one-way ring R12, the second congestion control node A2 periodically sends congestion notification indicative of no congestion occurrence (NULL) toward the first congestion control node A1 using the first one-way ring R11.

The first congestion control node A1 receives the congestion notification including NULL information and cancels this notification.

The second congestion control node A3 receives the congestion notification including the allowable output amount, confirms that a sending source of the congestion notification is not its own node, confirms that the contents of the notification is not NULL, and transmits the congestion notification to the fourth congestion control node A4 using the second one-way ring R12.

Sent from the third congestion control node A3, the congestion notification is successively received and transferred in the fourth congestion control node A4 and the first congestion control node A1 and is turned back to the second congestion control node A2 by travelling around the second one-way ring R12. When the second congestion control node A2 receives the congestion notification which its own node sends, the second congestion control node A2 cancels this notification and closes transfer of the congestion notification.

Inasmuch as the third congestion control node A3 receives the congestion notification from the second one-way ring R12, the third congestion control node A3 estimates that congestion occurs in the first one-way ring R11. Inasmuch as the first one-way ring R11 is used for a path to the second congestion control node A2 by referring to the routing table, the third congestion control node A3 recognizes that its own node relates to the congestion.

Inasmuch as the sending source of the congestion notification is the second congestion control node A2, the third congestion control node A3 estimates that the congestion occurs in the output side of the second congestion control node A2. In addition, by referring to the routing table, the third congestion control node A3 estimates that the frames which are transmitted toward the first one-way ring R11 and which are node destination having a cost larger than a cost for the second congestion control node A2 pass through the congestion link.

Inasmuch as the cost for the second congestion control node A2 is equal to 12, the third congestion control node A3 estimates that two queues having the cost of 10-19 and the cost of 20-29 relate to the congestion.

Inasmuch as a total of the flow number flowing the queues having the cost of 10-19 and the cost of 20-29 is equal to 1 in the third congestion control node A3, a weighing factor is equal to 1. As a result, the third congestion control node A3 restricts outputs of the two transmission buffers having the cost of 10-19 and the cost of 20-29 so as to 2 megabits/sec which is the allowable output amount notified by the congestion notification.

Inasmuch as all of the frames transmitted from the third client group C3 toward the first client group C1 pass through the transmission queue having the cost of 20-19 in the third congestion control node A3, an output of this queue is restricted to 2 Megabits/sec and the frames transmitted from the third client group C2 toward the first client group C1 are supplied to the second congestion control node A2 at a rate of 2 megabits/sec.

Inasmuch as the rate of the frame supplied from the first one-way ring R11 is decreased to 2 megabits/sec in the second congestion control node A2, it is possible for the second congestion control node A2 to transmit the frames supplied from the second client group C2 toward the first one-way ring R11 at a rate of 8 megabits/sec.

Inasmuch as the rate of the frames supplied from the first one-way ring R11 is decreased to 2 megabits/sec in the second congestion control node A2, the used amount of the transit buffer in the second congestion control node A2 becomes lower. When the used amount of the transit buffer is not more than a threshold value, the second congestion control node A2 removes the congestion detection in the output side of the first one-way ring R11.

When all of nodes do not receive the congestion notification where the allowable output amount is designated, all of nodes periodically ease restriction of the buffer output amount. The third congestion control node A3 gradually increases an input of the transmission queue for node destination of the cost of 10-19 and queue for node destination for the cost 20-19 which are restricted to 2 megabits/sec.

When the third congestion control node A3 raises a rate of the output in the transmission queue, the congestion is detected in the second congestion control node A2 again and the above-mentioned operation is repeated. When there is no change in the flows where the client groups transmit, the allowable output amount gradually increases whenever the congestion is detected, the output amounts of the second congestion control node A2 and of the third congestion control node A3 gradually converge so as to approach 5 megabits/sec obtained by dividing the ring band into two equal parts, and an unbiased band division is carried out.

Thereafter, whenever the congestion is detected, the above-mentioned processing is repeated.

Now, the description will be made about merits of the above-mentioned embodiment.

In the first prior art, all of flows inserted in a ring R1 from a node receiving a congestion notification are candidates of a sending amount restriction for the flows and the flows irrelevant to the congestion are also the candidates of the sending amount restriction. As a result, a utilization factor of a link band is degraded.

This embodiment comprises transmission queues preliminarily divided each destination node or the like on the ring R1 in the first congestion control node A1, estimates the queues related to congestion on reception of congestion notification, and makes only outputs of the queues related to the congestion candidates of restriction. Accordingly, a frame sending amount of the flows irrelevant to the congestion is unreasonably not restricted and it is possible to effectively use a link band.

Inasmuch as, in the first prior art, a restriction output amount is not set each destination node but is set at all of transmission frame amounts produced by transmitting nodes (that is, congestion control nodes transferring frames received from client groups to the ring), a band assigned to each flow is larger in a sending source node having a few destination node number while a band assigned to each flow is smaller in a sending source node having a much destination node number. As a result, impartiality between respective flows is not maintained.

Inasmuch as this embodiment disposes the queues each destination node and can set available bands each destination node, there is no difference of the available bands between flows and it is possible to maintain impartiality between the flows.

In order to maintain impartiality of a used link band of each flow in the second prior art, it is necessary to transmit a control message corresponding to congestion notification in this embodiment each flow.

In contrast, it is possible for this embodiment to maintain impartiality of a used link band of each flow by only transmitting congestion notification each node detecting congestion occurrence. Accordingly, inasmuch as transmission times of the congestion notification are independent of a flow number, it is possible to maintain impartiality between flows without increasing the transmission times of the congestion notification although flows increase.

Figure 9:
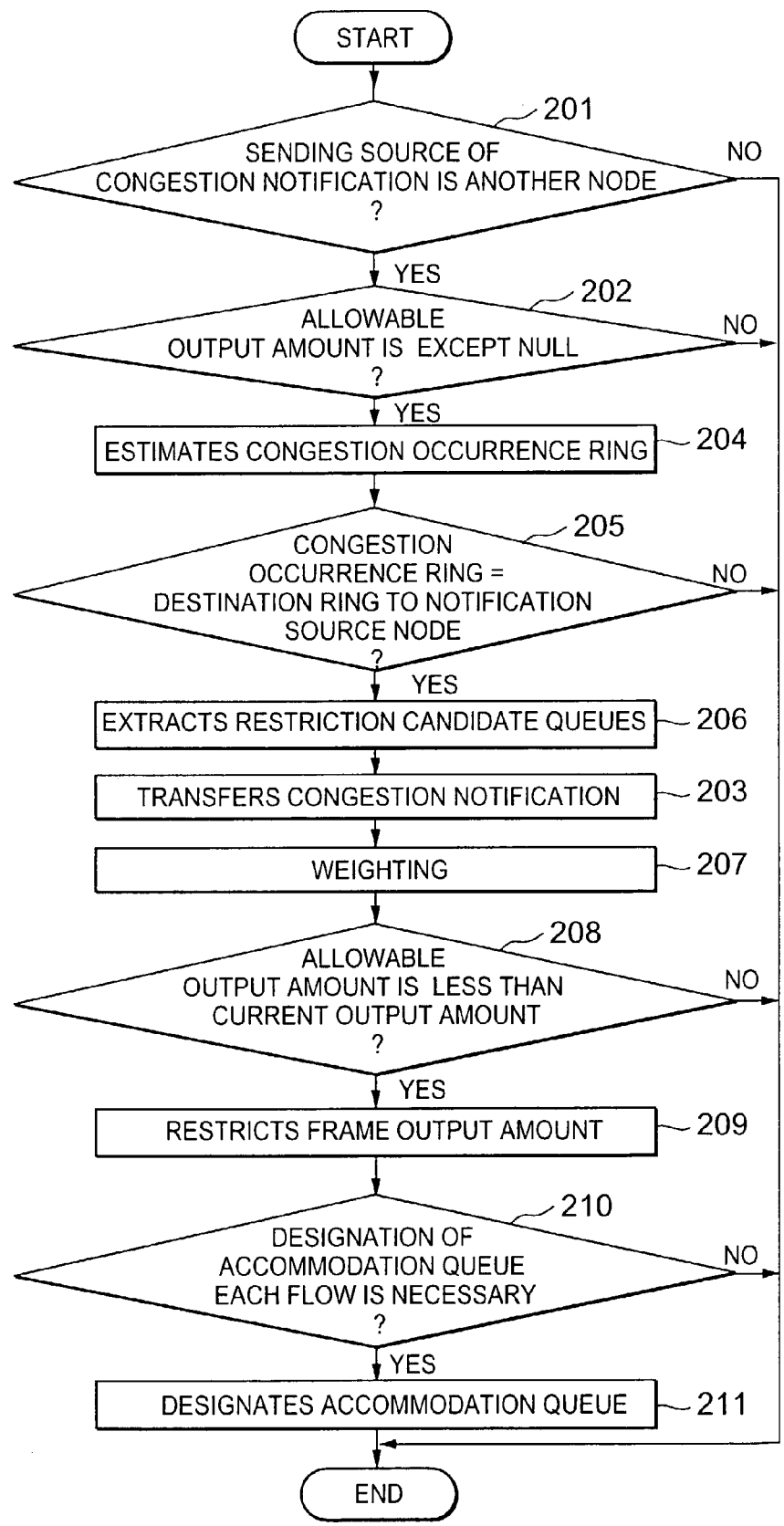
FIG. 9 is a flowchart for use in describing operation on reception of congestion notification in a congestion control system according to a second embodiment of this invention.

Referring now to FIG. 9, the description will proceed according to a second embodiment of this invention.

The second embodiment of this invention corresponds to a case where operation in the congestion notification reception transfer portion A134 on reception of congestion notification is changed in the first embodiment of this invention.

In the second embodiment of this invention, steps 201-211 in FIG. 9 carry out operations similar to the steps 201-211 in the first embodiment of this invention illustrated in FIG. 8.

Referring to FIG. 9, the second embodiment of this invention is different from the first embodiment of this invention illustrated in FIG. 8 at a point where the operation for transferring the received congestion notification frame to the adjustment node (step 3) is carried out after the operation for determining the queues for restriction candidates (steps 204-206).

With this structure, when it is determined that its own node has no relation to congestion in the step 205, the congestion notification reception transfer portion A134 can estimate that nodes in downstream than its own node receiving the congestion notification laid on the one-way ring has also no relation to congestion due to the ring characteristic. Accordingly, transfer of the congestion notification in the step 203 is not carried out.

Now, the description will be made as regards merit in the second embodiment of this invention.

It is possible for the second embodiment of this invention to stop transfer of the notification before the congestion notification goes round the ring when it may be determined in the congestion control node that an effect is not obtained although the congestion notification is transferred moreover. As a result, it is possible to decrease consumption in the ring band due to the transfer of redundant congestion notification.

Figure 10:
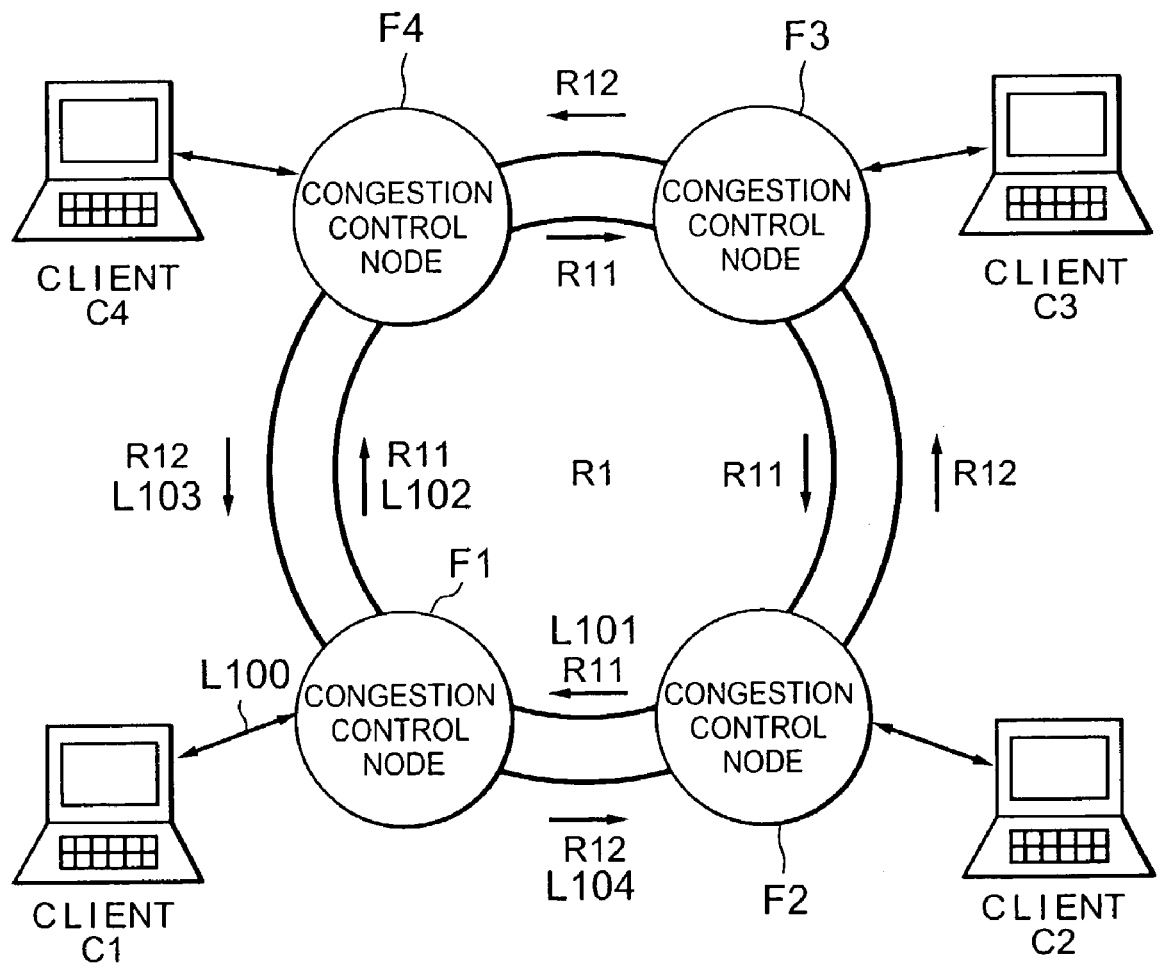
FIG. 10 is a block diagram of a congestion control system according to a third embodiment of this invention.
Figure 11:
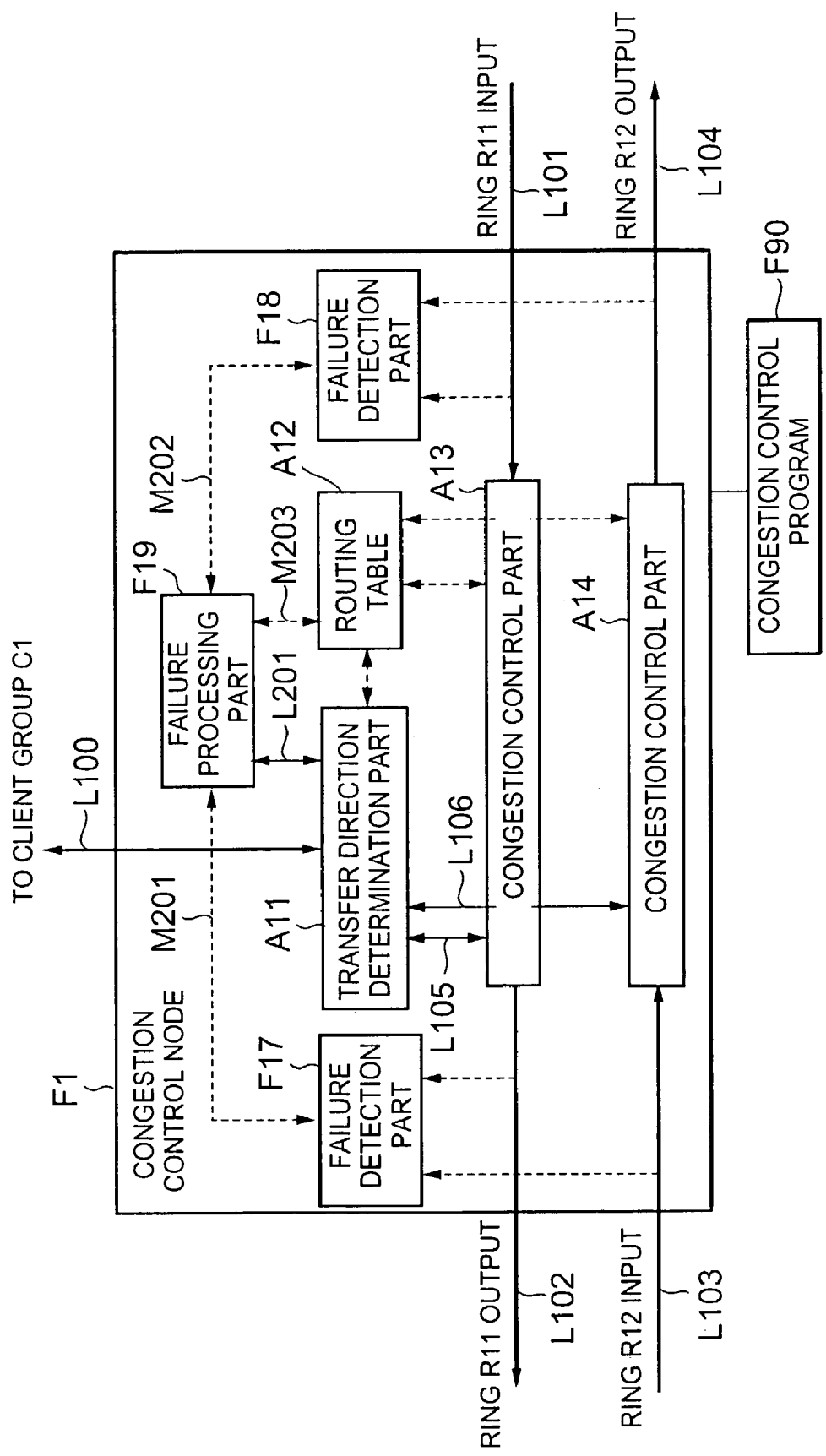
FIG. 11 is a block diagram of a congestion control unit with a failure detection function for use in the congestion control system illustrated in FIG. 10.

Referring to FIGS. 10 and 11, the description will proceed to a congestion control system according to a third embodiment of this invention. The illustrated congestion control system according to the third embodiment of this invention corresponds to a case where a failure processing function is added to each congestion control node in the congestion control system according to the first embodiment of this invention.

Referring to FIG. 10, the congestion control system according to the third embodiment of this invention is different from the congestion control system according to the first embodiment of this invention illustrated in FIG. 1 in a point where the congestion control system according to the third embodiment of this invention comprises first through fourth congestion control nodes F1, F2, F3, and F4 in lieu of the first through the fourth congestion control nodes A1 to A4.

Each of the second through the fourth congestion control nodes F2 to F4 has structure similar to that of the first congestion control node F1. Although the description will proceed to only the first congestion control node F1 in behalf of the first through the fourth congestion control nodes F1 to F4, description relating to the first congestion control node F1 can be similarly applied to those relating to the second through the fourth congestion control nodes F2 to F4 unless any notice is made particularly.

FIG. 11 is a view showing structure of the first congestion control node F1 in detailed. The first congestion control node F1 comprises the transfer direction determination part A11, the routing table A12, the first and the second congestion control parts A13 and A14, a first failure detection part F17, a second failure detection part F18, a failure processing part F19, a two-way link L201, and first through third notification lines M201, M202, and M203.

The first failure detection part F17 detects a failure generated in an output to the first one-way ring R11 and a failure generated in an input from the second one-way ring R12 to notify the failure processing part F19 of a detected failure.

The second failure detection part F18 detects a failure generated in an input from the first one-way ring R11 and a failure generated in an output to the second one-way ring R12 to notify the failure processing part F19 of a detected failure.

The failure processing part F19 has first through third functions depicted at (1) to (3) as follows:

(1) The failure processing part F19 rewrites the routing table A12 using the third notification line M203 on the basis of failure information notified from the first or the second failure detection parts F17 or F18 via the first or the second notification lines M201 or M202;

(2) The failure processing part F19 sends a failure notification frame toward the transfer direction determination part A11 through the two-way link L201 to transmit a generated failure to the failure processing part F19 in other congestion control nodes; and (3) The failure processing part F19 rewrites the routing table A12 on the basis of the failure notification frame which is transmitted from the other failure processing part F19 and which is received in the transfer direction determination part A11 through the two-way link L201.

At any rate, a combination of the first and the second failure detection parts F17 and F18 and the failure processing part F19 acts as a failure detection arrangement for detecting a failure where communications cannot make on the network to produce section information indicative of a section on the network where the failure is occurred. The failure processing part F19 acts as a failure notifying arrangement for notifying the other congestion control nodes on the network of a failure notification as the section information.

In addition, the failure processing part F19 serves as a failure receiving arrangement for receiving the failure notification from other congestion control nodes on the network to produce a received failure notification. The failure processing part F19 also serves as a failure processing arrangement for changing the routing table A12 on the basis of the received failure notification to make the section where the failure is detected in the network avoid from the transfer path.

Furthermore, the failure processing part F19 is operable as an arrangement for canceling transfer of the failure notification for a particular congestion node transferred on the network when the failure occurs in the transfer path to the particular congestion control node.

The two-way link L201 is a two-way link which goes toward the failure processing part F19 from the transfer direction determination part A11 and which goes toward the transfer direction determination part A11 from the failure processing part F19.

The first notification line M201 is a two-way notification line between the first failure detection part F17 and the failure processing part F19.

The second notification line M202 is a two-way notification line between the second failure detection part F18 and the failure processing part F19.

The second notification line M203 is a two-way notification line between the routing table A12 and the failure processing part F19.

Although the first congestion control node F1 is implemented by hardware, the first congestion control node F1 may be implemented by loading a congestion control program F90 which are a computer program comprising each function in a memory of a computer processing unit. The congestion control program F90 is stored in a magnetic disk, a semiconductor memory, or other recording media. In addition, the above-mentioned functions are implemented by loading the congestion control program F90 from the recording medium in the computer processing unit to control operations of the computer processing unit.

Referring now to FIG. 10, the description will be made as regards operation of the congestion control in a case where the transmission queues each destination congestion control node are set on failure occurrence using a concrete example in detailed.

In FIG. 10, it will be assumed that a rate of each link for linking the first client group C1 with the first congestion control node F1, for linking the second client group C2 with the second congestion control node F2, for linking the third client group C3 with the third congestion control node F3, and for linking the fourth client group C4 with the fourth congestion control node F4 is equal to 100 Megabits/sec while a rate of the first one-way ring R11 and of the second one-way ring R12 is equal to 10 megabits/sec.

It will be assumed that failures occur in the ring R1 at both of first one-way ring R11 and the second one-way ring R12 between the first congestion control node F1 and the second congestion control node F2. It will be assumed that the failures are already detected in the first and the second congestion control nodes F1 and F2 and failure notification is delivered to all of nodes laid in the ring R1.

In all of nodes, change of the routing information is completed due to the failure notification. A detour route is set in the routing information so that a link between the first congestion control node F1 and the second congestion control node F1 is not pass through.

A client belonging to the third client group C3 transmits a frame at a rate of 8 megabits/sec toward a client belonging to the first client group C1 through the second one-way ring R12. In this state, inasmuch as a frame transmission rate is less than the bandwidth of the second one-way ring R12, any congestion does not occur.

In the third congestion control node F3, all of frames transmitted toward the first client group C1 from the third client group C3 pass through the transmission buffers for the first congestion control node F1.

Subsequently, a client belong to the second client group C2 transmits a frame at a rate of 8 megabits/sec toward a client belonging to the first client group C1 through the second one-way ring R12.

As long as a used amount of the transit buffer used in a packet flowing the second one-way ring R12 does not exceed a lower limit value (which is herein 5 kilobits) in the third congestion control node F3, the frames which are supplied from the third client group C3 and which are delivered to the second one-way ring R12 are transmitted toward the second one-way ring R12 in preference to the frames supplied from the second one-way ring R12.

In the second congestion control node F2, all of frames transmitted from the second client group C2 toward the first client group C1 pass through the transmission buffer for the first congestion control node F1.

Inasmuch as the frames transmitted from the third client group C3 already flow in the second one-way ring R12, the output frame amount to the second one-way ring R12 in the third congestion control node F3 are more than the bandwidth of the second one-way ring R12 and congestion occurs at the output side to the second one-way ring R12 in the third congestion control node F3.

It will be assumed that the used amount of the transit buffer in the third congestion control node F3 does not reach the lower limit value. In this event, inasmuch as the frames transmitted from the third client group C3 take precedence over the frames supplied to the third congestion control node F3 via the second one-way ring R12, the frames supplied to the third congestion control node F3 via the second one-way ring R12 are stored in the transit buffer of the third congestion control node F3.

It will be assumed that the used amount of the transit buffer in the third congestion control node F3 exceed the lower limit value. In this event, priority is reversed and the frames supplied to the third congestion control node F3 via the second one-way ring R12 take precedence over the frames which are transmitted from the third client group C3 and which flow in the second one-way ring R12.

It will be assumed that input to the third congestion control node F3 is excessive. In this event, processing due to reversal of the priority is too late and a stored frame amount of the transit buffer in the third congestion control node F3 exceeds an upper limit value (which is herein 8 kilobits). Under the circumstances, the third congestion control node F3 detects congestion occurrence in the second one-way ring R12.

The third congestion control node F3 measures a transmission rate and a destination node number (i.e. a flow number)

of the frames transferred from the third client group C3 to the second one-way ring R12. Subsequently, the third congestion control node F3 calculates "the transmission rate÷the flow number" as an allowable output amount and transmits a congestion notification with the allowable output amount to the second congestion control node F2 using the first one-way ring R11. It is herein will be assumed that the frame amount transferred from the third client group C3 to the second one-way ring R12 is 4 megabits/sec. Inasmuch as a destination node is only one of the first congestion control node F1, the third congestion control node F3 transmits, as the allowable output amount, 4 megabits/sec÷1=4 megabits/sec.

While the third congestion control node F3 detects the congestion in the output side of the second one-way ring R12, the third congestion control node F3 periodically sends the allowable output amount toward the second congestion control node F2.

Inasmuch as the third congestion control node F3 does not detect congestion at an output side of the first one-way ring R11, the third congestion control node F3 periodically sends congestion notification indicative of no congestion occurrence (NULL) toward the fourth congestion control node F4 using the second one-way ring R12.

The fourth congestion control node F4 receives the congestion notification including NULL information and cancels this notification. The congestion notification including the NULL information is sure to be cancelled in an adjacent node.

The second congestion control node F2 receives the congestion notification including the allowable output amount, confirms that a generation source of the congestion notification is not its own node, confirms that contents of the notification is not NULL, and tries to transmit the congestion notification to the first congestion control node F1 as the adjacent node using the first one-way ring R11. However, this notification is cancelled because of the failure and transfer of the congestion notification is left off.

Inasmuch as the second congestion control node F2 receives the congestion notification from the first one-way ring R11, the second congestion control node F2 estimates that congestion occurs in the second one-way ring R11. Subsequently, the second congestion control node F2 refers the routing table and recognizes that there is some chance that its own node relates to the congestion on the basis of a result referring to the routing table. This is because the second one-way ring R12 is used to a path to the third congestion control node F3 as the sending source node of notification.

Inasmuch as the generation source of the congestion notification is the third congestion control node F3, the second congestion control node F2 estimates that the congestion occurs at the output side of the third congestion control node F3 in the second one-way ring R12. Subsequently, the second congestion control node F2 refers the routing table and estimates that the frame which is transmitted toward the second one-way ring R12 and which is consigned to a node having a cost larger than a cost (which is herein 1) to the third congestion control node F3 passes through the congestion link.

It will be assumed that a path to the first congestion control node F1 and a cost set in the routing table of the second congestion control node F2 are the second one-way ring R12 and 3, respectively, and a path to the fourth congestion control node F4 and a cost set in the routing table of the second congestion control node F2 are the second one-way ring R12 and 2, respectively. In this event, the second congestion control node F2 estimates that the frames consigned to the first and the fourth congestion control nodes F1 and F4 pass through the congestion link.

Inasmuch as the flow number flowing to the first congestion control node F1 is 1 in the second congestion control node F2, a weighting factor becomes 1. As a result, the second congestion control node F2 restricts the output of the transmission buffer consigned to the first congestion control node F1 so as to become 4 megabits/sec which is the allowable output amount notified by the congestion notification.

Inasmuch as all of the frames transmitted from the second client group C2 toward the first client group C1 pass through the transmission queue consigned to the first congestion control node F1 in the second congestion control node F2, an output of this queue is restricted to 4 megabits/sec and the frames where the second client group C2 transmits toward the first client group C1 are supplied to the third congestion control node F3 at a rate of 4 megabits/sec.

Inasmuch as the rate of the frames supplied from the second one-way ring R12 decreases to 4 megabits/sec, the third congestion control node F3 can transmit the frames supplied from the third client group C3 toward the second one-way ring R12 at the rate of 6 megabits/sec.

Inasmuch as the rate of the frames supplied from the second one-way ring R12 decreases to 4 megabits/sec, the used amount of the transit buffer in the third congestion control node F3 becomes lower. When the used amount of the transit buffer is less than a threshold value, the third congestion control node F3 releases the congestion detection in the output side of the second one-way ring R12.

When all of nodes do not receive the congestion notification where the allowable output amount is designated, all of the nodes periodically relax restriction of the buffer output amount. The second congestion control node F2 gradually increases the output of the transmission queue consigned to the first congestion control node F1 that is restricted to 4 megabits/sec.

Thereafter, when second congestion control node F2 raises the output of the transmission queue, the congestion is detected in the third congestion control node F3 again and the above-mentioned operation is repeated. When the flows transmitted by the client group is not changed and condition of the failure is not changed, the allowable output amount gradually increases whenever the congestion is detected, the output amount of the second congestion control node F2 and of the third congestion control node F3 gradually converges so as to approach 5 megabits/sec where the link band is divided into two equal parts, and an unbiased band division is carried out.

Now, the description will be made as regards merit of this embodiment.

This embodiment can estimate a queue related to congestion and carry out congestion control although a failure occurs in a ring to which the congestion control node belongs and frames pass through a detour path.

In addition, this embodiment can carry out the congestion control enable to maintain impartiality between flows. This is because a frame transmission amount of flows regardless of congestion is not unfairly restricted and there is no difference of available bands between the flows in the manner in the first embodiment.

Furthermore, when a merit is not obtained although the congestion notification is transferred more than this caused by effect of failure, unnecessary transfer of the notification is not carried out because the congestion notification loses at a failure section. Accordingly, it is possible to decrease utilization due to an excess congestion notification of a link band.

Referring to FIGS. 12 through 15, the description will proceed to a congestion control system according to a fourth embodiment of this invention. The illustrated congestion control system according to the fourth embodiment of this invention corresponds to a case of change a method of determining an allowable output amount by a size of U/D which is calculated using a transmission frame amount U from a congestion detection node to a ring and a transmission flow number D from the congestion detection node to the ring in the first embodiment.

Figure 12:
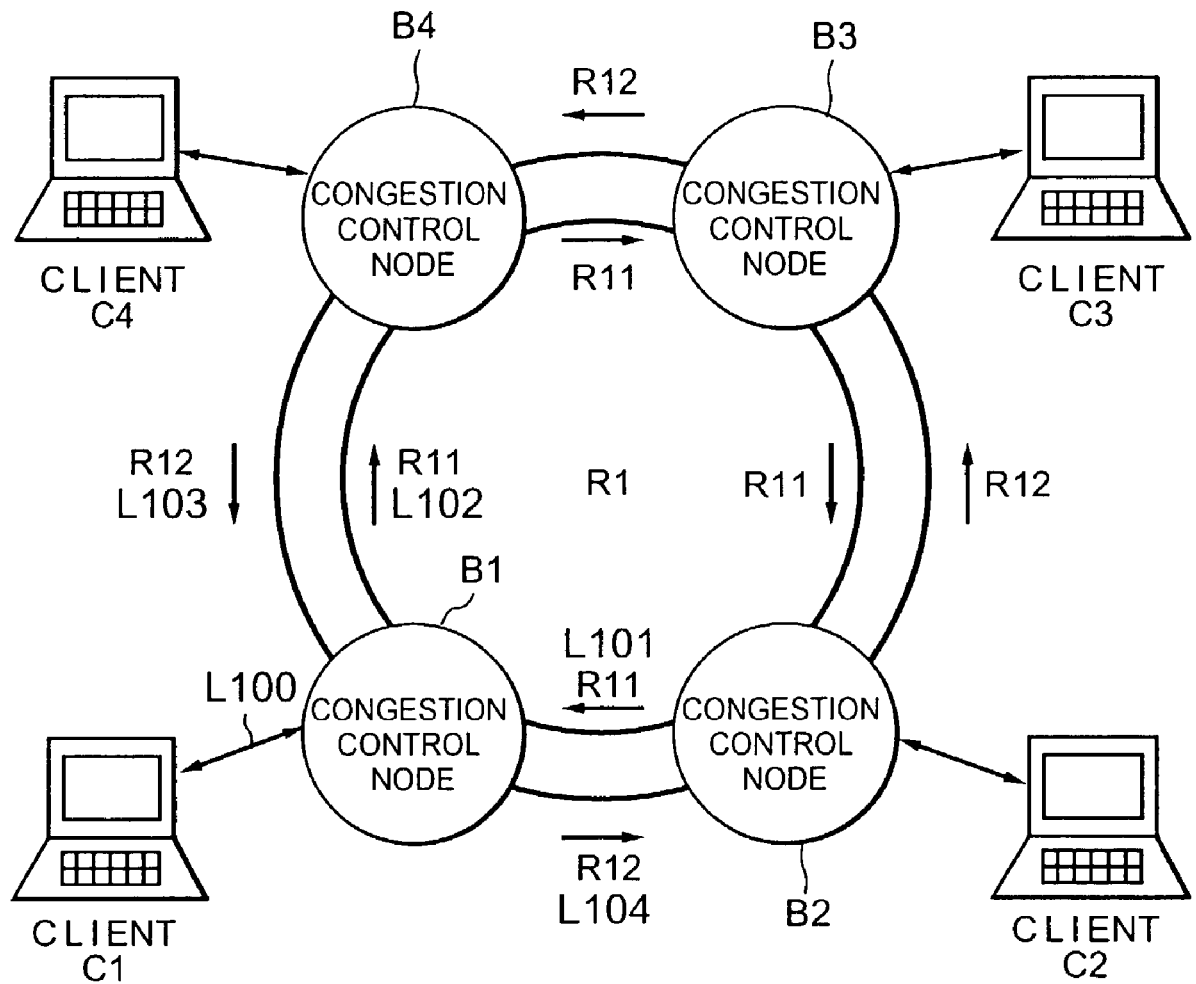
FIG. 12 is a block diagram of a congestion control system according to a fourth embodiment of this invention.

Referring to FIG. 12, the congestion control system according to the fourth embodiment of this invention is different from the congestion control system according to the first embodiment of this invention illustrated in FIG. 1 in a point where the congestion control system according to the fourth embodiment of this invention comprises first through fourth congestion control nodes B1, B2, B3, and B4 in lieu of the first through the fourth congestion control nodes A1 to A4.

Each of the second through the fourth congestion control nodes B2 to B4 has structure similar to that of the first congestion control node B1. Although the description will proceed to only the first congestion control node B1 in behalf of the first through the fourth congestion control nodes B1 to B4, description relating to the first congestion control node B1 can be similarly applied to those relating to the second through the fourth congestion control nodes B2 to B4 unless any notice is made particularly.

Figure 13:
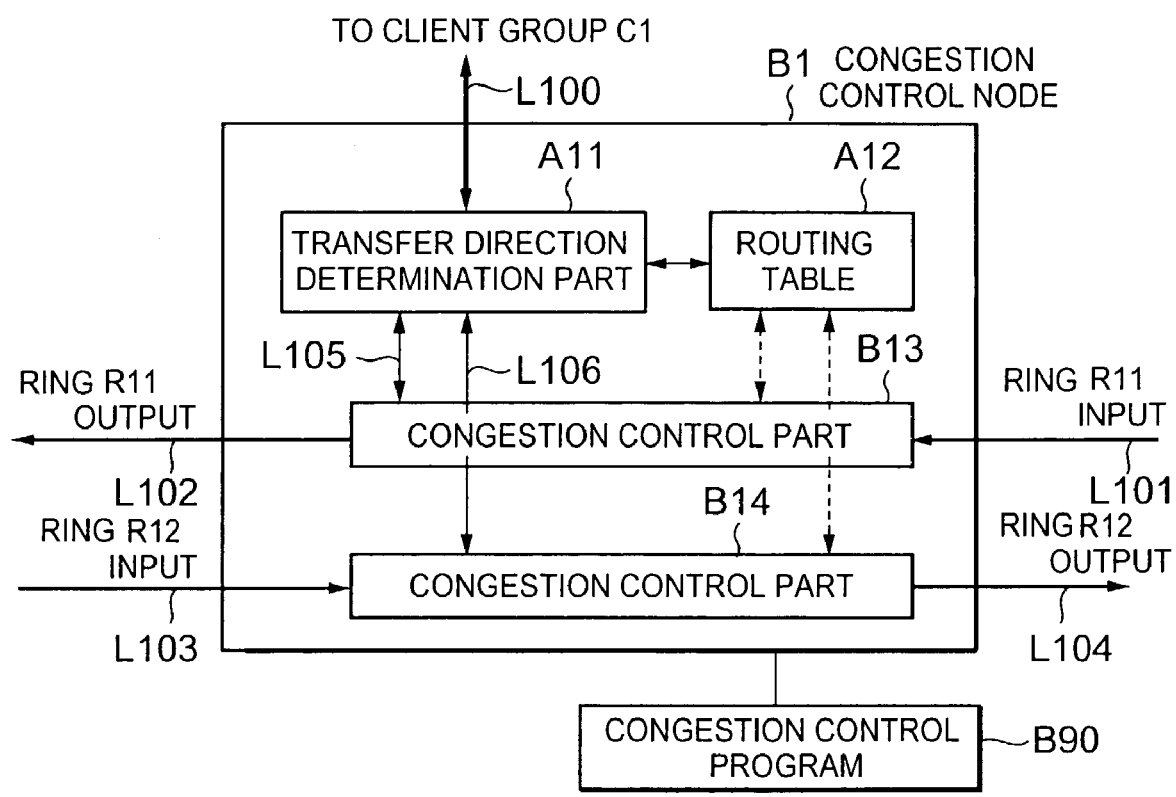
FIG. 13 is a block diagram of a congestion control node for use in the congestion control system illustrated in FIG. 12.

FIG. 13 is a view showing structure of the first congestion control node B1 in detailed. The first congestion control node B1 comprises the transfer direction determination part A11, the routing table A12, a first congestion control part B13, and a second congestion control part B14.

The second congestion control part B14 has structure similar to that of the first congestion control part B13. Although the description will proceed to only the first congestion control part B13 in behalf of the first and the second congestion control parts B13 and B14, description relating to the first congestion control part B13 can be similarly applied to that relating to the second congestion control part B14 unless any notice is made particularly.

Although the first congestion control node B1 is implemented by hardware, the first congestion control node B1 may be implemented by loading a congestion control program B90 which are a computer program comprising each function in a memory of a computer processing unit. The congestion control program B90 is stored in a magnetic disk, a semiconductor memory, or other recording media. In addition, the above-mentioned functions are implemented by loading the congestion control program B90 from the recording medium in the computer processing unit to control operations of the computer processing unit.

Figure 14:
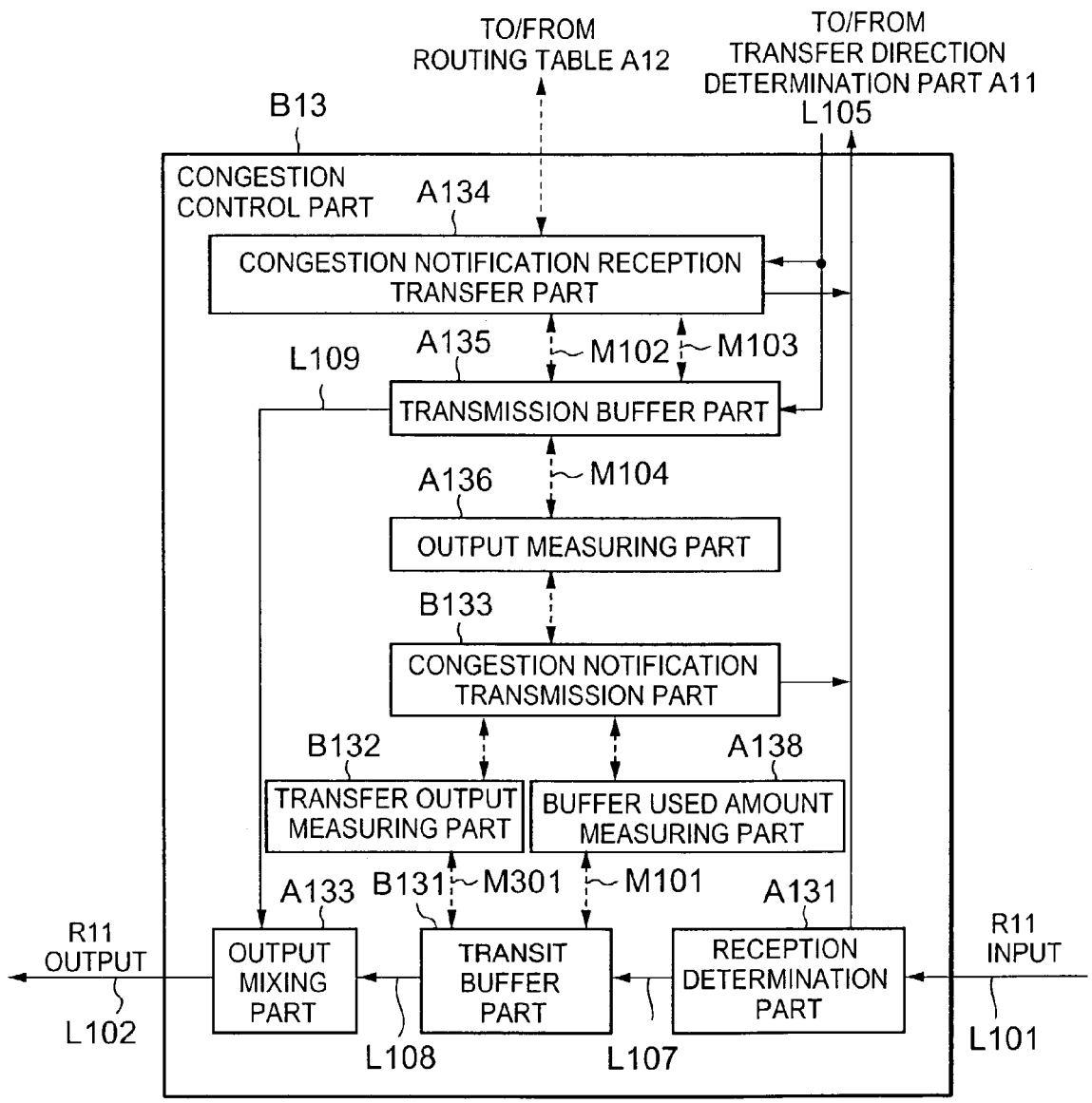
FIG. 14 is a block diagram of a congestion control part for use in the congestion control node illustrated in FIG. 13.

FIG. 14 is a view showing structure of the first congestion control part B13 in detailed. The first congestion control part B13 is similar in structure and operation to the first congestion control part A13 illustrated in FIG. 3 except that the transit buffer part A132 and the congestion notification transmission part A137 are altered to a transit buffer part B131 and a congestion notification transmission part B133, respectively, and a transfer output measuring part B132 and a notification line M301 are added to the first congestion control part B13.

The transit buffer part B131 has first through third functions depicted at (1) to (3) as follows:

(1) The transit buffer part B131 stores frames supplied from the reception determination part A131 via the link L107 until a timing which can send to the second one-way link L102 and transfers the frames at a sendable timing toward the output mixing part A133 via the link L108;

(2) Responsive to a request from the buffer used amount measuring part A138 via the notification line M101, the transit buffer part M131 notifies the buffer used amount measuring part A138 of the number of frames laid in the transit buffer part B131, a bit number, a byte number, and so on via the notification line M101; and (3) Responsive to a request from the transfer output measuring part B132 via the notification line M301, the transit buffer part B131 notifies the transfer output measuring part B132 of the number of frames transferred from the transit buffer part B131 to the output mixing part A133, the bit number, the byte number, the number of transmission queues for storing one or more frames, and so on via the notification line M301.

The transfer output measuring part B132 periodically requests to the transit buffer part B131 so as to notify the transfer output measuring part B132 of the frame number of the frames transferred from the transit buffer part B131 to the output mixing part A133, the bit number, the byte number, the number of the transmission queues for storing one or more frames, and so on and stores notified values until next notification.

The congestion notification transmission part B133 prepares a congestion notification frame using a congestion occurrence detected result obtained from the buffer used amount measuring part A138, a transmission frame amount obtained from the output measuring part A136, a transfer frame amount obtained from the transfer output measuring part B132, and so on and transmits the congestion notification frame via the transfer direction determination part A11 toward a congestion control node laid in upstream of the first one-way ring R11 using the second one-way ring R12.

The notification line M301 is a two-way notification line between the transit buffer part B131 and the transfer output measuring part B132.

Figure 15:
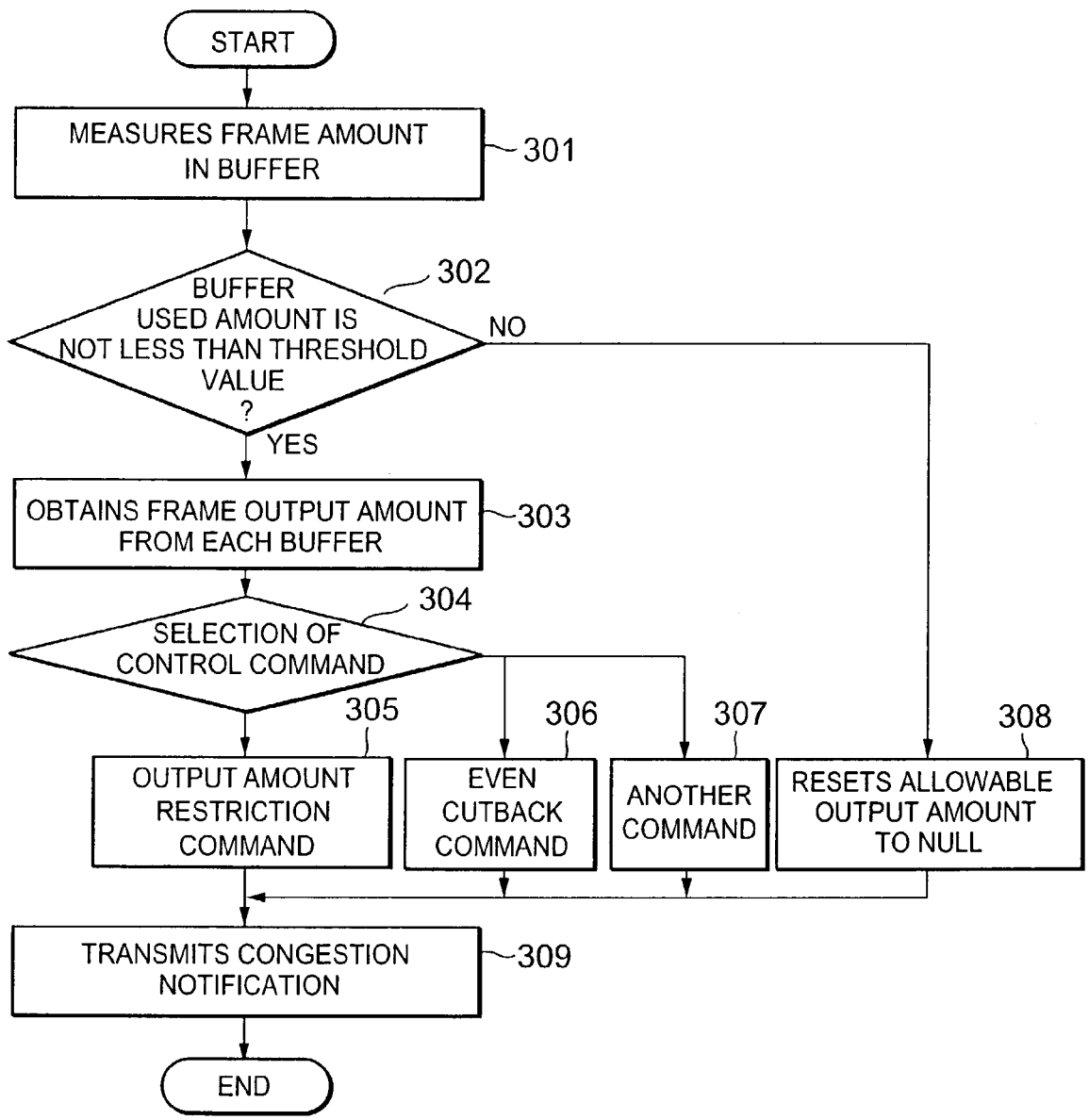
FIG. 15 is a flowchart for use in describing operation on transmission of congestion notification in the congestion control system illustrated in FIG. 12.

Referring to FIG. 15, the description will be made as regards operation of the congestion notification transmission part B133 in a case a congestion control function is effective in the congestion notification transmission part B133 in the fourth embodiment of this invention in detailed.

A difference point between FIG. 15 and FIG. 7 in the first embodiment of this invention is a point to make a control command (congestion control command) included in the congestion notification change according to conditions.

The congestion notification transmission part B133 periodically makes the buffer used amount measuring part A138 confirm the absence or absence of congestion occurrence in the transit buffer part B131 (step 301).

The step 301 is followed by a step 302 at which the congestion notification transmission part B133 receives a notification of the presence or absence of the congestion occurrence from the buffer used amount measuring part A138. When the congestion occurrence is present, the congestion notification transmission part B133 turns processing from the step 302 to a step 301. When the congestion occurrence is absent, the congestion notification transmission part B133 turns processing from the step 302 to a step 307.

At the step 303, the congestion notification transmission part B133 requests of the output measuring part A136 notification of the frame amount U of the frames transferred from the transmission buffer part A135 to the output mixing part A133 and the destination congestion control node number D. An average transmission frame amount for one destination node can be represented by U/D using the frame amount U and the destination congestion control node number D.

The step 303 is succeeded by a step 304 at which the congestion notification transmission part B133 selects a suitable control command using a value of U/D, the congestion occurrence detected result obtained from the buffer used amount measuring part A138, the transfer frame amount obtained from the transfer output measuring part B132, and so on.

When the frame amount of the frames supplied to the first one-way ring R11 from the first congestion control node B1 is sufficiently large, the step 304 proceeds to a step 305 at which the congestion notification transmission part B133 prepares the control command to make a sending amount restrict so that the greatest frame output amount allowed in each flow flowing in the congestion link becomes less the average transmission frame amount per one frame of the congestion control node B1 in the manner as the first embodiment of this invention.

When U/D is less than a threshold value, the step 304 is followed by a step 306 at which the congestion notification transmission part B133 prepares the control command to make the largest frame output amount (the allowable output amount) decrease from a current output amount at a rate because the frame amount of the frames supplied to the first one-way ring R11 from the first congestion control node B1 is not enough.

The congestion notification transmission part B133 prepares the control command to make the flow restrict to a ratio, an average value, a prescribed value, or the like (step 307).

When the data amount in the transit buffer is less than the threshold value, the step 302 is succeeded by the step 308 at which the congestion notification transmission part B133 considers that the congestion does not occur and prepares a NULL command. A node receiving the NULL command does not carry out operation specially although the node receives this command.

A step 309 follows the steps 305, 306, 307, and 308. At the step 309, the congestion notification transmission part B133 transmits a congestion notification including the control command determined by the steps 305-308 using the second one-way ring R12 in the opposite direction to the first one-way ring R11. This congestion notification includes not only the control command determined by the steps 305-308 but also a node ID of a congestion notification sender.

Now, the description will be made as regards operation in the congestion notification reception transfer part A134 on reception of the congestion notification in this embodiment in detailed.

Inasmuch as the operation in the congestion notification reception transfer part A134 on reception of the congestion notification in this embodiment is substantially similar to the operation of the congestion notification reception transfer part A134 in the first embodiment of this invention, the description will be made with reference to FIG. 8. A different point from the first embodiment is a point that, at the step 206, the congestion notification reception transfer part A134 not only restricts so as to become less the allowable output amount reached by the congestion notification but also evenly restricts the flow affected to the congestion at the ratio on the basis of contents of the control command transmitted as the congestion notification.

When the congestion control function is effective in the congestion notification reception transfer part A134, the congestion notification reception transfer part A134 always wait for the congestion notification reached from the transfer direction determination part A11. When the congestion notification is received, a processing is carried out in the order illustrated in FIG. 8.

The congestion notification reception transfer part A134 refers the notification generation node address included in the congestion notification at the step 201.

When the generation node of the congestion notification is another node, the step 201 is followed by the step 202 at which the congestion notification reception transfer part A134 checks the allowable output amount.

When the allowable output amount is the NULL value, the congestion notification reception transfer part A134 comes to an end of a processing.

When the allowable output amount is not the NULL value at the step 202, the step 202 is succeeded by the step 203 at which the congestion notification reception transfer part A134 transfers the received congestion notification to the adjacent congestion control node laid in the input side of the first one-way ring R11 at it is using the second one-way ring R12.

The step 203 proceeds to the step 204 at which the congestion notification reception transfer part A134 identifies a congestion section from ID of the generation source node of notification and ID of the adjacent node for transferring the notification and estimates a flow passing through the congestion section using the routing table A12.

When the congestion notification is not notified by the output amount but by the ratio, the congestion notification reception transfer part A134 regards S×W as the allowable output amount U obtained by multiplying a current restricted output amount S by a notified ratio W. When a queue of the control candidate is used a plurality of flows, the allowable output amount in only this queue is a value of U/D×F obtained by multiplying U/D by a flow number F (steps 206 and 207).

The step S207 is succeeded by the step S208 at which the congestion notification reception transfer part A134 determines whether or not the allowable output amount is less than the current restricted output amount. When the allowable output amount is more than the current restricted output amount, a processing is came to an end.

When the allowable output amount is less than the current restricted output amount at the step S208, the step S208 is succeeded by the step S209 at which the restriction notification reception transfer part A134 sets for the output adjusting part 353 of the transmission buffer part A135 so as to restrict the output frame amount to the allowable output amount determined at the step S207 for each queue acting as the restriction candidate.

The step S209 proceeds to the step S210 at which the congestion notification reception transfer part A134 inquires of the transmission buffer part A135 a classification method of the transmission queue. A processing comes to end except for a case where the transmission queues are classified into two of control/non-control.

When the transmission queues are classified into two of control/non-control, the step 201 is followed by the step 211 at which the congestion notification reception transfer part A134 issues a command to the transmission buffer part A135 so as to accommodate restricted candidate flows in the restriction candidate queue.

The restricted output amount of all queues periodically increase until the restricted output amount reaches a maximum restricted output amount. When the transmission queues are classified into two of restriction/non-restriction, a flow entered in the restriction queue shifts to the non-restriction queue after a lapse of a predetermined time interval.

Referring to FIG. 12, the description will be made as regards operation of the congestion control in a case where the transmission queues are set each destination congestion control node and a case where a transmission flow from a client group connected to the congestion control node is small using a concrete example in detailed.

In FIG. 12, it will be assumed that a rate of each link for linking the first client group C1 with the first congestion control node B1, for linking the second client group C2 with the second congestion control node B2, for linking the third client group C3 with the third congestion control node B3, and for linking the fourth client group C4 with the fourth congestion control node B4 is equal to 100 megabits/sec while a rate of the first one-way ring R11 and of the second one-way ring R12 is equal to 10 megabits/sec.

Now, it will be assumed that a client belonging to the third client group C3 transmits frames each having a rate of 9.5 megabits/sec toward a client belonging to the first client group C1 via the first one-way ring R11. In this event, inasmuch as a frame transmission rate is less than a bandwidth of the first one-way ring R11, no congestion occurs.

Under the circumstances, all of the frames transmitted toward the client group C1 from the third client group C3 in the third congestion control node B3 pass through the transmission buffers for the congestion control node B1.

Subsequently, it will be assumed that a client belonging to the second client group C3 transmits frames each having a rate of 1 megabit/sec toward a client belonging to the first client group C1 via the first one-way ring R11.

In this event, as far as a used amount of the transit buffer which packets flowing the first one-way ring R11 use does not exceed a lower limit value (which is herein 5 kilobits) in the second congestion control node B2, the frames supplied from the second client group C2 and produced to the first one-way ring R11 are transmitted toward the first one-way ring R11 in preference to frames supplied from the one-way ring R11.

In the second congestion control node B2, all of frames transmitted from the second client group C2 toward the first client group C1 pass through the transmission buffers for the first congestion control node B1.

Inasmuch as the frames transmitted from the third client group C1 already flow in the first one-way ring R11, the output frame amount for the first one-way ring R11 in the second congestion control node B2 is more than the bandwidth of the first one-way ring R11 and congestion occurs at an output side for the first one-way ring R11 in the second congestion node B2.

It will be assumed that the used amount for the transit buffer in the second congestion control node B2 does not reach the lower limit value. Inasmuch as the frames transmitted from the second client group C2 is in preference to the frames supplied from the first one-way ring R11 to the second congestion control node B2, the frames supplied from the first one-way ring R11 to the second congestion control node B2 are stored in the transmission buffer of the second congestion control node B2.

It will be assumed that the used amount for the transit buffer in the second congestion control node B2 exceeds the lower limit value. In this event, priority is reversed and the frames supplied from the first one-way ring R11 to the second congestion control node B2 becomes in preference to the frames which are transmitted from the second client group C2 and which flow in the first one-way ring R11.

It will be assumed that an input for the second congestion control node B2 is excessive in the second congestion control node B2. In this event, a processing due to reversal of priority is too late and a stored frame amount for the transit buffer in the second congestion control node B2 exceeds an upper limit value (which is herein equal to 8 kilobits). Under the circumstances, the second congestion control node B2 detects congestion occurrence in the first one-way ring R11.

The second congestion control node B2 measures a transmission rate and a destination node number (or a flow number) of the frames which are supplied from the second client group C2 and which are transferred to the first one-way ring R11. Subsequently, the second congestion control node B2 transmits a congestion notification to the third congestion control node B3 using the second one-way ring R12 with a "the transmission rate÷the flow number" acting as the allowable output amount. It is herein assumed that the frame amount transferred from the second client group C2 to the first one-way ring R11 is equal to 0.8 megabits/sec. Inasmuch as this value is less than a threshold value (which is herein equal to 1 megabit/sec), information transmitted is not carried out using the allowable output amount but carried out using a cutback ratio of an output. The cutback ratio is determined by a frame rate, which is obtained from the transfer output measuring part B132, of frames flowing from the transit buffer part B131 to the output mixing part A133. In the example being illustrated, the cutback ratio is 0.9. The cutback ratio is transmitted as an allowable output ratio using the congestion notification.

The second congestion control node B2 periodically sends the allowable output amount toward the third congestion control node B3 while the second congestion control node B2 detects the congestion in the output side of the first one-way ring R11.

Inasmuch as the second congestion control node B2 does not detect congestion at an output side of the second one-way ring R12, the second congestion control node B2 periodically sends congestion notification indicative of no congestion occurrence (NULL) toward the first congestion control node B1 using the first one-way ring R11.

The first congestion control node B1 receives the congestion notification including NULL information and cancels this notification.

The second congestion control node B3 receives the congestion notification including the allowable output ratio, confirms that a sending source of the congestion notification is not its own node, confirms that the contents of the notification is not NULL, and transmits the congestion notification to the fourth congestion control node B4 using the second one-way ring R12.

Transmitted from the third congestion control node B3, the congestion notification is successively received and transferred in the fourth congestion control node B4 and the first congestion control node B1 and is turned back to the second congestion control node B2 by travelling around the second one-way ring R12. When the second congestion control node B2 receives the congestion notification which its own node sends, the second congestion control node B2 cancels this notification and closes transfer of the congestion notification.

Inasmuch as the third congestion control node B3 receives the congestion notification from the second one-way ring R12 and as the sending source of the congestion notification is the third congestion control node B3, the third congestion control node B3 identifies that congestion occurs at an output side of the second congestion control node B2 in the first one-way ring R11. Therefore, the third congestion control node B3 estimates that frames consigned to the first congestion control node B1 pass through a congestion link.

Inasmuch as the allowable output ratio is 0.9, the third congestion control node B3 multiplies a current output restricted amount of 10 megabits/sec by 0.9 to obtain an allowable output amount of 9 megabits/sec. Inasmuch as the flow number flowing in the first congestion control node B1 is equal to 1 and as the flow number flowing the first congestion control node B1 is equal to 1, a weighing factor is equal to 1. As a result, the third congestion control node B3 restricts an output of the transmission buffer consigned to the first congestion control node B1 so as to become 9 megabits/sec.

Inasmuch as all of the frames transmitted from the third client group C3 toward the first client group C1 pass through the transmission queue consigned to the first congestion control node B1 in the third congestion control node B3, an output of this queue is restricted to 9 megabits/sec and the frames transmitted from the third client group C2 toward the first client group C1 are supplied to the second congestion control node B2 at a rate of 9 megabits/sec.

Inasmuch as the rate of the frame supplied from the first one-way ring R11 is decreased to 9 megabits/sec in the second congestion control node B2, it is possible for the second congestion control node B2 to transmit the frames supplied from the second client group C2 toward the first one-way ring R11 at a rate of 1 megabit/sec.

Inasmuch as the rate of the frames supplied from the first one-way ring R11 is decreased to 9 megabits/sec in the second congestion control node B2, the used amount of the transit buffer in the second congestion control node B2 becomes lower. When the used amount of the transit buffer is not more than a threshold value, the second congestion control node B2 removes the congestion detection in the output side of the first one-way ring R11.

When all of nodes do not receive the congestion notification where the allowable output amount is designated, all of nodes periodically ease restriction of the buffer output amount. The third congestion control node B3 gradually increases an output of the transmission queue consigned to the first congestion control node B1 that is restricted to 9 megabits/sec.

Although the above-mentioned processing is repeated whenever the congestion is detected, the used band gradually converges so that an output from the third congestion control node B3 becomes 9 megabits/sec and an output from the second congestion control node B2 becomes 1 megabit/sec.

The above-mentioned first prior art estimated a frame amount enable to transmit to a congestion occurrence link on the basis of a transmission frame amount of a node laid just before a congestion link. Accordingly, when a transmission frame request of the node just before the congestion link is few from the first, an allowable output amount becomes extremely little and a restricted output amount in other nodes is drastically restricted.

In this embodiment, when a transmission frame amount in a node just before congestion is little, a restricted output amount is not notified, a restricted ratio, an average value, a prescribed value, or the like is notified. As a result, it is possible to avoid a drastic flow restriction.

Figure 16:
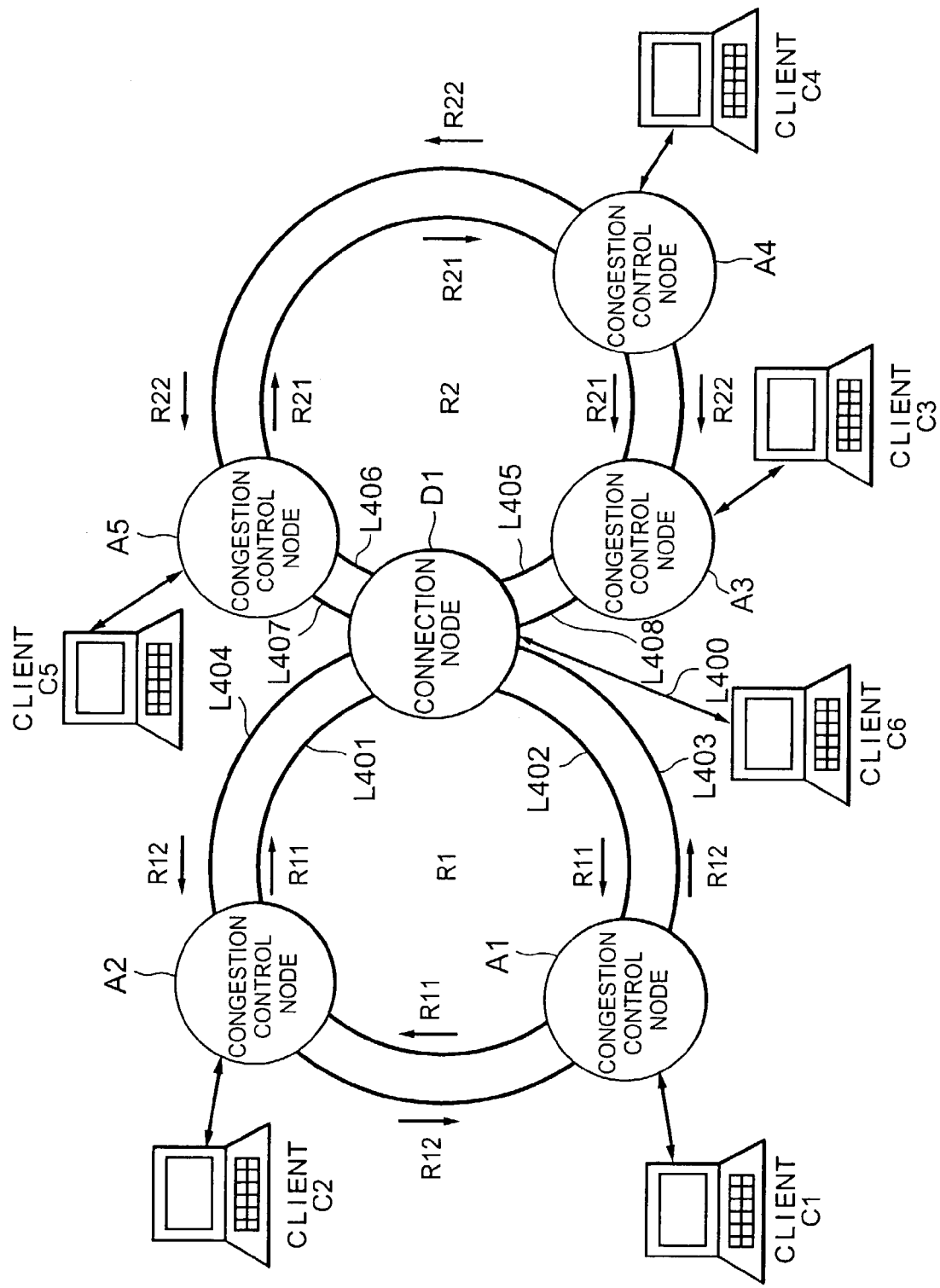
FIG. 16 is a block diagram of a congestion control system according to a fifth embodiment of this invention.
Figure 17:
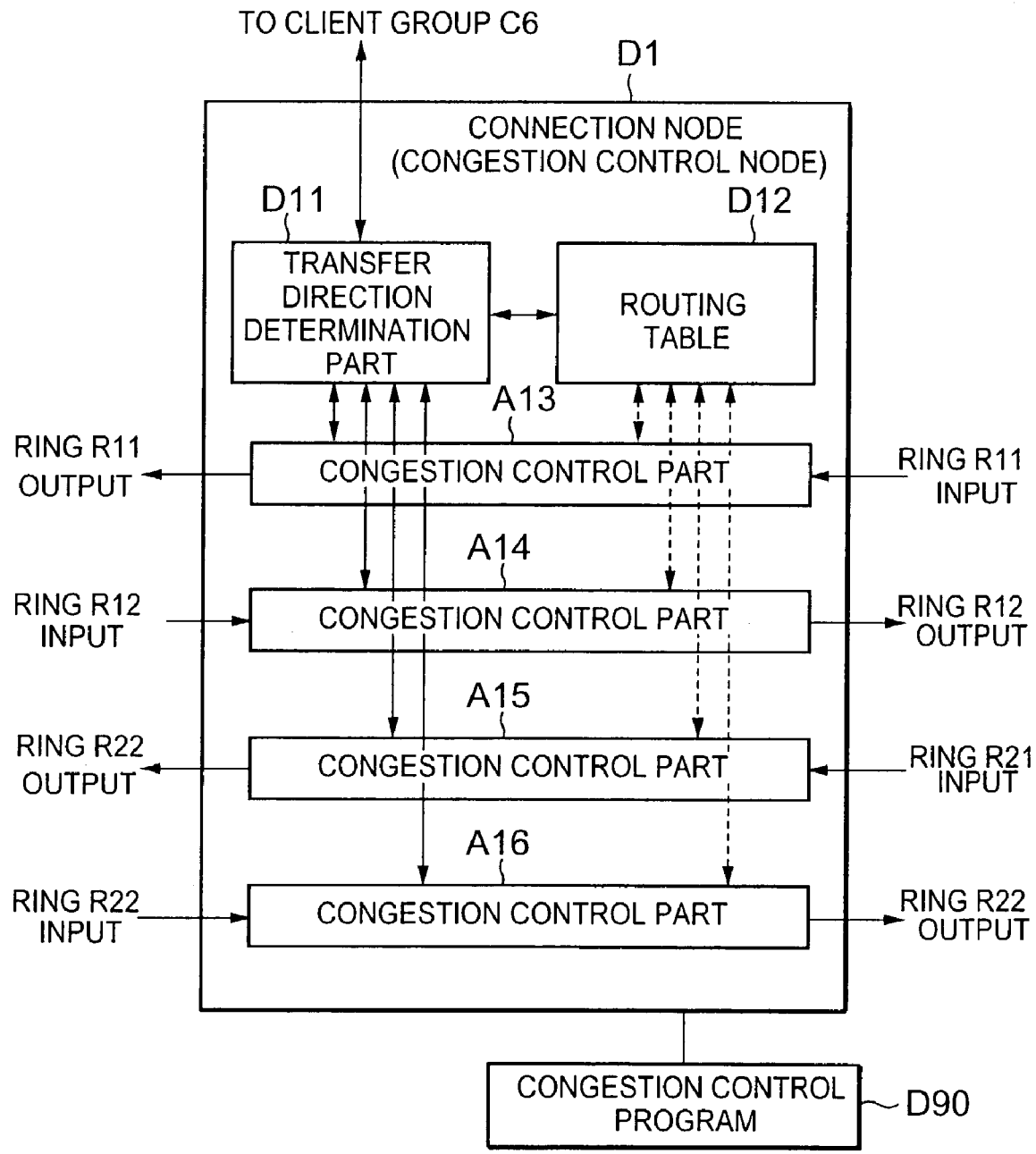
FIG. 17 is a block diagram of a congestion control node enable to accommodate two two-way rings for use in the congestion control system illustrated in FIG. 16.

Referring now to FIGS. 16 and 17, the description will proceed to a congestion control system according to a fifth embodiment of this invention.

The congestion control system according to the fifth embodiment of this invention corresponds to a case where a ring-shaped network is added to the congestion control system according to the first embodiment of this invention.

Referring to FIG. 16, the congestion control system according to the fifth embodiment of this invention is different from the congestion control system according to the first embodiment of this invention at a point where besides the first ring-shaped network R1, a second ring-shaped network R2 is added, the first and the second ring-shaped networks R1 and R2 are connected to each other via a connection node D1, fifth and second client groups C5 and C6 are added and connected to a fifth congestion control node A5 and the connection node D1, respectively, the third through the fifth congestion control nodes A3, A4, and A5 are laid in the second ring-shaped network R2, and a zero-th two-way link L400 and first through eighth one-way links L401 to L408 are added.

Although the destination node number in the ring and the flow number coincide with each other in the first embodiment, the destination node number in the ring and the flow number do not always coincide with each other in a case where a plurality of rings are connected to one another in manner as this embodiment. This is because, in this embodiment, when a plurality of flows consigned to different final destination nodes and extending the rings are transmitted from the same congestion control node, a sender node may regard destination nodes in the ring as the connection node D1 although the final destination nodes for those flows are different from one another and the flow number may be one or more although the destination node number is one.

The second ring-shaped network R2 comprises a first secondary one-way ring R21 turning around or flowing in a clockwise direction and a second secondary one-way ring R22 turning around or flowing in a counterclockwise direction in the opposite direction to the first secondary one-way ring R21. The first and the second secondary one-way rings R21 and R22 are collectively called the second ring-shaped network R2. The second ring-shaped network R2 has a function for transferring frames sent from the third through the fifth congestion control nodes A3-A5 and the connection node D1 to other congestion control nodes A3-A5 and the connection node D1.

The connection node D1 has first through sixth functions depicted at (1) to (6) in addition to those of the first congestion control node A1 illustrated in FIG. 1 as follows:

(1) The connection node D1 accommodates the first and the second ring-shaped networks R1 and R2 and carries out transfer of frames extending between the rings, namely, from the first ring-shaped network R1 to the second ring-shaped network R1 and from the second ring-shaped network R2 to the first ring-shaped network R1;

(2) The connection node D1 transfers frames supplied from the sixth client group C6 via the zero-th two-way link L400 to the first or the second ring-shaped networks R1 or R2 via the second, the fourth, the sixth, and the eighth one-way links L402, L404, L406, and L408;

(3) The connection node D1 transfers frames flowing the first or the third one-way links L401 or L403 (or the first ring-shaped network R1) or the fifth or the seventh one-way links L405 or L407 (or the second ring-shaped network R2) to the sixth client group C6 if necessary;

(4) The connection node D1 detects congestion of frames in the sixth or the eighth one-way links L406 or L408 (or the second ring-shaped network R2) and transmits a congestion notification toward all nodes laid on the second ring-shaped network R2 via the sixth or the eighth one-way links L406 or L408;

(5) The connection node D1 receives the congestion notification from the fifth or the seventh one-way links L404 or L407 (or the second ring-shaped network R2) and adjusts a frame amount of frames which are sent from its own node to the sixth or the eighth one-way links L406 or L408 (or the second ring-shaped network R2); and (6) The connection node D1 transfers a congestion notification frame received from the fifth or the seventh one-way links L405 or L407 (or the second ring-shaped network R2) to adjacent nodes laid on the sixth or the eighth one-way links L406 or L408 (or the second ring-shaped network R2).

In the connection node D1, congestion control is independently carried out in the first ring-shaped network R1 and the second ring-shaped network R2.

At any rate, the connection node D1 serves as an arrangement for repeating communications between a plurality of ring-shaped networks.

FIG. 17 is a block diagram showing structure of the connection node D1 in detailed. The connection node D1 comprises a transfer/transit direction determination part D11, a routing table D12, and first through fourth congestion control parts A13, A14, A15, and A16.

The transfer direction determination part D11 has a function for determining a destination node of frames supplied from the sixth client group C6 and the first through the fourth congestion control parts A13 to A16 and for transferring the frames toward the sixth client group C6 and the first through the fourth congestion control parts A13 to A16 in accordance with description of the routing table D12.

The routing table D12 has a function for storing costs until nodes and destination one-way ring ID each destination congestion control node. The destination one-way ring ID indicates one of the rings R11, R12, R21, and R22. Information of the routing table D12 is used in the transfer direction determination part D11 and the first through the fourth congestion control nodes A13 to A16.

Each of the first through the fourth congestion control nodes A13 to A16 has a function similar to that of the first congestion control node A13 illustrated in FIG. 2.

The zero-th two-way link L400 is a two-way link for connecting between the sixth client group C6 and the connection node D1.

The first one-way link L401 is a one-way link for going from the second congestion control node A2 toward the connection node D1. The first one-way link L401 is a part of the first primary one-way ring R11 and is included in the first ring-shaped network R1.

The second one-way link L402 is a one-way link for going from the connection node D1 toward the first congestion control node A1. The second one-way link L402 is a part of the first primary one-way ring R11 and is included in the first ring-shaped network R1.

The third one-way link L403 is a one-way link for going from the first congestion control node A1 toward the connection node D1. The third one-way link L403 is a part of the second primary one-way ring R12 and is included in the first ring-shaped network R1.

The fourth one-way link L404 is a one-way link for goring from the connection node D1 toward the second congestion control node A1. The fourth one-way link L404 is a part of the second primary one-way ring R12 and is included in the first ring-shaped network R1.

The fifth one-way link L405 is a one-way link for going from the third congestion control node A3 toward the connection node D1. The fifth one-way link L405 is a part of the first secondary one-way ring R21 and is included in the second ring-shaped network R2.

The sixth one-way link L406 is a one-way link for goring from the connection node D1 toward the fifth congestion control node A5. The sixth one-way link L406 is a part of the first secondary one-way ring R21 and is included in the second ring-shaped network R2.

The seventh one-way link L407 is a one-way link for going from the fifth congestion control node A5 toward the connection node D1. The seventh one-way link L407 is a part of the second secondary one-way ring R22 and is included in the second ring-shaped network R2.

The eighth one-way link L408 is a one-wary link for going from the connection node D1 toward the third congestion control node A3. The eighth one-way link L408 is a part of the second secondary one-way ring R22 and is included in the second ring-shaped network R2.

Although the connection node D1 is implemented by hardware, the connection node D1 may be implemented by loading a congestion control program D90 which are a computer program comprising each function in a memory of a computer processing unit. The congestion control program D90 is stored in a magnetic disk, a semiconductor memory, or other recording media. In addition, the above-mentioned functions are implemented by loading the congestion control program D90 from the recording medium in the computer processing unit to control operations of the computer processing unit.

Referring to FIG. 16, the description will be made as regards a first operation in this embodiment using an actual example in detailed.

The first operation in this embodiment is a congestion control operation in a case where congestion occurs in a ring to which a destination node belongs when there are flows extending the rings and when transmission queues are set in respective destination congestion control nodes in the ring to which the node in question belongs.

In FIG. 16, it will be assumed that a rate of each link for linking the first client group C1 with the first congestion control node A1, for linking the second client group C2 with the second congestion control node A2, for linking the third client group C3 with the third congestion control node A3, for linking the fourth client group C4 with the fourth congestion control node A4, for linking the fifth client group C5 with the fifth congestion control node A5, and for linking the sixth client group C6 with the connection node D1 is equal to 100 megabits/sec while a rate of the first primary one-way ring R11, of the second primary one-way ring R12, of the first secondary one-way ring R21, and of the second secondary one-way ring R22 is equal to 10 megabits/sec.

Now, it will be assumed that a client belonging to the first client group C1 transmits frames each having a rate of 4 megabits/sec toward a client belonging to the fourth client group C4 via the second primary one-way ring R12, the connection node D1, and the second secondary one-way ring R22. In this event, inasmuch as a frame transmission rate is less than a bandwidth of the second primary one-way ring R12 and of the second secondary one-way ring R22, no congestion occurs.

When the transmission queues are set in the respective destination congestion control nodes laid in the rings in the first congestion control node A1, frames transmitted from the first client group C1 toward the fourth client group C4 are handled just as if the frames are transmitted consigned to the connection node D1. Therefore, all of the frames consigned to the fourth client group C4 pass through the transmission buffer consigned to the connection node D1 in the first congestion control node A1.

Subsequently, it will be assumed that a client belonging to the second client group C2 transmits frames each having a rate of 4 megabits/sec toward a client belonging to the fourth client group C4 via the first primary one-way ring R11, the connection node D1, and the second secondary one-way ring R22. In this event, inasmuch as frame transmission rate is less than a bandwidth for the first primary one-way ring R11. In addition, a total rate of flows flowing from the first client group C1 to the fourth client group C4 is less than the bandwidth for the second secondary one-way ring R22. As a result, no congestion occurs.

When the transmission queues are set in the respective destination congestion control nodes laid in the rings in the second congestion control node A2, frames transmitted from the second client group C2 toward the fourth client group C4 are handled just as if the frames are transmitted consigned to the connection node D1. Therefore, all of the frames consigned to the fourth client group C4 pass through the transmission buffer consigned to the connection node D1 in the second congestion control node A2.

Subsequently, it will be assumed that a client belonging to the third client group C3 transmits frames each having a rate of 4 megabits/sec toward a client belonging to the fourth client group C4 via the second secondary one-way ring R22.

When the transmission queues are set in the respective destination congestion control nodes laid in the rings in the third congestion control node A3, all of frames transmitted from the third client group C3 to the fourth client group C4 pass through the transmission buffer consigned to the fourth congestion control node C4 in the third congestion control node A3.

As far as a used amount of the transit buffer which packets flowing the second secondary one-way ring R22 use does not exceed a lower limit value (which is herein 5 kilobits) in the third congestion control node A3, the frames supplied from the third client group C3 and produced to the second secondary one-way ring R22 are transferred toward the second secondary one-way ring R22 in preference to frames supplied from the second secondary one-way ring R22.

Inasmuch as the frames transmitted from the first and the third client groups C1 and C2 already flow in the second secondary one-way ring R22, the output frame amount for the second secondary one-way ring R22 in the third congestion control node A3 is more than the bandwidth of the second secondary one-way ring R22 and congestion occurs at an output side for the second secondary one-way ring R22 in the third congestion control node A3.

It will be assumed that the used amount for the transit buffer in the third congestion control node A3 does not reach the lower limit value. Inasmuch as the frames transmitted from the third client group C3 is in preference to the frames supplied from the second secondary one-way ring R22 to the third congestion control node A3, the frames supplied from the second secondary one-way ring R22 to the third congestion control node A3 are stored in the transit buffer of the third congestion control node A3.

It will be assumed that the used amount for the transit buffer in the third congestion control node A3 exceeds the lower limit value. In this event, priority is reversed and the frames supplied from the second secondary one-way ring R22 to the third congestion control node A3 becomes in preference to the frames which are transmitted from the third client group C3 and which flow in the second secondary one-way ring R22.

It will be assumed that an input for the third congestion control node A3 is excessive in the third congestion control node A3. In this event, processing due to reversal of priority is too late and a stored frame amount for the transit buffer in the third congestion control node A3 exceeds an upper limit value (which is herein equal to 8 kilobits). Under the circumstances, the third congestion control node A3 detects congestion occurrence in the second secondary one-way ring R22.

The third congestion control node A3 measures a transmission rate and a destination node number (or a flow number) of the frames which are supplied from the third client group C3 and which are transferred to the second secondary one-way ring R22. Subsequently, the third congestion control node A3 transmits a congestion notification to the connection node D1 using the first secondary one-way ring R21 with a "the transmission rate÷the flow number" acting as the allowable output amount. It is herein assumed that the frame amount transferred from the third client group C3 to the second secondary one-way ring R22 is equal to 2 megabits/sec. In this event, inasmuch as the destination node is equal to one of the fourth congestion control node A4, the third congestion control node A3 transmits, as the allowable output amount, 2 megabits/sec÷1=2 megabits/sec.

The third congestion control node A3 periodically sends the allowable output amount toward the connection node D1 while the third congestion control node A3 detects the congestion in the output side of the second secondary one-way ring R22.

Inasmuch as the third congestion control node A3 does not detect congestion at an output side of the first secondary one-way ring R21, the third congestion control node A3 periodically sends congestion notification indicative of no congestion occurrence (NULL) toward the fourth congestion control node A4 using the second secondary one-way ring R22.

The fourth congestion control node A4 receives the congestion notification including NULL information and cancels this notification.

The connection node D1 receives the congestion notification including the allowable output amount, confirms that a sending source of the congestion notification is not its own node, confirms that the contents of the notification is not NULL, and transmits the congestion notification to the fifth congestion control node A5 using the first secondary one-way ring R21.

Transmitted from the connection node D1, the congestion notification is successively received and transferred in the fifth congestion control node A5 and the fourth congestion control node A4 and is turned back to the third congestion control node A3 by travelling around the first secondary one-way ring R21. When the third congestion control node A3 receives the congestion notification which its own node sends, the third congestion control node A3 cancels this notification and closes transfer of the congestion notification.

Inasmuch as the connection node D1 receives the congestion notification from the first secondary one-way ring R21 and as the sending source of the congestion notification is the third congestion control node A3, the connection node D1 identifies that congestion occurs at an output side of the third congestion control node A3 in the second secondary one-way ring R22. As a result, the connection node D1 estimates that the frames consigned to the fourth congestion control node A4 pass through a congestion link.

Inasmuch as the flow number flowing in the fourth congestion control node A4 is equal to 2 in the connection node D1 that is a flow transmitted from the first congestion control node A1 and a flow transmitted from the second congestion control node A2, a weighing factor is equal to 2. As a result, the connection node D1 restricts an output of the transmission buffer consigned to the first congestion control node A1 so as to 2 megabits/sec×2=4 megabits/sec which is the allowable output amount notified by the congestion notification.

Inasmuch as all of the frames transmitted toward the fourth client group C4 pass through the transmission queue consigned to the fourth congestion control node A4 in the connection node D1, an output of this queue is restricted to 4 megabits/sec and the frames transmitted from the first and the second client groups C1 and C2 toward the fourth client group C4 are supplied to the third congestion control node A3 at a rate of 4 megabits/sec.

Inasmuch as the rate of the frame supplied from the second secondary one-way ring R22 is decreased to 4 megabits/sec in the third congestion control node A3, it is possible for the third congestion control node A3 to transmit the frames supplied from the third client group C3 toward the second secondary one-way ring R22 at a rate of 4 megabits/sec.

Inasmuch as the rate of the frames supplied from the second secondary one-way ring R22 is decreased to 4 megabits/sec in the third congestion control node A3, the used amount of the transit buffer in the third congestion control node A3 becomes lower. When the used amount of the transit buffer is not more than a threshold value, the third congestion control node A3 removes the congestion detection in the output side of the second secondary one-way ring R22.

When all of nodes do not receive the congestion notification where the allowable output amount is designated, all of nodes periodically ease restriction of the buffer output amount. The connection node D1 gradually increases the output of the transmission queue consigned to the fourth congestion control node A4 which is restricted to 4 megabits/sec.

Whenever congestion is detected, the above-mentioned processing is repeated. When there is no change in the operation of the client groups, the band of each flow converges so as to approach about 3.33 megabits/sec obtained by dividing the band of congestion ring into three equal parts.

Referring now to FIG. 16, the description will be made as regards a second operation in this embodiment using an actual example in detailed.

The second operation according to this embodiment is a congestion control operation in a case where congestion occurs in a ring to which a node (which is called a transmission node) inserting a frame which client groups transmit into a ring when there is a flow extending to rings and when a transmission queue is set each an destination congestion control node in a ring to which the node in question belongs.

The second operation according to this embodiment is different from the first operation according to this embodiment in a point where the congestion occurrence ring is the ring to which the node (which is called the transmission node) inserts the frames which the client groups transmit into the ring.

In FIG. 16, it will be assumed that a rate of each link for linking the first client group C1 with the first congestion control node A1, the second client group C2 with the second congestion control node A2, the third client group C3 with the third congestion control node A3, the fourth client group C4 with the fourth congestion control node A4, the fifth client group C5 with the fifth congestion control node A5, and the sixth client group C6 with the connection node D1 is equal to 100 megabits/sec and a rate of the first primary one-way ring R11, of the second primary one-way ring R12, of the first secondary one-way ring R21, and of the second secondary one-way ring R22 is equal to 10 megabits/sec.

It will be assumed that a client belonging to the fourth client group C4 transmits frames having a rate of 4 megabits/sec toward a client belonging to the first client group C1 via the first secondary one-way ring R21, the connection node D1, and the first primary one-way ring R11. In this state, inasmuch as the frame transmission rate is less than the bandwidth of the first secondary one-way ring R21 and of the first primary one-way ring R11 and no congestion occurs.

When the queue is set each destination congestion control node laid in the ring in the fourth congestion control node A4, the frames transmitted from the fourth client group C4 toward the first client group C1 are dealt similar to those where the frames are transmitted consigned to the connection node D1. As a result, all of the frames consigned to the first client group C1 pass through the transmission buffer consigned to the connection node D1 in the fourth congestion control node A4.

It will be assumed that a client belonging to the fourth client group C4 transmits frames having a rate of 4 megabits/sec toward a client belonging to the second client group C2 via the first secondary one-way ring R21, the connection node D1, and the second primary one-way ring R12. In this event, inasmuch as the frame transmission rate is less than the bandwidth of the second primary one-way ring R12 and a total rate of the flows flowing from the fourth client group C4 in the first client group C1 is less than the bandwidth of the first secondary one-way ring R21, no congestion occurs.

When the queue is set each destination congestion control node laid in the ring in the fourth congestion control node A4, the frames transmitted from the fourth client group C4 toward the second client group C2 are dealt similar to those where the frames are transmitted consigned to the connection node D1. As a result, all of the frames consigned to the second client group C2 pass through the transmission buffer consigned to the connection node D1 in the fourth congestion control node A4.

It will be assumed that a client belonging to the third client group C3 transmits frames having a rate of 4 megabits/sec toward a client belonging to the fifth client group C5 via the first secondary one-way ring R21.

When the queue is set each destination congestion control node laid in the ring in the third congestion control node A3, all of the frames transmitted from the third client group C3 toward the fifth client group C5 pass through the transmission buffer consigned to the fifth congestion control node A5 in the third congestion control node A3.

As far as the used amount of the transit buffer used in packets flowing in the first secondary one-way ring R21 does not exceed a lower limit value (which is herein equal to 5 kilobits) in the third congestion control node A3, the frames supplied with the third client group C3 and delivered to the first secondary one-way ring R21 are transferred toward the first secondary one-way ring R21 in preference to the frames supplied from the first secondary one-way ring R21.

Inasmuch as the frames transmitted from the fourth client group C4 to the first and the second client groups C1 and C2 already flow in the first secondary one-way ring R21, the output frame amount for the first secondary one-way ring R21 in the third congestion control node A3 is more than the bandwidth of the first secondary one-way ring R21 and congestion occurs in the output side for the first secondary one-way ring R21 in the third congestion control node A3.

It will be assumed that the used amount of the transit buffer in the third congestion control node A3 does not reach the lower limit value. Inasmuch as the frames transmitted from the third client group C3 is in preference to the frames supplied to the third congestion control node A3 via the first secondary one-way ring R21, the frames supplied to the third congestion control node A3 via the first secondary one-way ring R21 are stored in the transit buffer of the third congestion control node A3.

It will be assumed that the used amount of the transit buffer in the third congestion control node A3 exceeds the lower limit value. In this event, a priority is reversed and the frames supplied to the third congestion control node A3 via the first secondary one-way ring R21 is in preference to the frames which are transmitted from the third client group C3 and which flow in the first secondary one-way ring R21.

It will be assumed that an input to the third congestion control node A3 is excessive. In this event, processing due to reversal of priority is too late and a stored frame amount for the transit buffer in the third congestion control node A3 exceeds an upper limit value (which is herein equal to 8 kilobits). Under the circumstances, the third congestion control node A3 detects congestion occurrence in the first secondary one-way ring R21.

The third congestion control node A3 measures a transmission rate and a destination node number (that is, a flow number) of the frames which are supplied from the third client group C1 and which are transferred to the first secondary one-way ring R21. In addition, the third congestion control node A3 calculates "the transmission rate÷the flow number" as the allowable output amount and transmits congestion notification with the allowable output amount to the fourth congestion control node A4 using the second secondary one-way ring R22. Herein, it will be assumed that the amount of the frames transferred from the third client group C3 to the first secondary one-way ring R21 is equal to 2 megabits/sec. Inasmuch as the destination node is one of the fifth congestion control node A5, the third congestion control node A3 transmits 2 megabits/sec÷1=2 megabits/sec as the allowable output amount.

While the third congestion control node A3 detects the congestion in the output side of the first secondary one-way ring R21, the third congestion control node A3 periodically sends the allowable output amount toward the fourth congestion control node A4.

Inasmuch as the third congestion control node A3 does not detect congestion in the output side of the second secondary one-way ring R22, the third congestion control node A3 periodically sends the congestion notification indicative of no congestion occurrence (NULL) toward the connection node D1 via the first secondary one-way ring R21.

The connection node D1 receives the congestion notification including NULL information and cancels this notification.

The fourth congestion control node A4 receives the congestion notification including the allowable output amount, confirms that a sending source of the congestion notification is not its own node, confirms that contents of the notification is not NULL, and transmits the congestion notification to the fifth congestion control node A5 using the second secondary one-way ring R22.

Sent from the fourth congestion control node A4, the congestion notification is successively received and transferred in the fifth congestion control node A5 and the connection node D1 and turns buck to the third congestion control node A3 by traveling around the second secondary one-way ring R22. When the third congestion control node A3 receives the congestion notification generated from its own node, the third congestion control node A3 cancels this notification and closes transfer of the congestion notification.

Inasmuch as the fourth congestion control node A4 receives the congestion notification from the second secondary one-way ring R22 and as the sending source of the congestion notification is the third congestion control node A3, the fourth congestion control node A4 identifies that the congestion occurs in the output side of the third congestion control node A3 in the first secondary one-way ring R21. As a result, the fourth congestion control node A4 estimates that the frames consigned to the connection node D1 pass through the congestion link.

Inasmuch as the flow number passing through the connection node D2 in the fourth congestion control node A4 is two, that is, a flow transmitted to the first congestion control node A1 and a flow transmitted to the second congestion control node A2, a weighting factor is equal to 2. As a result, the fourth congestion control node A4 restricts an output of the transmission buffer consigned to the connection node D1 so as to become 2 megabits/sec×2=4 megabits/sec which is the allowable output amount notified by the congestion notification.

Inasmuch as all of the frames transmitted toward the connection node D1 in the fourth congestion control node A4 pass through the transmission queue consigned to the connection node D1, an output of this queue is restricted to 4 megabits/sec and the frames transmitted from the fourth client group C4 toward the first client group C1 and the second client group C2 are supplied to the third congestion control node A3 at a rate of total of 4 megabits/sec.

Inasmuch as the rate of the frames supplied from the first secondary one-way ring R21 is decreased to 4 megabits/sec in the third congestion control node A3, it is possible for the third congestion control node A3 to transmit the frames supplied from the third client group C3 toward the first secondary one-way ring R21 at a rate of 4 megabits/sec.

Inasmuch as the rate of the frames supplied from the first secondary one-way ring R21 decreases to 4 megabits/sec in the third congestion control node A3, the used amount for the transit buffer in the third congestion control node A3 becomes lower. When the used amount for the transit buffer is more than a threshold value, the third congestion control node A3 releases the congestion detection in the output side of the first secondary one-way ring R21.

When all of nodes do not receive the congestion notification where the allowable output amount is designated, all of nodes periodically ease restriction of the buffer output amount. The fourth congestion control node A4 gradually increases an output of the transmission queues consigned to the connection node D1 that is restricted to 4 megabits/sec.

Whenever the congestion is detected, the above-mentioned operation is repeated. When there is no change in the operation of the client groups, the band of each flow gradually converge so as to approach about 3.33 megabits/sec which is an average value obtained by dividing the ring band into three equal parts.

Referring now to FIG. 16, the description will be made as regards a third operation in this embodiment using an actual example in detailed.

The third operation according to this embodiment is a congestion control operation in a case where there is a flow extending to the rings and when transmission queues are set in respective destination congestion control nodes laid in all of rings.

The third operation according to this embodiment is different from the second operation according to this embodiment in a point where the transmission queues are not set each destination congestion control node laid in a ring but set respective destination congestion control nodes laid in all of rings. In this operation, one flow and one queue are one-to-one correspondence in the similar manner in a case where there is only one ring.

In FIG. 16, it will be assumed that a rate of each link for linking the first client group C1 with the first congestion control node A1, the second client group C2 with the second congestion control node A2, the third client group C3 with the third congestion control node A3, the fourth client group C4 with the fourth congestion control node A4, the fifth client group C5 with the fifth congestion control node A5, and the sixth client group C6 with the connection node D1 is equal to 100 megabits/sec and a rate of the first primary one-way ring R11, of the second primary one-way ring R12, of the first secondary one-way ring R21, and of the second secondary one-way ring R22 is equal to 10 megabits/sec.

It will be assumed that a client belonging to the fourth client group C4 transmits frames having a rate of 4 megabits/ sec toward a client belonging to the first client group C1 via the first secondary one-way ring R21, the connection node D1, and the first primary one-way ring R11. In this state, inasmuch as the frame transmission rate is less than the bandwidth of the first secondary one-way ring R21 and of the first primary one-way ring R11 and no congestion occurs.

When the queues are set respective destination congestion control node laid in all of the rings in the fourth congestion control node A4, all of the frames transmitted from the fourth client group C4 toward the first client group C1 pass through the transmission buffer consigned to the first congestion control node A1 in the fourth congestion control node A4.

It will be assumed that a client belonging to the fourth client group C4 transmits frames having a rate of 4 megabits/sec toward a client belonging to the second client group C2 via the first secondary one-way ring R21, the connection node D1, and the second primary one-way ring R12. In this event, inasmuch as the frame transmission rate is less than the bandwidth of the second primary one-way ring R12 and a total rate of the flows flowing from the fourth client group C4 in the first client group C1 is less than the bandwidth of the first secondary one-way ring R21, no congestion occurs.

When the queues are set respective destination congestion control nodes laid in all of the rings in the fourth congestion control node A4, all of the frames transmitted from the fourth client group C4 toward the second client group C2 pass through the transmission buffer consigned to the second congestion control node A2 in the fourth congestion control node A4.

It will be assumed that a client belonging to the third client group C3 transmits frames having a rate of 4 megabits/sec toward a client belonging to the fifth client group C5 via the first secondary one-way ring R21.

When the queues are set respective destination congestion control nodes laid in all of the rings in the third congestion control node A3, all of the frames transmitted from the third client group C3 toward the fifth client group C5 pass through the transmission buffer consigned to the fifth congestion control node A5 in the third congestion control node A3.

As far as the used amount of the transit buffer used in packets flowing in the first secondary one-way ring R21 does not exceed a lower limit value (which is herein equal to 5 kilobits) in the third congestion control node A3, the frames supplied with the third client group C3 and delivered to the first secondary one-way ring R21 are transferred toward the first secondary one-way ring R21 in preference to the frames supplied from the first secondary one-way ring R21.

Inasmuch as the frames transmitted from the fourth client group C4 to the first and the second client groups C1 and C2 already flow in the first secondary one-way ring R21, the output frame amount for the first secondary one-way ring R21 in the third congestion control node A3 is more than the bandwidth of the first secondary one-way ring R21 and congestion occurs in the output side for the first secondary one-way ring R21 in the third congestion control node A3.

It will be assumed that the used amount of the transit buffer in the third congestion control node A3 does not reach the lower limit value. Inasmuch as the frames transmitted from the third client group C3 is in preference to the frames supplied to the third congestion control node A3 via the first secondary one-way ring R21, the frames supplied to the third congestion control node A3 via the first secondary one-way ring R21 are stored in the transit buffer of the third congestion control node A3.

It will be assumed that the used amount of the transit buffer in the third congestion control node A3 exceeds the lower limit value. In this event, a priority is reversed and the frames supplied to the third congestion control node A3 via the first secondary one-way ring R21 is in preference to the frames which are transmitted from the third client group C3 and which flow in the first secondary one-way ring R21.

It will be assumed that an input to the third congestion control node A3 is excessive. In this event, processing due to reversal of priority is too late and a stored frame amount for the transit buffer in the third congestion control node A3 exceeds an upper limit value (which is herein equal to 8 kilobits). Under the circumstances, the third congestion control node A3 detects congestion occurrence in the first secondary one-way ring R21.

The third congestion control node A3 measures a transmission rate and a destination node number (that is, a flow number) of the frames which are supplied from the third client group C1 and which are transferred to the first secondary one-way ring R21. In addition, the third congestion control node A3 calculates "the transmission rate÷the flow number" as the allowable output amount and transmits congestion notification with the allowable output amount to the fourth congestion control node A4 using the second secondary one-way ring R22. Herein, it will be assumed that the amount of the frames transferred from the third client group C3 to the first secondary one-way ring R21 is equal to 2 megabits/sec. Inasmuch as the destination node is one of the fifth congestion control node A5, the third congestion control node A3 transmits 2 megabits/sec÷1=2 megabits/sec as the allowable output amount.

While the third congestion control node A3 detects the congestion in the output side of the first secondary one-way ring R21, the third congestion control node A3 periodically sends the allowable output amount toward the fourth congestion control node A4.

Inasmuch as the third congestion control node A3 does not detect congestion in the output side of the second secondary one-way ring R22, the third congestion control node A3 periodically sends the congestion notification indicative of no congestion occurrence (NULL) toward the connection node D1 via the first secondary one-way ring R21.

The connection node D1 receives the congestion notification including NULL information and cancels this notification.

The fourth congestion control node A4 receives the congestion notification including the allowable output amount, confirms that a sending source of the congestion notification is not its own node, confirms that contents of the notification is not NULL, and transmits the congestion notification to the fifth congestion control node A5 using the second secondary one-way ring R22.

Sent from the fourth congestion control node A4, the congestion notification is successively received and transferred in the fifth congestion control node A5 and the connection node D1 and turns buck to the third congestion control node A3 by traveling around the second secondary one-way ring R22. When the third congestion control node A3 receives the congestion notification generated from its own node, the third congestion control node A3 cancels this notification and closes transfer of the congestion notification.

Inasmuch as the fourth congestion control node A4 receives the congestion notification from the second secondary one-way ring R22 and as the sending source of the congestion notification is the third congestion control node A3, the fourth congestion control node A4 identifies that the congestion occurs in the output side of the third congestion control node A3 in the first secondary one-way ring R21. As a result, the fourth congestion control node A4 estimates that the frames consigned to the connection node D1 and to a ring beyond the connection node D1 pass through the congestion link.

Inasmuch as the flow number flowing the transmission queue consigned to the first congestion control node A1 in the fourth congestion control node A4 is only a flow transmitted to the first congestion control node A1, a weighting factor is equal to 1. As a result, the fourth congestion control node A4 restricts an output of the transmission buffer consigned to the connection node D1 so as to become 2 megabits/sec×1=2 megabits/sec that is the allowable output amount notified by the congestion notification.

Inasmuch as the flow number flowing the transmission queue consigned to the second congestion control node A2 in the fourth congestion control node A4 is only a flow transmitted to the second congestion control node A2, a weighting factor is equal to 1. As a result, the fourth congestion control node A4 restricts an output of the transmission buffer consigned to the connection node D1 so as to become 2 megabits/sec×1=2 megabits/sec that is the allowable output amount notified by the congestion notification.

Inasmuch as all of the frames transmitted toward the first and the second congestion control nodes A1 and A2 in the fourth congestion control node A4 pass through the respective transmission queues consigned to the first and the second congestion control nodes A1 and A2, an output of those queues is restricted to 2 megabits/sec and the frames transmitted from the fourth client group C4 toward the first client group C1 and the second client group C2 are supplied to the third congestion control node A3 at a rate of total of 2 megabits/sec, respectively.

Inasmuch as a total of the rate of the frames supplied from the first secondary one-way ring R21 is decreased to 4 megabits/sec in the third congestion control node A3, it is possible for the third congestion control node A3 to transmit the frames supplied from the third client group C3 toward the first secondary one-way ring R21 at a rate of 4 megabits/sec.

Inasmuch as the rate of the frames supplied from the first secondary one-way ring R21 decreases to 4 megabits/sec in the third congestion control node A3, the used amount for the transit buffer in the third congestion control node A3 becomes lower. When the used amount for the transit buffer is more than a threshold value, the third congestion control node A3 releases the congestion detection in the output side of the first secondary one-way ring R21.

When all of nodes do not receive the congestion notification where the allowable output amount is designated, all of nodes periodically ease restriction of the buffer output amount. The fourth congestion control node A4 gradually increases outputs of the transmission queue consigned to the first congestion control node A1 and of the transmission queue consigned to the second congestion control node A2 each of which is restricted to 2 megabits/sec.

Whenever the congestion is detected, the above-mentioned operation is repeated. When there is no change in the operation of the client groups, the band of each flow gradually converge so as to approach about 3.33 megabits/sec which is an average value obtained by dividing the ring band into three equal parts.

Figure 18:
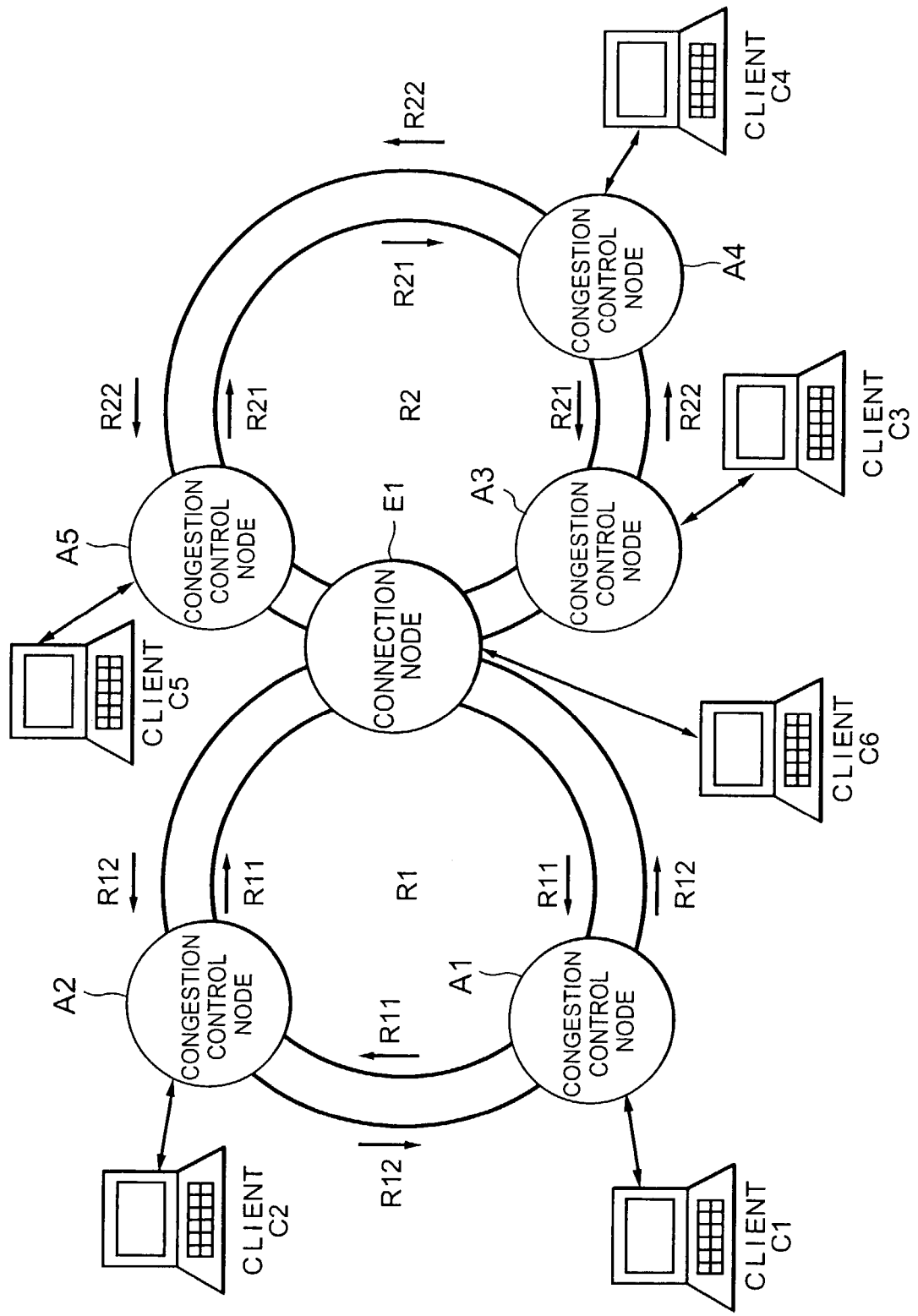
FIG. 18 is a block diagram of a congestion control system according to a sixth embodiment of this invention.

Referring to FIG. 18, a congestion control system according to a sixth embodiment of this invention is similar in structure and operation to the congestion control system according to the fifth embodiment of this invention illustrated in FIG. 16 except that the connection node D1 is modified into a connected node E1.

The connection node E1 has not only the functions of the connection node D1 in FIG. 16 but also a function for detecting congestion in a transmission queue toward each one-way ring to transmit congestion notification toward congestion control nodes laid in a ring-shaped network which is different from a ring-shaped network where the congestion is detected.

In the connection node E1, the congestion notification is independently regards as the first ring-shaped network R1 and the second ring-shaped network R2. When the congestion occurs with the output amount from the transmission queue restricted due to arrival of the congestion notification, the congestion notification is transmitted to the ring-shaped network different from the ring-shaped network to which the queue in which the congestion occurs belongs.

Figure 19:
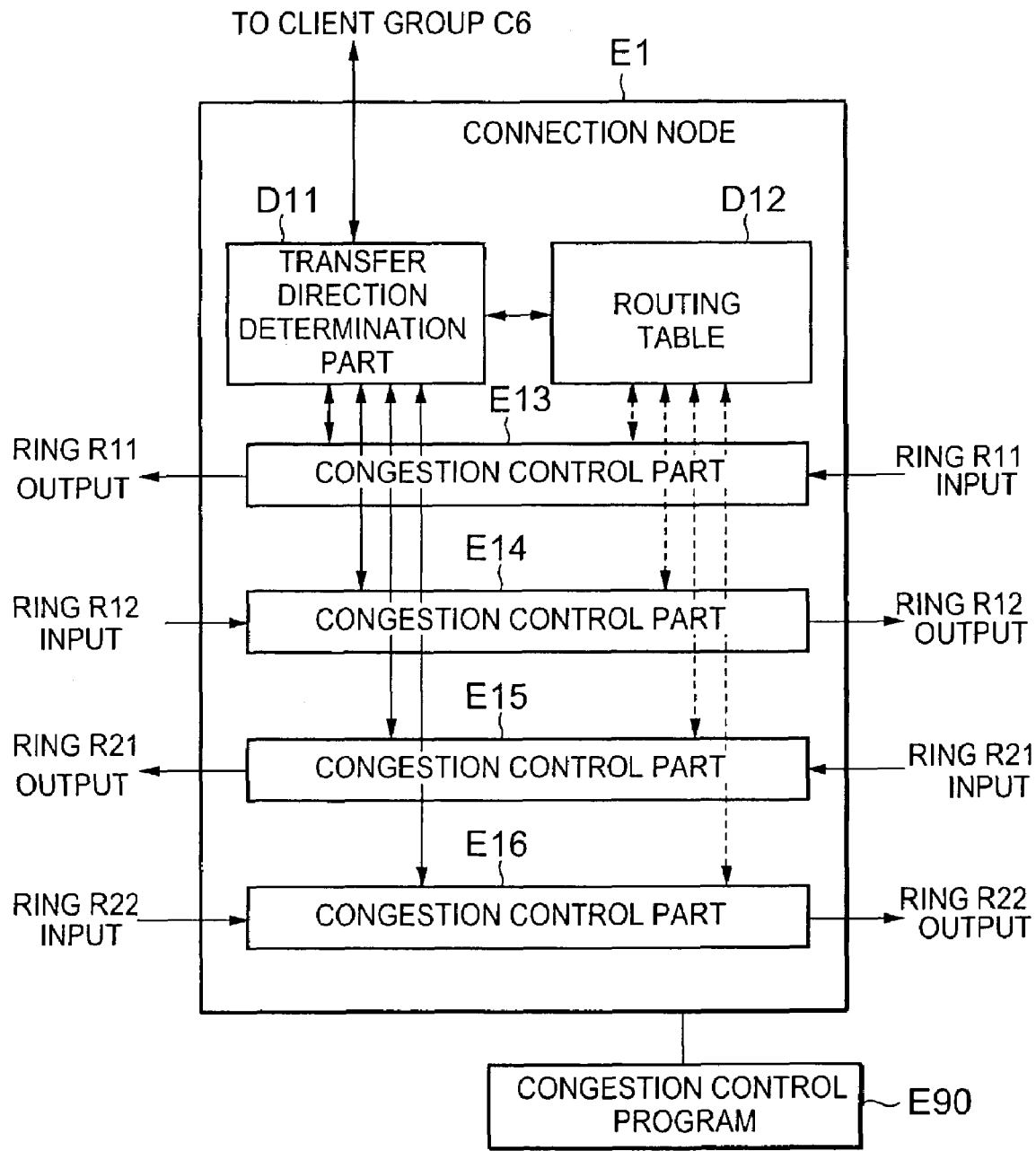
FIG. 19 is a block diagram of a congestion control node with a function for measuring a used amount of a transmission buffer for use in the congestion control system illustrated in FIG. 18.

FIG. 19 is a block diagram showing structure of the connection node E1 in detailed. The connection node E1 comprises the transfer direction determination part D11, the routing table D12, and first through fourth congestion control parts E13, E14, E15, and E16.

Each of the second through the fourth congestion control parts E14 to E16 has a congestion control function similar in structure and operation to the first congestion control part E13. Although the description will proceed to only the first congestion control part E13 in behalf of the first through the fourth congestion control parts E13 to E16, the description regarding to the second through the fourth congestion control parts E14 to E16 is omitted. The description regarding to the first congestion control part E13 is similarly applicable to each of the second through the fourth congestion control parts E14 to E16 for without particularly notice.

Although the connection node E1 is implemented by hardware, the connection node E1 may be implemented by loading a congestion control program E90 which are a computer program comprising each function in a memory of a computer processing unit. The congestion control program E90 is stored in a magnetic disk, a semiconductor memory, or other recording media. In addition, the above-mentioned functions are implemented by loading the congestion control program E90 from the recording medium in the computer processing unit to control operations of the computer processing unit.

Figure 20:
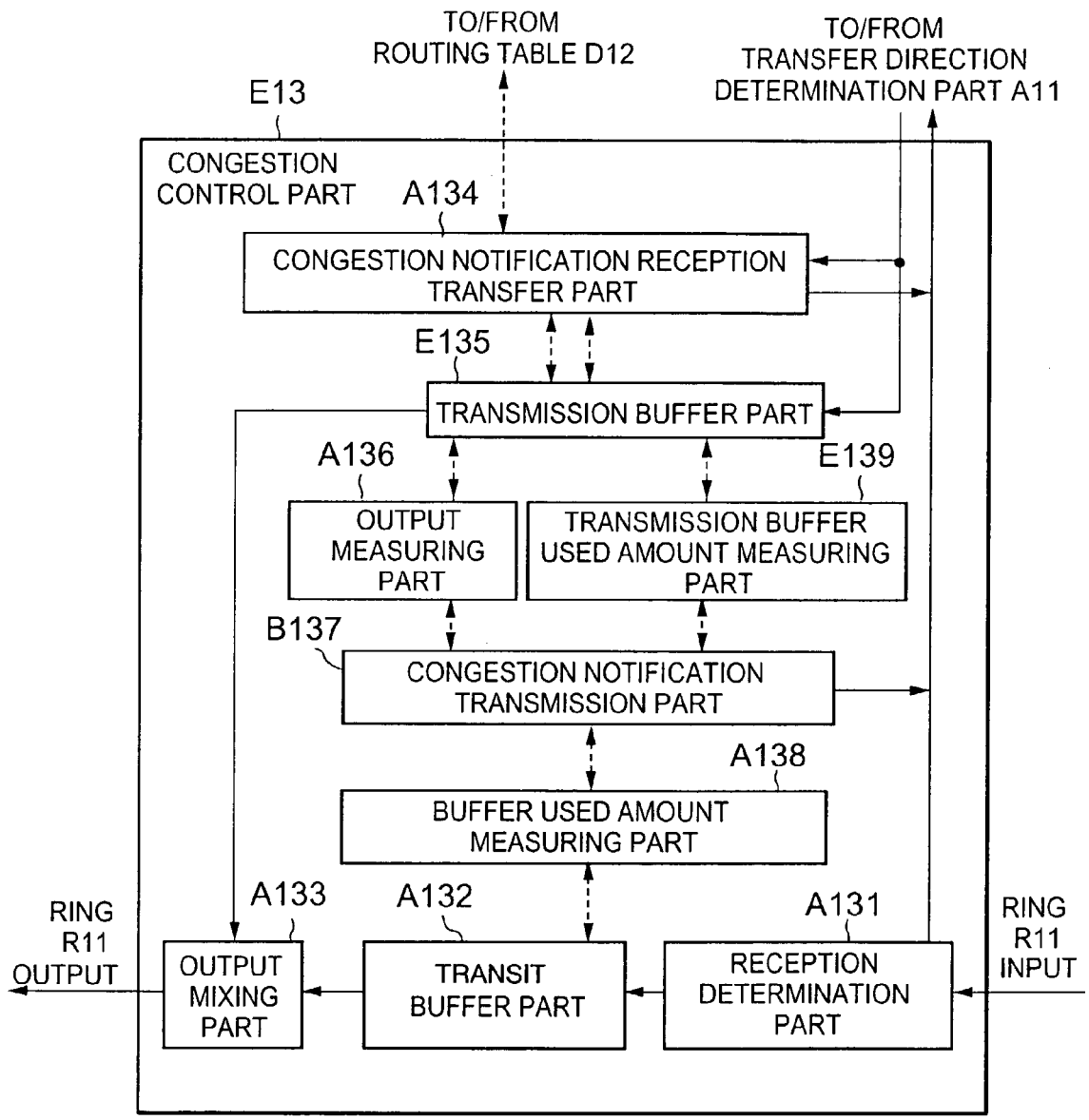
FIG. 20 is a block diagram of a congestion control part for use in the congestion control node illustrated in FIG. 19.

FIG. 20 is a block diagram showing the first congestion control part E13. The first congestion control part E13 is similar in structure and operation to the first congestion control part A13 illustrated in FIG. 3 except that the transmission buffer part A135 is modified into a transmission buffer part E135, the congestion notification transmission part A137 is modified into a congestion notification transmission pert E137, and the first congestion control part E13 further comprises a transmission buffer used amount measuring part E139.

The transmission buffer part E135 has not only the functions of the transmission buffer part A135 illustrated in FIG. 3 but also a function for responding to a request from the transmission buffer used amount measuring part E139 to notify the transmission buffer used amount measuring part E139 of the number of frames laid in the transmission buffer part E135, the bit number, the byte number, and so on.

The congestion notification transmission part E137 has not only the functions of the congestion notification transmission part A137 illustrated in FIG. 3 but also a function for preparing a congestion notification frame using a congestion occurrence detected result supplied from the transmission buffer used amount measuring part E139, a transmission frame amount measured by the output measuring part A136, and so on to transmit the congestion notification frame via the transfer direction determination part A11 toward a congestion control node laid in the second ring-shaped network R2 using the first secondary one-way ring R21 and the second secondary one-way ring R22.

In the congestion notification transmission part E137, the congestion notification frame is transmitted toward all of directions where there are hosts caused by congestion main factors. When the flows caused by the congestion main factors flow from both of the first and the second secondary one-way rings R21 and R22, notifications are transmitted to both. Although these notification go round the first or the second secondary one-way rings R21 or R22, it is possible to omit useless transfer of the notifications by stopping the transfer of these notifications before the notification goes round if the second embodiment according to this invention is applied thereto.

Responsive to a request from the congestion notification transmission part E137, the transmission buffer used amount measuring part E139 requests the transmission buffer part E135 so as to notify the transmission buffer part E135 of the number of frames raid in the transmission buffer part E135, the bit number, the byte number, and so on, determines whether or not congestion occurs on the basis of its result, and notifies the congestion notification transmission part A137 of its result.

Figure 21:
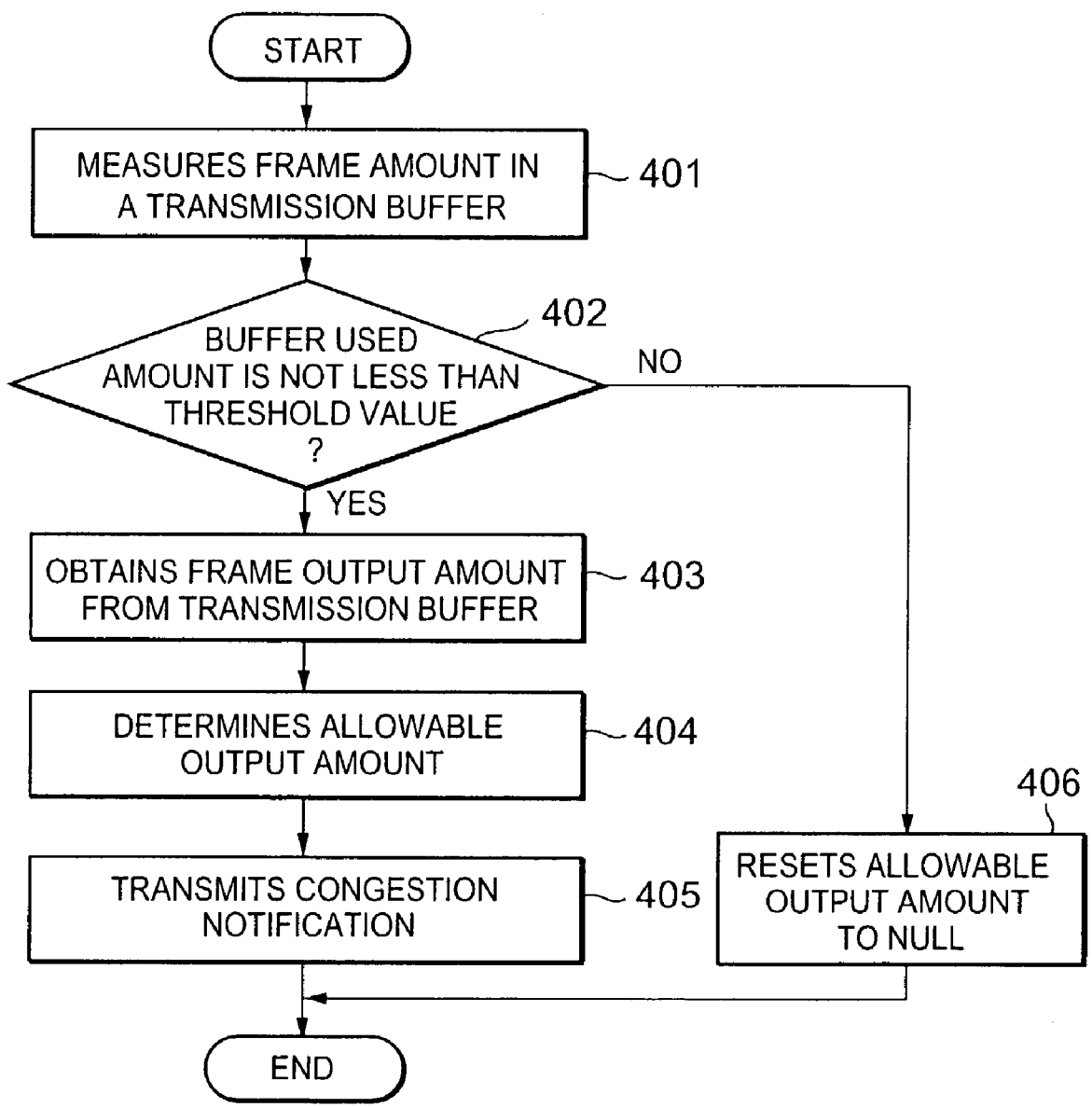
FIG. 21 is a flowchart for use in describing operation on transmission of congestion notification in the congestion control system illustrated in FIG. 18.

Referring now to FIG. 21, the description will be made as regards operation in the congestion notification transmission part E137 in a case where a congestion detection function in the transmission queues is effective in the congestion notification transmission part E137 in detailed.

The congestion notification transmission part E137 periodically makes the transmission buffer used amount measuring part E139 confirm the presence or absence of congestion occurrence (step 401).

The step 401 is followed by a step 402 at which the congestion notification transmission part E137 receives notification of the presence or absence of the congestion occurrence from the transmission buffer used amount measuring part E139. When the congestion occurrence is present or a buffer used amount is not less than a threshold value, the step 402 proceeds to a step 403. When the congestion occurrence is absent or the buffer used amount is less than the threshold value, the step 402 turns to a step 406.

At the step 403, the congestion notification transmission part E137 requests the output measuring part A136 to notify a frame amount U of frames transferred from the transmission buffer part E135 to the output mixing part A133 and a destination congestion control node number D for each transmission queue having the used amount exceeding the threshold value.

The step 403 is succeeded by a step 404 at which the congestion notification transmission part E137 determines, using the transmission frame amount U and the destination congestion control node number D which are calculated at the step 403, the maximum frame insertion amount for a destination congestion control node exceeding the threshold value that is allowed in each transmission queue of each congestion control node within the second ring-shaped ring R2. The maximum frame insertion amount is called an allowable output amount which is determined by U/D.

The step 404 is followed by a step 405 at which the congestion notification transmission part E137 notifies the congestion control nodes laid in the second ring-shaped network R2 of the allowable output amount determined at the step 404 using a ring which is a sending source of flows passing through congested transmission queues within the first and the second secondary one-way rings R21 and R22. If the transmission queue where the congestion is detected is supplied with the flow from both of the first and the second secondary one-way rings R21 and R22, the congestion notification is transmitted to both of the first and the second secondary one-way rings R21 and R22. Although the congestion notification includes not only the allowable output amount but also a sender ID, the sender ID is not an ID for the connection node E1 but a destination node ID of the transmission queue where the congestion is detected. This operation is called a congestion notification extending between the rings.

When the congestion notification transmission part E137 does not receive the notification of the congestion occurrence from the buffer used amount measuring part A138 at the step 402, the step 402 proceeds to the step 406 at which the congestion notification transmission part E137 considers that the congestion does not occur and resets the allowable output amount related to the queue where the congestion does not occur into a NULL value.

Referring now to FIG. 18, the description will be made as regards a congestion control operation in this embodiment in a case where there is a flow extending to the rings, transmission queues are set in respective destination congestion control nodes laid in all of rings, and congestion occurs in a ring where there is a final destination node using an actual example in detailed. This actual example indicates that the congestion notification arrives at a transmission node related to the congestion.

In FIG. 18, it will be assumed that a rate of each link for linking the first client group C1 with the first congestion control node A1, the second client group C2 with the second congestion control node A2, the third client group C3 with the third congestion control node A3, the fourth client group C4 with the fourth congestion control node A4, the fifth client group C5 with the fifth congestion control node A5, and the sixth client group C6 with the connection node E1 is equal to 100 megabits/sec and a rate of the first primary one-way ring R11, of the second primary one-way ring R12, of the first secondary one-way ring R21, and of the second secondary one-way ring R22 is equal to 10 megabits/sec.

It will be assumed that a client belonging to the first client group C1 transmits frames each having a rate of 4 megabits/sec toward a client belonging to the fourth client group C4 via the second primary one-way ring R12, the connection node E1, and the second secondary one-way ring R22. In this state, inasmuch as the frame transmission rate is less than the bandwidth of the second primary one-way ring R12 and of the second secondary one-way ring R22 and no congestion occurs.

When the queues are set respective destination congestion control nodes laid in all of the rings in the first congestion control node A1, all of the frames transmitted from the first client group C1 toward the fourth client group C4 pass through the transmission buffer consigned to the fourth congestion control node A4 in the first congestion control node A1.

It will be assumed that a client belonging to the second client group C2 transmits frames each having a rate of 4 megabits/sec toward a client belonging to the fourth client group C4 via the first primary one-way ring R11, the connection node E1, and the second secondary one-way ring R22. In this event, inasmuch as the frame transmission rate is less than the bandwidth of the first primary one-way ring R11 and a total rate of the flows flowing from the first client group C1 in the fourth client group C4 is less than the bandwidth of the second secondary one-way ring R22, no congestion occurs.

When the queues are set respective destination congestion control nodes laid in all of the rings in the second congestion control node A2, all of the frames transmitted from the second client group C2 toward the fourth client group C4 pass through the transmission buffer consigned to the fourth congestion control node A4 in the second congestion control node A2.

It will be assumed that a client belonging to the third client group C3 transmits frames each having a rate of 4 megabits/sec toward a client belonging to the fourth client group C4 via the second secondary one-way ring R22.

When the queues are set respective destination congestion control nodes laid in all of the rings in the third congestion control node A3, all of the frames transmitted from the third client group C3 toward the fourth client group C4 pass through the transmission buffer consigned to the fourth congestion control node A4 in the third congestion control node A3.

As far as the used amount of the transit buffer used in packets flowing in the second secondary one-way ring R22 does not exceed a lower limit value (which is herein equal to 5 kilobits) in the third congestion control node A3, the frames supplied with the third client group C3 and delivered to the second secondary one-way ring R22 are transferred toward the second secondary one-way ring R22 in preference to the frames supplied from the second secondary one-way ring R22.

Inasmuch as the frames transmitted from the first and the second client groups C1 and C2 already flow in the second secondary one-way ring R22, the output frame amount for the second secondary one-way ring R22 in the third congestion control node A3 is more than the bandwidth of the second secondary one-way ring R22 and congestion occurs in the output side for the second secondary one-way ring R22 in the third congestion control node A3.

It will be assumed that the used amount of the transit buffer in the third congestion control node A3 does not reach the lower limit value. Inasmuch as the frames transmitted from the third client group C3 is in preference to the frames supplied to the third congestion control node A3 via the second secondary one-way ring R22, the frames supplied to the third congestion control node A3 via the second secondary one-way ring R22 are stored in the transit buffer of the third congestion control node A3.

It will be assumed that the used amount of the transit buffer in the third congestion control node A3 exceeds the lower limit value. In this event, a priority is reversed and the frames supplied to the third congestion control node A3 via the second secondary one-way ring R22 is in preference to the frames which are transmitted from the third client group C3 and which flow in the second secondary one-way ring R22.

It will be assumed that an input to the third congestion control node A3 is excessive. In this event, processing due to reversal of priority is too late and a stored frame amount for the transit buffer in the third congestion control node A3 exceeds an upper limit value (which is herein equal to 8 kilobits). Under the circumstances, the third congestion control node A3 detects congestion occurrence in the second secondary one-way ring R22.

The third congestion control node A3 measures a transmission rate and a destination node number (that is, a flow number) of the frames which are supplied from the third client group C3 and which are transferred to the second secondary one-way ring R22. In addition, the third congestion control node A3 calculates "the transmission rate÷the flow number" as the allowable output amount and transmits congestion notification with the allowable output amount to the connection node E1 using the first secondary one-way ring R21. Herein, it will be assumed that the amount of the frames transferred from the third client group C3 to the second secondary one-way ring R22 is equal to 2 megabits/sec. Inasmuch as the destination node is one of the fourth congestion control node A4, the third congestion control node A3 transmits 2 megabits/sec÷1=2 megabits/sec as the allowable output amount.

While the third congestion control node A3 detects the congestion in the output side of the second secondary one-way ring R22, the third congestion control node A3 periodically sends the allowable output amount toward the connection node E1.

Inasmuch as the third congestion control node A3 does not detect congestion in the output side of the first secondary one-way ring R21, the third congestion control node A3 periodically sends the congestion notification indicative of no congestion occurrence (NULL) toward the fourth congestion control node A4 via the second secondary one-way ring R22.

The fourth congestion control node A4 receives the congestion notification including NULL information and cancels this notification.

The connection node E1 receives the congestion notification including the allowable output amount, confirms that a sending source of the congestion notification is not its own node, confirms that contents of the notification is not NULL, and transmits the congestion notification to the fifth congestion control node A5 using the first secondary one-way ring R21.

Sent from the connection node E1, the congestion notification is successively received and transferred in the fifth congestion control node A5 and the fourth congestion control node A4 and turns buck to the third congestion control node A3 by traveling around the first secondary one-way ring R21. When the third congestion control node A3 receives the congestion notification generated from its own node, the third congestion control node A3 cancels this notification and closes transfer of the congestion notification. In addition, herein, description is made without applying operation of the second embodiment.

Inasmuch as the connection node E1 receives the congestion notification from the first secondary one-way ring R21 and as the sending source of the congestion notification is the third congestion control node A3, the connection node E1 identifies that the congestion occurs in the output side of the third congestion control node A3 in the second secondary one-way ring R22. As a result, the connection node E1 estimates that the frames consigned to the fourth congestion control node A4 pass through the congestion link.

Inasmuch as the flow number flowing to the fourth congestion control node A4 in the connection node E1 is two, namely, a flow transmitted from the first congestion control node A1 and a flow transmitted from the second congestion control node A2, a weighting factor is equal to 2. As a result, the connection node E1 restricts an output of the transmission buffer consigned to the fourth congestion control node A4 so as to become 2 megabits/sec×2=4 megabits/sec that is the allowable output amount notified by the congestion notification.

Inasmuch as all of the frames transmitted toward the fourth congestion control node A4 in the connection node E1 pass through the transmission queue consigned to the fourth congestion control node A4, an output of the queue is restricted to 4 megabits/sec and the frames transmitted from the first and the second client groups C1 and C2 toward the fourth client group C4 are supplied to the third congestion control node A3 at a rate of 4 megabits/sec.

Inasmuch as the rate of the frames supplied from the second secondary one-way ring R22 is decreased to 4 megabits/sec in the third congestion control node A3, it is possible for the third congestion control node A3 to transmit the frames supplied from the third client group C3 toward the second secondary one-way ring R22 at a rate of 4 megabits/sec.

Inasmuch as flows for the fourth congestion control node A4 are restricted in the connection node E1, frames stored in the transmission queue consigned to the fourth congestion control node A4 increase in the connection node E1, the frame amount in the transmission queue exceeds a threshold value, and the connection node E1 detects congestion occurrence of the transmission queue consigned to the fourth congestion control node A4.

The connection node E1 measures a transmission rate and a destination node number (that is, a flow number) of the frames which are transferred from the transmission queue consigned to the fourth congestion control node A4 to the second secondary one-way ring R22. In addition, the connection node E1 calculates "the transmission rate÷the flow number" as the allowable output amount and transmits congestion notification with the allowable output amount to the first and the second congestion control nodes A1 and A2 using the first and the second primary one-way rings R11 and R12. This operation is called congestion notification extending between the rings.

Inasmuch as the flows caused by congestion main factor are flowed in the connection node E1 from both of the first and the second secondary one-way rings R21 and R22, a congestion notification frame is transmitted to both of the first and the second secondary one-way rings R21 and R22.

It will be assumed that the frame amount of frames transferred from the transmission queue consigned to the fourth congestion control node A4 to the second secondary one-way ring R22 is equal to 4 megabits/sec which is two flows as a breakdown thereof, the frame amount of frames transferred from the first congestion control node A1 to the fourth congestion control node A4 is equal to 2.5 megabits/sec, and the frame amount of frames transferred from the second congestion control node A2 to the fourth congestion control node A4 is equal to 1.5 megabits/sec. In this event, the connection node E1 transmits, as the allowable output amount, 4 megabits/sec÷2=2 megabits/sec to both of the first and the second congestion control nodes A1 and A2 using the first and the second one-way rings R11 and R12.

The first congestion control node A1 receives the congestion notification including the allowable output amount, confirms that a sending source of the congestion notification is not its own node, confirms that contents of the notification is not NULL, and transmits the congestion notification to the second congestion control node A2 using the first primary one-way ring R11.

Sent from the first congestion control node A1, the congestion notification is received and transferred in the second congestion control node A2 and turns buck to the connection node E1 by traveling around the first primary one-way ring R11. When the connection node E1 receives the congestion notification generated from its own node, the connection node E1 cancels this notification and closes transfer of the congestion notification.

The second congestion control node A2 also receives the congestion notification including the allowable output amount, confirms that a sending source of the congestion notification is not its own node, confirms that contents of the notification is not NULL, and transmits the congestion notification to the first congestion control node A1 using the second primary one-way ring R12.

Sent from the second congestion control node A2, the congestion notification is received and transferred in the first congestion control node A1 and turns buck to the connection node E1 by traveling around the second primary one-way ring R12. When the connection node E1 receives the congestion notification generated from its own node, the connection node E1 cancels this notification and closes transfer of the congestion notification.

Inasmuch as a sending source of the congestion notification is not laid in the first ring-shaped network R1 to which its own node belongs and as the sending source of the congestion notification is the fourth congestion control node A4, each of the first and the second congestion control nodes A1 and A2 identifies that the congestion occurs at the transmission queue consigned to the fourth congestion control node A4 in the connection node E1.

Inasmuch as the flow number flowing to the fourth congestion control node A4 in each of the first and the second congestion control nodes A1 and A2 is one, a weighting factor is equal to 1. As a result, each of the first and the second congestion control nodes A1 and A2 restricts an output of the transmission buffer consigned to the fourth congestion control node A4 so as to become 2 megabits/sec×1=2 megabits/sec that is the allowable output amount notified by the congestion notification.

Inasmuch as all of the frames transmitted toward the fourth congestion control node A4 in the first and the second congestion control nodes A1 and A2 pass through the transmission queue consigned to the fourth congestion control node A4, an output of the queue is restricted to 2 megabits/sec and the frames transmitted from the first and the second client groups C1 and C2 toward the fourth client group C4 are supplied to the connection node E1 at a rate of 2 megabits/sec, respectively.

While the congestion of the transmission queue is detected, the connection node E1 periodically transmits the congestion notification toward the first ring-shaped network.

Inasmuch as the rate of the frames supplied from the second secondary one-way ring R22 decreases to 4 megabits/sec in the third congestion control node A3, the used amount for the transit buffer in the third congestion control node A3 becomes lower. When the used amount for the transit buffer is not more than a threshold value, the third congestion control node A3 releases the congestion detection in the output side of the second secondary one-way ring R22.

When all of nodes do not receive the congestion notification where the allowable output amount is designated, all of nodes periodically ease restriction of the buffer output amount. The connection node E1 gradually increases an output of the transmission queue consigned to the fourth congestion control node A4 which is restricted to 4 megabits/sec. In addition, each of the first and the second congestion control nodes A1 and A2 gradually increases an output of the transmission queue consigned to the fourth congestion control node A4 which is restricted to 2 megabits/sec.

Whenever the congestion is detected, the above-mentioned operation is repeated. When there is no change in the operation of the client groups, the band of each flow gradually converges so as to approach about 3.33 megabits/sec which is an average value obtained by dividing the ring band into three equal parts.

Now, the description will proceed to merit of this embodiment.

Inasmuch as congestion control is carried out each ring in the third prior art, a frame loss occurs when packets flow from the first ring-shaped network R1 where there is no congestion to the first secondary one-way ring R21 where the congestion occurs. Therefore, excess frames which are lacked although the frames are transmitted flow in the first ring-shaped network R1 where there is no congestion.

It is possible for this embodiment to transmit congestion occurring in any one ring to another ring. In addition, it is possible to carry out restriction of a transmission frame amount in a congestion control node connected with a transmission client although congestion occurs in a ring which is several stages beyond the transmission client. As a result, it needs not flow excess frames where there is possibility of be abandoned in a connection node on the way in a ring near to the transmission client.

In addition, a lot of congestion notifications flow in the ring-shaped networks when all of the congestion notifications are simultaneously notified all of the ring-shaped networks connected. Almost of the congestion notifications are actually not used although the congestion notifications are transmitted, if anything, they are operable as congestion factors, and it is feared to congest the networks.

In this embodiment, the congestion notification is notified only a ring which is connected with the transmission client or the connection node relating to congestion. As a result, excess congestion notification is not flow in a ring where a flow related to the congestion does not pass through.

Figure 22:
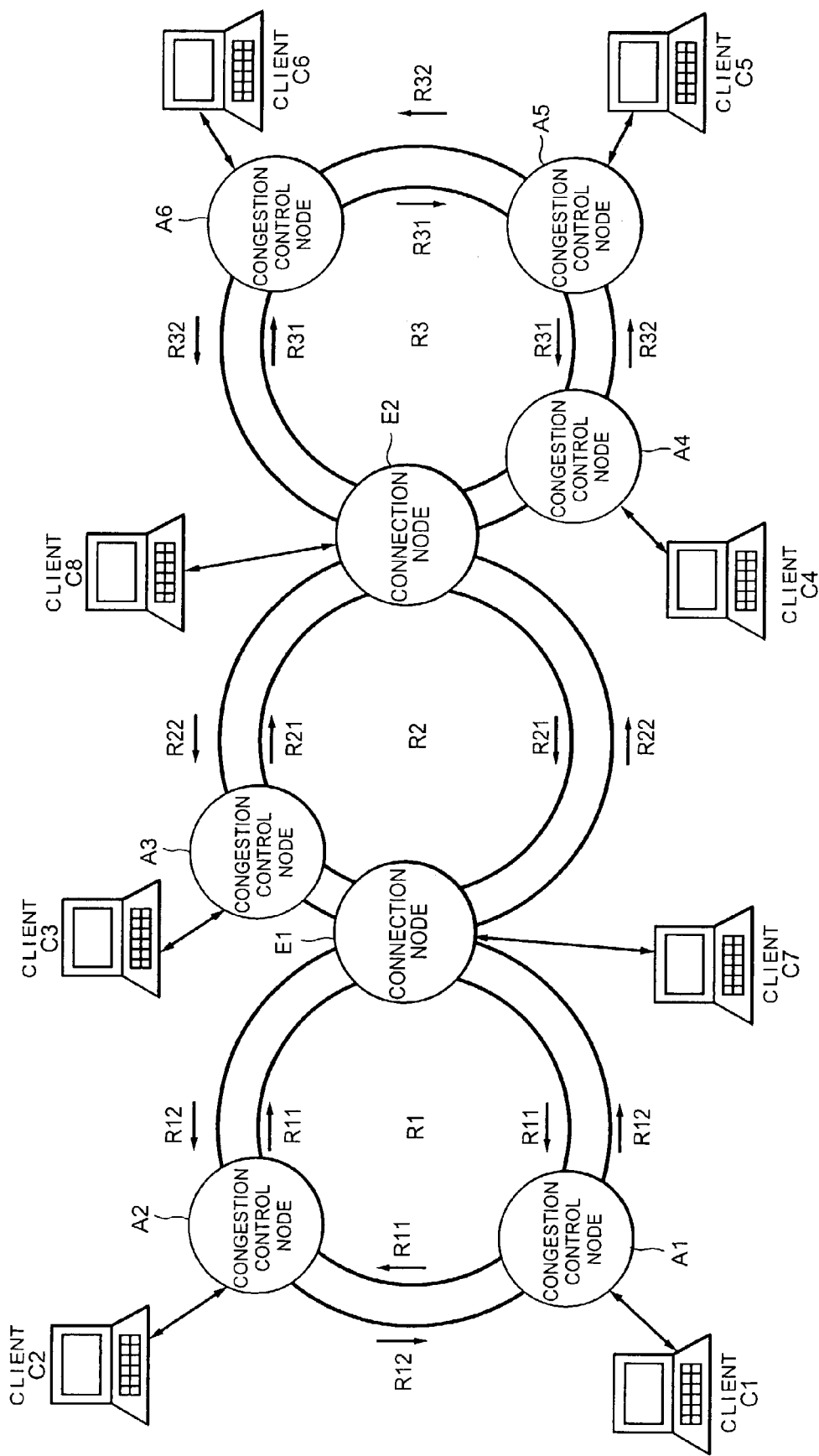
FIG. 22 is a block diagram of a congestion control system according to a seventh embodiment of this invention.

Referring now to FIG. 22, the description will proceed to a congestion control system according to a seventh embodiment of this invention. The congestion control system according to the seventh embodiment of this invention corresponds to a case where a ring-shaped network is added to the congestion control system according to the sixth embodiment of this invention.

Referring to FIG. 22, the illustrated congestion control system is similar in structure and operation to the congestion control system according to the sixth embodiment of this invention illustrated in FIG. 18 except that a second connection node E2 and a third ring-shaped network R3 are added, the fourth and the fifth congestion control nodes A4 and A5 are shifted on the third ring-shaped network R3, and the congestion control system further comprises a sixth congestion control node A6 on the third ring-shaped network R3.

In the sixth embodiment of this invention, a congestion occurring at any ring may be notified a transmission node when there are flows extending between the rings and when the transmission node and a destination node are laid in adjacent rings.

In this embodiment of this invention, a congestion occurrence may be notified a transmission node when there are flows extending among three or more rings which are not adjacent and when a congestion occurs at any position on paths of the flows.

By this embodiment, the first and the sixth embodiments, it is disclosed that a congestion occurring at any position may be notified the transmission node for the flows extending one or more rings.

The second connection node E2 has a function similar to that of the first connection node E1 in the sixth embodiment of this invention illustrated in FIG. 18.

The sixth congestion control node A6 has a function similar to that of the first congestion control node A1 in the sixth embodiment of this invention illustrated in FIG. 18.

Each of the seventh and the eighth client groups C7 and C8 has a function similar to that of the first client group C1 in the sixth embodiment of this invention illustrated in FIG. 18.

Referring to FIG. 22, the description will be made as regards a congestion control operation in this embodiment in a case where there is flows extending between a plurality of rings, a queue is set each destination congestion control node laid in all of the rings in each node, the transmission node of the flows extending the rings and a final destination node are not laid in adjacent rings using an actual example in detailed.

In FIG. 22, it will be assumed that a rate of each link for linking the first client group C1 with the first congestion control node A1, the second client group C2 with the second congestion control node A2, the third client group C3 with the third congestion control node A3, the fourth client group C4 with the fourth congestion control node A4, the fifth client group C5 with the fifth congestion control node A5, the sixth client group C6 with the sixth congestion control node A6, the seventh client group C7 with the first connection node E1, and the eighth client group C8 with the second connection node E2 is equal to 100 megabits/sec and a rate of the first primary one-way ring R11, of the second primary one-way ring R12, of the first secondary one-way ring R21, of the second secondary one-way ring R22, of a first ternary one-way ring R31, and of a second ternary one-way ring R32 is equal to 10 megabits/sec.

It will be assumed that a client belonging to the first client group C1 transmits frames each having a rate of 4 megabits/sec toward a client belonging to the fifth client group C5 via the second primary one-way ring R12, the first connection node E1, the first secondary one-way ring R21, the second connection node E2, and the second ternary one-way ring R32. In this state, inasmuch as the frame transmission rate is less than the bandwidth of the second primary one-way ring R12, of the first secondary one-way ring R21, and of the second ternary one-way ring R32 and no congestion occurs.

When the queues are set respective destination congestion control nodes laid in all of the rings in the first congestion control node A1, all of the frames transmitted from the first client group C1 toward the fifth client group C5 pass through the transmission buffer consigned to the fifth congestion control node A5 in the first congestion control node A1.

It will be assumed that a client belonging to the second client group C2 transmits frames each having a rate of 4 megabits/sec toward a client belonging to the fifth client group C5 via the first primary one-way ring R11, the first connection node E1, the first secondary one-way ring R21, the second connection node E2, and the second ternary one-way ring R32. In this event, inasmuch as the frame transmission rate is less than the bandwidth of the first primary one-way ring R11 and a total rate of the flows flowing from the first client group C1 in the fifth client group C5 is less than the bandwidth of the first secondary one-way ring R21 and of the second ternary one-way ring R32, no congestion occurs.

When the queues are set respective destination congestion control nodes laid in all of the rings in the second congestion control node A2, all of the frames transmitted from the second client group C2 toward the fifth client group C5 pass through the transmission buffer consigned to the fifth congestion control node A5 in the second congestion control node A2.

It will be assumed that a client belonging to the fourth client group C4 transmits frames each having a rate of 4 megabits/sec toward a client belonging to the fifth client group C5 via the second ternary one-way ring R32.

When the queues are set respective destination congestion control nodes laid in all of the rings in the fourth congestion control node A4, all of the frames transmitted from the fourth client group C4 toward the fifth client group C5 pass through the transmission buffer consigned to the fifth congestion control node A5 in the fourth congestion control node A4.

As far as the used amount of the transit buffer used in packets flowing in the second ternary one-way ring R32 does not exceed a lower limit value (which is herein equal to 5 kilobits) in the fourth congestion control node A4, the frames supplied with the fourth client group C4 and delivered to the second secondary one-way ring R22 are transferred toward the second ternary one-way ring R32 in preference to the frames supplied from the second ternary one-way ring R32.

Inasmuch as the frames transmitted from the first and the second client groups C1 and C2 already flow in the second ternary one-way ring R32, the output frame amount for the second ternary one-way ring R32 in the fourth congestion control node A4 is more than the bandwidth of the second ternary one-way ring R32 and congestion occurs in the output side for the second ternary one-way ring R32 in the fourth congestion control node A4.

It will be assumed that the used amount of the transit buffer in the fourth congestion control node A4 does not reach the lower limit value. Inasmuch as the frames transmitted from the fourth client group C4 is in preference to the frames supplied to the fourth congestion control node A4 via the second ternary one-way ring R32, the frames supplied to the fourth congestion control node A4 via the second ternary one-way ring R32 are stored in the transit buffer of the fourth congestion control node A4.

It will be assumed that the used amount of the transit buffer in the fourth congestion control node A4 exceeds the lower limit value. In this event, a priority is reversed and the frames supplied to the fourth congestion control node A4 via the second ternary one-way ring R32 is in preference to the frames which are transmitted from the fourth client group C4 and which flow in the second ternary one-way ring R32.

It will be assumed that an input to the fourth congestion control node A4 is excessive. In this event, processing due to reversal of priority is too late and a stored frame amount for the transit buffer in the fourth congestion control node A4 exceeds an upper limit value (which is herein equal to 8 kilobits). Under the circumstances, the fourth congestion control node A4 detects congestion occurrence in the second ternary one-way ring R32.

The fourth congestion control node A4 measures a transmission rate and a destination node number (that is, a flow number) of the frames which are supplied from the fourth client group C4 and which are transferred to the second ternary one-way ring R32. In addition, the fourth congestion control node A4 calculates "the transmission rate÷the flow number" as the allowable output amount and transmits congestion notification with the allowable output amount to the second connection node E1 using the first ternary one-way ring R31. Herein, it will be assumed that the amount of the frames transferred from the fourth client group C4 to the second ternary one-way ring R32 is equal to 2 megabits/sec. Inasmuch as the destination node is one of the fifth congestion control node A5, the fourth congestion control node A4 transmits 2 megabits/sec÷1=2 megabits/sec as the allowable output amount.

While the fourth congestion control node A4 detects the congestion in the output side of the second ternary one-way ring R32, the fourth congestion control node A4 periodically sends the allowable output amount toward the second connection node E2.

Inasmuch as the fourth congestion control node A4 does not detect congestion in the output side of the first ternary one-way ring R31, the fourth congestion control node A4 periodically sends the congestion notification indicative of no congestion occurrence (NULL) toward the fifth congestion control node A5 via the second ternary one-way ring R32.

The fifth congestion control node A5 receives the congestion notification including NULL information and cancels this notification.

The second connection node E2 receives the congestion notification including the allowable output amount, confirms that a sending source of the congestion notification is not its own node, confirms that contents of the notification is not NULL, and transmits the congestion notification to the sixth congestion control node A6 using the first ternary one-way ring R31.

Sent from the second connection node E2, the congestion notification is successively received and transferred in the sixth congestion control node A6 and the fifth congestion control node A5 and turns buck to the fourth congestion control node A4 by traveling around the first ternary one-way ring R31. When the fourth congestion control node A4 receives the congestion notification generated from its own node, the fourth congestion control node A4 cancels this notification and closes transfer of the congestion notification.

Inasmuch as the second connection node E2 receives the congestion notification from the first ternary one-way ring R31 and as the sending source of the congestion notification is the fourth congestion control node A4, the second connection node E2 identifies that the congestion occurs in the output side of the fourth congestion control node A4 in the second ternary one-way ring R32. As a result, the second connection node E2 estimates that the frames consigned to the fifth congestion control node A5 pass through the congestion link.

Inasmuch as the flow number flowing to the fifth congestion control node A5 in the second connection node E2 is two, namely, a flow transmitted from the first congestion control node A1 and a flow transmitted from the second congestion control node A2, a weighting factor is equal to 2. As a result, the second connection node E2 restricts an output of the transmission buffer consigned to the fifth congestion control node A5 so as to become 2 megabits/sec×2=4 megabits/sec that is the allowable output amount notified by the congestion notification.

Inasmuch as all of the frames transmitted toward the fifth congestion control node A5 in the second connection node E2 pass through the transmission queue consigned to the fifth congestion control node A5, an output of the queue is restricted to 4 megabits/sec and the frames transmitted from the first and the second client groups C1 and C2 toward the fifth client group C5 are supplied to the fourth congestion control node A4 at a rate of 4 megabits/sec.

Inasmuch as the rate of the frames supplied from the second ternary one-way ring R32 is decreased to 4 megabits/sec in the fourth congestion control node A4, it is possible for the fourth congestion control node A4 to transmit the frames supplied from the fourth client group C4 toward the second ternary one-way ring R32 at a rate of 4 megabits/sec.

Inasmuch as flows for the fifth congestion control node A5 are restricted in the second connection node E2, frames stored in the transmission queue consigned to the fifth congestion control node A5 increase in the second connection node E2, the frame amount in the transmission queue exceeds a threshold value, and the second connection node E2 detects congestion occurrence of the transmission queue consigned to the fifth congestion control node A5.

The second connection node E2 measures a transmission rate and a destination node number (that is, a flow number) of the frames which are transferred from the transmission queue consigned to the fifth congestion control node A5 to the second ternary one-way ring R32. In addition, the second connection node E2 calculates "the transmission rate÷the flow number" as the allowable output amount and transmits congestion notification with the allowable output amount to the first and the second congestion control nodes A1 and A2 using the first and the second secondary one-way rings R21 and R22.

In the second connection node E2, congestion notification in a case where the transmission queue overflows is transmitted to the transmission queue where the congestion is detected in a direction where there is the congestion control node which transmits frames at the fastest rate.

It will be assumed that the frame amount of frames transferred from the transmission queue consigned to the fifth congestion control node A5 to the second ternary one-way ring R32 is equal to 4 megabits/sec which is two flows as a breakdown thereof, the frame amount of frames transferred from the first congestion control node A1 to the fifth congestion control node A5 is equal to 2.5 megabits/sec, and the frame amount of frames transferred from the second congestion control node A2 to the fifth congestion control node A5 is equal to 1.5 megabits/sec. In this event, the second connection node E2 transmits, as the allowable output amount, 4 megabits/sec÷2=2 megabits/sec to the first connection node E1 using the second secondary one-way ring R22.

The first connection node E1 receives the congestion notification including the allowable output amount, confirms that a sending source of the congestion notification is not its own node, confirms that contents of the notification is not NULL, and transmits the congestion notification to the second connection node E1 using the second secondary one-way ring R22.

Sent from the first connection node E1, the congestion notification turns buck to the second connection node E2 by traveling around the second secondary one-way ring R22. When the second connection node E2 receives the congestion notification generated from its own node, the second connection node E2 cancels this notification and closes transfer of the congestion notification.

Inasmuch as a sending source of the congestion notification is not laid in the first and the second ring-shaped networks R1 and R2 to which its own node belongs and as the sending source of the congestion notification is the fifth congestion control node A5, the first connection node E1 identifies that the congestion occurs at the transmission queue consigned to the fifth congestion control node A5 in the second connection node E2.

Inasmuch as the flow number flowing to the fifth congestion control node A5 in the first connection node E1 is two which are transmitted from the first and the second congestion control nodes A1 and A2, a weighting factor is equal to 2. As a result, the first connection node E1 restricts an output of the transmission buffer consigned to the fifth congestion control node A5 so as to become 2 megabits/sec×2=4 megabits/sec that is the allowable output amount notified by the congestion notification.

Inasmuch as all of the frames transmitted toward the fifth congestion control node A5 in the first connection node E1 pass through the transmission queue consigned to the fifth congestion control node A5, an output of the queue is restricted to 4 megabits/sec and the frames transmitted from the first connection node E1 toward the fifth client group C5 are supplied to the second connection node E2 at a total rate of 4 megabits/sec.

While the congestion of the transmission queue is detected, the second connection node E2 periodically transmits the congestion notification toward the second ring-shaped network R2.

Inasmuch as flows for the fifth congestion control node A5 are restricted in the first connection node E1, frames stored in the transmission queue consigned to the fifth congestion control node A5 increase in the first connection node E1, the frame amount in the transmission queue exceeds a threshold value, and the first connection node E1 detects congestion occurrence of the transmission queue consigned to the fifth congestion control node A5.

The first connection node E1 measures a transmission rate and a destination node number (that is, a flow number) of the frames which are transferred from the transmission queue consigned to the fifth congestion control node A5 to the first secondary one-way ring R21. In addition, the first connection node E1 calculates "the transmission rate÷the flow number" as the allowable output amount and transmits congestion notification with the allowable output amount to the first and the second congestion control nodes A1 and A2 using the first and the second primary one-way rings R11 and R12.

In the first connection node E1, congestion notification in a case where the transmission queue overflows is transmitted to the transmission queue where the congestion is detected in a direction where there is the congestion control node which transmits frames at the fastest rate.

It will be assumed that the frame amount of frames transferred from the transmission queue consigned to the fifth congestion control node A5 to the first secondary one-way ring R21 is equal to 4 megabits/sec which is two flows as a breakdown thereof, the frame amount of frames transferred from the first congestion control node A1 to the fifth congestion control node A5 is equal to 2.5 megabits/sec, and the frame amount of frames transferred from the second congestion control node A2 to the fifth congestion control node A5 is equal to 1.5 megabits/sec. In this event, the first connection node E1 transmits, as the allowable output amount, 4 megabits/sec÷2=2 megabits/sec to both of the first and the second congestion control nodes A1 and A2 using the first and the second primary one-way rings R11 and R12.

The first congestion control node A1 receives the congestion notification including the allowable output amount, confirms that a sending source of the congestion notification is not its own node, confirms that contents of the notification is not NULL, and transmits the congestion notification to the second congestion control node A2 using the first primary one-way ring R11.

Sent from the first congestion control node A1, the congestion notification is received and transferred in the second congestion control node A2 and turns buck to the first connection node E1 by traveling around the first primary one-way ring R11. When the first connection node E1 receives the congestion notification generated from its own node, the first connection node E1 cancels this notification and closes transfer of the congestion notification.

The second congestion control node A2 also receives the congestion notification including the allowable output amount, confirms that a sending source of the congestion notification is not its own node, confirms that contents of the notification is not NULL, and transmits the congestion notification to the first congestion control node A1 using the second primary one-way ring R12.

Sent from the second congestion control node A2, the congestion notification is received and transferred in the first congestion control node A1 and turns buck to the first connection node E1 by traveling around the second primary one-way ring R12. When the first connection node E1 receives the congestion notification generated from its own node, the first connection node E1 cancels this notification and closes transfer of the congestion notification.

Inasmuch as a sending source of the congestion notification is not laid in the first ring-shaped network R1 to which its own node belongs and as the sending source of the congestion notification is the fifth congestion control node A5, each of the first and the second congestion control nodes A1 and A2 identifies that the congestion occurs at the transmission queue consigned to the fifth congestion control node A5 in the first connection node E1.

Inasmuch as the flow number flowing to the fifth congestion control node A5 in each of the first and the second congestion control nodes A1 and A2 is one, a weighting factor is equal to 1. As a result, each of the first and the second congestion control nodes A1 and A2 restricts an output of the transmission buffer consigned to the fifth congestion control node A5 so as to become 2 megabits/sec×1=2 megabits/sec that is the allowable output amount notified by the congestion notification.

Inasmuch as all of the frames transmitted toward the fifth congestion control node A5 in the first and the second congestion control nodes A1 and A2 pass through the transmission queue consigned to the fifth congestion control node A5, an output of the queue is restricted to 2 megabits/sec and the frames transmitted from the first and the second client groups C1 and C2 toward the fifth client group C5 are supplied to the first connection node E1 at a rate of 2 megabits/sec, respectively.

While the congestion of the transmission queue is detected, the first connection node E1 periodically transmits the congestion notification toward the first ring-shaped network R1.

Inasmuch as the rate of the frames supplied from the second ternary one-way ring R32 decreases to 4 megabits/sec in the fourth congestion control node A4, the used amount for the transit buffer in the fourth congestion control node A4 becomes lower. When the used amount for the transit buffer is not more than a threshold value, the fourth congestion control node A4 releases the congestion detection in the output side of the second ternary one-way ring R32.

When all of nodes do not receive the congestion notification where the allowable output amount is designated, all of nodes periodically ease restriction of the buffer output amount. Each of the first and the second connection nodes E1 and E2 gradually increases an output of the transmission queue consigned to the fifth congestion control node A5 which is restricted to 4 megabits/sec. In addition, each of the first and the second congestion control nodes A1 and A2 gradually increases an output of the transmission queue consigned to the fifth congestion control node A5 which is restricted to 2 megabits/sec.

Whenever the congestion is detected, the above-mentioned operation is repeated. When there is no change in the operation of the client groups, the band of each flow gradually converges so as to approach about 3.33 megabits/sec which is an average value obtained by dividing the ring band into three equal parts.

Now, the description will proceed to merit of this embodiment.

In this embodiment, it is possible to transmit the congestion occurring at any one ring to another ring beyond by a plurality of stages. Although the congestion occurs in a ring beyond from a transmission client by any stages, it is possible to carry out restriction of a transmission frame amount in a congestion control node connected to the transmission client. As a result, it needs not flow, in a ring near to the transmission client, excess frames where there is high possibility to be abandoned at the connection node on the way.

In this embodiment, the congestion notification is notified only a ring connected with the transmission client or the connection node related to the congestion. As a result, excess congestion notification does not flow in a ring where the flow related to the congestion does not pass through.

While this invention has thus far been described in conjunction with a several embodiments thereof, it will readily be possible for those skilled in the art to put this invention into practice in various other manners.

What is claimed is:

1. A congestion control system for congestion controlling communications on a network, said congestion control system comprising a plurality of congestion control nodes on said network, each of said congestion control nodes carrying out congestion control of communication data for transmitting or repeating, each of said congestion control nodes comprising:

a routing table for designating a transfer path for destination;

congestion detection means for detecting a congestion level of communications in said congestion control node in question to produce detected congestion information;

congestion notifying means, connected to said congestion detection means, for notifying other congestion control nodes of said detected congestion information;

congestion receiving means for receiving congestion information from said other congestion control nodes to produce received congestion information;

congestion flow determination means, connected to said congestion receiving means and said routing table, for determining a flow, along the transfer path for destination, which affects congestion, wherein said congestion flow determination means determines said flow with reference to said received congestion information and said routing table, wherein said determined flow is a flow having a congestion level which is not less than a predetermined level, and wherein said congestion flow determination means produces an estimated result indicative of the determined flow;

classification processing means for classifying flows on said network into restriction candidate flows for restricting a transmission amount and non-restriction candidate flows for not restricting the transmission amount;

flow number measuring means, connected to said classification processing means, for measuring the number of said restriction candidate flows and of said non-restriction candidate flows to produce a measured result;

weighting determining means, connected to said flow number measuring means, for determining a weighting of restriction in the transmission amount for said restriction candidate flows on the basis of said measured result to produce a weighted result; and output adjusting means, connected to said congestion flow determination means and said weighting determining means, for restricting the transmission amount for each of said restriction candidate flows on the basis of said estimated result and said weighted result.

2. A congestion control system as claimed in claim 1, wherein each of said congestion control nodes further comprises:

determining means, connected to said congestion flow determination means, for determining said determined flow as a restriction candidate flow for restricting a transmission amount; and output adjusting means, connected to said determining means, for carrying out restriction of the transmission amount for data in said restriction candidate flow.

3. A congestion control system as claimed is claim 1, wherein each of said congestion control nodes further comprises a transit buffer for use in transfer of said communication data between adjacent nodes on said network, said congestion detection means carrying out processing for detecting the congestion level of said communications of the basic of a used amount of said transit buffer.

4. A congestion control system as claimed in claim 3, wherein each of said congestion control nodes further comprises:
  failure detection means for detecting a failure where communications cannot make on said network to produce section information indicative a section on said network where said failure is occurred; and
  failure notifying means, connected to said failure detection means, for notifying said other congestion control nodes on said network of a failure notification as said section information.

5. A congestion control system as claimed in claim 4, wherein each of said congestion control nodes further comprises:
  failure receiving means for receiving said failure notification from other congestion control nodes on said network to produce a received failure notification; and
  failure processing means, connected to said failure receiving means, for changing the routing table on the basis of said received failure notification to make said section where the failure is detected in said network avoid from the transfer path.

6. A congestion control system as claimed in claim 5, wherein each of said congestion control nodes further comprises means for canceling transfer of said failure notification for a particular congestion control node transferred on said network when said failure occurs in the transfer path to said particular congestion control node.

7. A congestion control system as claimed in claim 1, wherein said congestion flow determination means makes said determined flow communication between said congestion control nodes on said network.

8. A congestion control system as claimed in claim 1, wherein said congestion flow determination means makes said determined flow include communication between each of said congestion control nodes on said network and a client connected to said congestion control node in question.

9. A congestion control system as claimed in claim 1, wherein said congestion control system controls said congestion of said communication data for each packet.

10. A congestion control system as claimed in claim 1, wherein said congestion control system controls said congestion of said communication data for each frame for transferring a packet using a lower layer.

11. A congestion control system as claimed in claim 1, wherein said network is a ring-shaped network.

12. A congestion control system as claimed in claim 1, wherein said network is a network where a plurality of ring-shaped networks are mutually connected to one another.

13. A congestion control system as claimed in claim 12, wherein said network comprises means for repeating communications between said plurality of ring-shaped network.

14. A congestion control system for congestion controlling communications on a network, said congestion control system comprising a plurality of congestion control nodes on said network, each of said congestion control nodes carrying out congestion control of communication data for transmitting or repeating, each of said congestion control nodes comprising:
  a routing table for designating a transfer path for destination;
  congestion detection means for detecting a congestion level of communications in said congestion control node in question to produce detected congestion information;
  congestion notifying means, connected to said congestion detection means, for notifying other congestion control nodes of said detected congestion information;
  congestion receiving means for receiving congestion information from said other congestion control nodes to produce received congestion information;
  congestion flow determination means, connected to said congestion receiving means and said routing table, for determining a flow, along the transfer path for destination, which affects congestion,
    wherein said congestion flow determination means determines said flow with reference to said received congestion information and said routing table,
    wherein said determined flow is a flow having a congestion level which is not less than a predetermined level, and
    wherein said congestion flow determination means produces an estimated result indicative of the determined flow;
  classification processing means for classifying flows on said network to relate to queues;
  flow number measuring means, connected to said classification processing means, for measuring the number of said flows passing through said queues for each of said queues to produce a measured result;
  weighting determining means, connected to said flow number measuring means, for determining, on the basis of said measured result, a weighting of restriction in the transmission amount for said flows passing through said queues for each of said queues to produce a weighted result; and
  output adjusting means, connected to said congestion flow determination means and said weighting determining means, for restricting, on the basis of said estimated result and said weighted result, the transmission amount for each of said queues.

15. A congestion control system for congestion controlling communications on a network, said congestion control system comprising a plurality of congestion control nodes on said network, each of said congestion control nodes carrying out congestion control of communication data for transmitting or repeating, each of said congestion control nodes comprising:
  a routing table for designating a transfer path for destination;
  congestion detection means for detecting a congestion level of communications in said congestion control node in question to produce detected congestion information;
  congestion notifying means, connected to said congestion detection means, for notifying other congestion control nodes of said detected congestion information;
  congestion receiving means for receiving congestion information from said other congestion control nodes to produce received congestion information;
  congestion flow determination means, connected to said congestion receiving means and said routing table, for determining a flow, along the transfer path for destination, which affects congestion,
    wherein said congestion flow determination means determines said flow with reference to said received congestion information and said routing table,
    wherein said determined flow is a flow having a congestion level which is not less than a predetermined level, and
    wherein said congestion flow determination means produces an estimated result indicative of the determined flow;
  a transit buffer for use in transfer of said communication data between adjacent nodes on said network, wherein said congestion detection means carries out processing for detecting the congestion level of said communications on the basis of a used amount of said transit buffer;

a transmission buffer for holding communication data until a transmission possible time instant; and output measuring means, connected to said transmission buffer, for measuring an amount of said transmission data produced by said transmission buffer, said output measuring means producing a buffer output measured amount, said congestion notifying means comprising:

command generating means, connected to said transit buffer and said output measuring means, for generating, on the basis of the used amount of said transit buffer, a data amount produced by said transit buffer, and said buffer output measured amount, a control command for instructing restriction of communications for other congestion control nodes on said network;

command transmitting means, connected to said command generating means, for transmitting said control command to said other congestion control nodes on said network with said control command added to said congestion information;

command receiving means for receiving, from said other congestion control nodes on said network, said congestion information to which said control command is added, said command receiving means producing a received control command; and command execution means, connected to said command receiving means, for executing said received control command.

16. A congestion control system for congestion controlling communications on a network, said congestion control system comprising a plurality of congestion control nodes on said network, each of said congestion control nodes carrying out congestion control of communication data for transmitting or repeating, each of said congestion control nodes comprising:

a routing table for designating a transfer path for destination;

congestion detection means for detecting a congestion level of communications in said congestion control node in question to produce detected congestion information;

congestion notifying means, connected to said congestion detection means, for notifying other congestion control nodes of said detected congestion information;

congestion receiving means for receiving congestion information from said other congestion control nodes to produce received congestion information;

congestion flow determination means, connected to said congestion receiving means and said routing table, for determining a flow, along the transfer path for destination, which affects congestion, wherein said congestion flow determination means determines said flow with reference to said received congestion information and said routing table, wherein said determined flow is a flow having a congestion level which is not less than a predetermined level, and wherein said congestion flow determination means produces an estimated result indicative of the determined flow;

wherein said network is a network where a plurality of ring-shaped networks are mutually connected to one another;

wherein said network comprises means for repeating communications between said plurality of ring-shaped networks;

wherein each of said congestion control units further comprises ring identifying means for identifying an input source ring where said flow is inputted, said ring identifying means producing an identified result, said congestion flow determination means carrying out determination processing for the flow on the basis of said identified result, the congestion information, and the routing table for designating the transfer path to the destination.

17. A congestion control node for carrying out congestion control for communications on a network, said congestion control node comprising:

receiving means for receiving, from another node on said network, congestion information of the communication generated from said other node;

a routing table for designating a transfer path for communication data to a destination;

congestion flow determination means, connected to said congestion receiving means and said routing table, for determining a flow, along the transfer path for communication data to a destination, which affects congestion, wherein said congestion flow determination means determines said flow with reference to said received congestion information and said routing table, wherein said determined flow is a flow having a congestion level which is not less than a predetermined level, and wherein said congestion flow determination means produces an estimated result indicative of the determined flow;

classification processing means for classifying flows on said network into restriction candidate flows where a transmission amount is restricted and non-restriction candidate flows where the transmission amount is not restricted;

flow number measuring means, connected to said classification processing means, for measuring the number of said restriction candidate flows and of said non-restriction candidate flows, said flow number measuring means producing a measured result;

weighting determining means, connected to said flow number measuring means, for determining a weighting of restriction in the transmission amount for said restriction candidate flows on the basis of said measured result, said weighting determining means producing a weighted result; and output adjusting means, connected do said weighting determining means and said congestion flow determination means, for restricting the transmission amount on the basis of said estimated result and said weighted result for each of said restriction candidate flows.

18. A congestion control node as claimed in claim 17, wherein further comprises:

determining means, connected to said congestion flow determination means, for determining said determined flow as a restriction candidate flow for restricting a transmission amount; and output adjusting means, connected to said determining means, for carrying out restriction of the transmission amount for data in said restriction candidate flow.

19. A congestion control node as claimed in claim 17, wherein further comprises:

congestion detection means for detecting a congestion level in communications to produce detected congestion information indicative of said congestion level; and congestion notifying means, connected to said congestion detection means, for notifying other nodes on said network of said detected congestion information.

20. A congestion control node as claimed in claim 19, wherein further comprises a transit buffer for use in transferring the communication data between adjacent nodes on said network, said congestion detection means carrying out a processing for detecting the congestion level of the communications on the basis of a used amount of said transit buffer.

21. A congestion control node as claimed in claim 19, wherein further comprises:
failure detection means for detecting a failure where communications cannot make on said network, said failure detection means producing section information indicative of a section on said network where said failure occurs; and
failure notifying means, connected do said failure detection means, for notifying other nodes on said network of said section information as a failure notification.

22. A congestion control node as claimed in claim 21, wherein further comprises:
failure receiving means for receiving said failure notification from said other nodes on said network to produce a received failure notification; and
failure processing means, connected to said routing table and said failure receiving means, for changing said routing table on the basis of said received failure notification to avoid said section where the failure is detected on said network from the transfer path.

23. A congestion control node as claimed in claim 22, wherein further comprises transfer canceling means for canceling transfer of said failure notification for a particular node transferred on said network when failure occurs in the transfer path to said particular node.

24. A congestion control node as claimed in class in claim 17, wherein said congestion flow determination means makes said determined flow include communication between said node on said network.

25. A congestion control node as claimed in class in claim 17, wherein said congestion flow determination means makes said determined flow include communication between each node and a client connected to said node.

26. A congestion control node as claimed in claim 17, wherein said network is a ring-shaped network.

27. A congestion control node as claimed in claim 17, wherein said network is a network where a plurality of ring-shaped networks are mutually connected one another.

28. A congestion control node as claimed in claim 27, wherein said network comprises means for repeating communications between said plurality of ring-shaped networks.

29. A congestion control node for carrying out congestion control for communications on a network, said congestion control node comprising:
receiving means for receiving, from another node on said network, congestion information of the communication generated from said other node;
a routing table for designating a transfer path for communication data to a destination;
congestion flow determination means, connected to said congestion receiving means and said routing table, for determining a flow, along the transfer path for communication data to a destination, which affects congestion,
wherein said congestion flow determination means determines said flow with reference to said received congestion information and said routing table,
wherein said determined flow is a flow having a congestion level which is not less than a predetermined level, and
wherein said congestion flow determination means produces an estimated result indicative of the determined flow;
classification processing means for classifying flows on said network to relate to queues;
flow number measuring means, connected to said classification processing means, for measuring the number of said flows passing through said queues each queue, said flow number measuring means producing a measured result;
weighting determining means, connected to said flow number measuring means, for determining, on the basis of said measured result, a weighting in restriction of the transmission amount for said flows passing through said queues each queue, said weighting determining means producing a weighted result; and
output adjusting means, connected to said congestion flow determination means and said weighting determining means, for restricting the transmission amount each queue on the basis of said estimated result and said weighted result.

30. A congestion control node for carrying out congestion control for communications on a network, said congestion control node comprising:
receiving means for receiving, from another node on said network, congestion information of the communication generated from said other node;
a routing table for designating a transfer path for communication data to a destination;
congestion flow determination means, connected to said congestion receiving means and said routing table, for determining a flow, along the transfer path for communication data to a destination, which affects congestion,
wherein said congestion flow determination means determines said flow with reference to said received congestion information and said routing table,
wherein said determined flow is a flow having a congestion level which is not less than a predetermined level, and
wherein said congestion flow determination means produces an estimated result indicative of the determined flow;
congestion detection means for detecting a congestion level in communications to produce detected congestion information indicative of said congestion level;
congestion notifying means, connected to said congestion detection means, for notifying other nodes on said network of said detected congestion information;
a transit buffer for use in transferring the communication data between adjacent nodes on said network,
wherein said congestion detection means carries out a processing for detecting the congestion level of the communications on the basis of a used amount of said transit buffer;
a transmission buffer for holding the communication data until a transmission possible time instant; and
output measuring means, connected to said transmission buffer, for measuring an amount of said transmission data produced by said transmission buffer, said output measuring means producing a buffer output measured amount, said congestion notifying means comprising command generating means, connected to said transit buffer and said output measuring means, for generating, on the basis of the used amount of said transit buffer, a data amount produced by said transit buffer, and said buffer output measured amount, a control command instructing restriction of the communications for other nodes on said network, said congestion notifying means transmitting said control command to said other nodes on said network with said control command included in said detected congestion information.

31. A congestion control node for carrying out congestion control for communications on a network, said congestion control node comprising:
receiving means for receiving, from another node on said network, congestion information of the communication generated from said other node;
a routing table for designating a transfer path for communication data to a destination;
congestion flow determination means, connected to said congestion receiving means and said routing table, for determining a flow, along the transfer path for communication data to a destination, which affects congestion,
wherein said congestion flow determination means determines said flow with reference to said received congestion information and said routing table,
wherein said determined flow is a flow having a congestion level which is not less than a predetermined level, and
wherein said congestion flow determination means produces an estimated result indicative of the determined flow;
wherein said network is a network where a plurality of ring-shaped networks are mutually connected one another;
wherein said network comprises means for repeating communications between said plurality of ring-shaped networks;
wherein further comprises ring identifying means for identifying an input source ring where said flows are inputted, said ring identifying means producing an identified result, said congestion flow determination means carrying out a processing for determining the flow on the basis of said identified result, said congestion information, and said routing table.

32. A congestion control program for controlling, by controlling a computer, congestion of communications in a congestion control node which is connected to a network and which replays the communications by a client, said congestion control program comprises:
a receiving function for receiving, from another node on said network, congestion information of the communication generated from said other node;
a congestion flow determination function for determining a flow, along a transfer path for communication data to a destination, which affects congestion,
wherein said congestion flow determination function determines said flow with reference to said congestion information and a routing table for designating said transfer path,
wherein said determined flow is a flow having a congestion level which is not less than a predetermined level, and
wherein said congestion flow determination function produces an estimated result indicative of the determined flow;
a classification processing function for classifying flows on said network into restriction candidate flows where a transmission amount is restricted and non-restriction candidate flows where the transmission amount is not restricted;
a flow number measuring function for measuring the number of said restriction candidate flows and of said non-restriction candidate flows, said flow number measuring function producing a measured result;
a weighting determining function for determining a weighting of restriction in the transmission amount for said restriction candidate flows on the basis of said measured result, said weighting determining function producing a weighted result; and
an output adjusting function for restricting the transmission amount on the basis of said estimated result and said weighted result for each of said restriction candidate flows.

33. A congestion control program as claimed in claim 32, wherein further comprises:
a determining function for determining said determined flow as a restriction candidate flow for restricting a transmission amount; and
an output adjusting function for carrying out restriction of the transmission amount for data in said restriction candidate flow.

34. A congestion control program as claimed in claim 32, wherein further comprises;
a congestion detection function for detecting a congestion level in communications to produce detected congestion information indicative of said congestion level; and
a congestion notifying function for notifying other nodes on said network of said detected congestion information.

35. A congestion control program as claimed in claim 34, wherein said congestion detection function carries out a processing for detecting the congestion level of the communications on the basis of a used amount of a transit buffer for use in transferring the communication data between adjacent nodes on said network.

36. A congestion control program as claimed in claim 34, wherein further comprises:
a failure detection function for detecting a failure where communications cannot make on said network, said failure detection function producing section information indicative of a section on said network where said failure occurs; and
a failure notifying function for notifying other nodes on said network of said section information as a failure notification.

37. A congestion control program as claimed in claim 36, wherein further comprises:
a failure receiving function for receiving said failure notification from said other nodes on said network to produce a received failure notification; and
a failure processing function for changing said routing table on the basis of said received failure notification to avoid said section where the failure is detected on said network from the transfer path.

38. A congestion control program as claimed in claim 37, wherein further comprises a transfer canceling function for canceling transfer of said failure notification for a particular node transferred on said network when said failure occurs in the transfer path to said particular node.

39. A congestion control program as claimed in claim 32, wherein said network is a ring-shaped network.

40. A congestion control program as claimed in claim 32, wherein said network is a network where a plurality of ring-shaped networks are mutually connected one another.

41. A congestion control program as claimed in claim 40, wherein further comprises a function for repeating communications between said plurality of ring-shaped networks.

42. A congestion control program for controlling, by controlling a computer, congestion of communications in a congestion control node which is connected to a network and which replays the communications by a client, said congestion control program comprises:

a receiving function for receiving, from another node on said network, congestion information of the communication generated from said other node;

a congestion flow determination function for determining a flow, along a transfer path for communication data to a destination, which affects congestion, wherein said congestion flow determination function determines said flow with reference to said congestion information and a routing table for designating said transfer path, wherein said determined flow is a flow having a congestion level which is not less than a predetermined level, and wherein said congestion flow determination function produces an estimated result indicative of the determined a classification processing function for classifying flows on said network to relate to queues;

a flow number measuring function for measuring the number of said flows passing through said queues each queue, said flow number measuring function producing a measured result;

a weighting determining function for determining, on the basis of said measured result, a weighting in restriction of the transmission amount for said flows passing through said queues each queue, said weighting determining function producing a weighted result; and an output adjusting function for restricting the transmission amount each queue on the basis of said estimated result and said weighted result.

43. A congestion control program for controlling, by controlling a computer, congestion of communications in a congestion control node which is connected to a network and which replays the communications by a client, said congestion control program comprises:

a receiving function for receiving, from another node on said network, congestion information of the communication generated from said other node;

a congestion flow determination function for determining a flow, along a transfer path for communication data to a destination, which affects congestion, wherein said congestion flow determination function determines said flow with reference to said congestion information and a routing table for designating said transfer path, wherein said determined flow is a flow having a congestion level which is not less than a predetermined level, and wherein said congestion flow determination function produces an estimated result indicative of the determined flow;

a congestion detection function for detecting a congestion level in communications to produce detected congestion information indicative of said congestion level, wherein said congestion detection function carries out a processing for detecting the congestion level of the communications on the basis of a used amount of a transit buffer for use in transferring the communication data between adjacent nodes on said network;

a congestion notifying function for notifying other nodes on said network of said detected congestion information; and an output measuring function for measuring an amount of said transmission data produced by a transmission buffer for holding the communication data until a transmission possible time instant, said output measuring function producing a buffer output measured amount, said congestion notifying function comprising:

a command generating function for generating, on the basis of the used amount of said transit buffer, a data amount produced by said transit buffer, and said buffer output measured amount, a control command instructing restriction of the communications for other nodes on said network; and a function for transmitting said control command to said other nodes on said network with said control command included in said detected congestion information.

44. A congestion control program for controlling, by controlling a computer, congestion of communications in a congestion control node which is connected to a network and which replays the communications by a client, said congestion control program comprises:

a receiving function for receiving, from another node on said network, congestion information of the communication generated from said other node;

a congestion flow determination function for determining a flow, along a transfer path for communication data to a destination, which affects congestion, wherein said congestion flow determination function determines said flow with reference to said congestion information and a routing table for designating said transfer path, wherein said determined flow is a flow having a congestion level which is not less than a predetermined level, and wherein said congestion flow determination function produces an estimated result indicative of the determined flow;

wherein said network is a network where a plurality of ring-shaped networks are mutually connected one another;

a function for repeating communications between said plurality of ring-shaped networks;

a ring identifying function for identifying an input source ring where said flows are inputted, said ring identifying function producing an identified result, said congestion flow determination function carrying out a processing for determining the flow on the basis of said identified result, said congestion information, and said routing table.

45. A congestion control system for congestion controlling communications on a network, said congestion control system comprising a plurality of congestion control nodes on said network, each of said congestion control nodes carrying out congestion control of communication data for transmitting or repeating, each of said congestion control nodes comprising:

a routing table which designates a transfer path for destination;

a congestion detection circuit which detects a congestion level of communications in said congestion control node in question to produce detected congestion information;

a congestion notifying circuit, connected to said congestion detection circuit, which notifies other congestion control nodes of said detected congestion information;

a congestion receiving circuit which receives congestion information from said other congestion control nodes to produce received congestion information; and a congestion flow determination circuit, connected to said congestion receiving circuit and said routing table, which determines a flow, along the transfer path for destination, which affects congestion,
wherein said congestion flow determination circuit determines said flow with reference to said received congestion information and said routing table,
wherein said determined flow is a flow having a congestion level which is not less than a predetermined level, and
wherein said congestion flow determination circuit produces an estimated result indicative of the determined flow;
a classification processing circuit for classifying flows on said network into restriction candidate flows for restricting a transmission amount and non-restriction candidate flows for not restricting the transmission amount;
a flow number measuring circuit, connected to said classification processing circuit, for measuring the number of said restriction candidate flows and of said non-restriction candidate flows to produce a measured result;
a weighting determining circuit, connected to said flow number measuring circuit, for determining a weighting of restriction in the transmission amount for said restriction candidate flows on the basis of said measured result to produce a weighted result; and
a output adjusting circuit, connected to said congestion flow determination circuit and said weighting determining circuit, for restricting the transmission amount for each of said restriction candidate flows on the basis of said estimated result and said weighted result.

46. A congestion control node for carrying out congestion control for communications on a network, said congestion control node comprising:
a receiving circuit which receives, from another node on said network, congestion information of the communications generated from said other node;
a routing table which designates a transfer path for communication data to a destination;
a congestion flow determination circuit, connected to said receiving circuit and said routing table, which determines a flow, along the transfer path for communication data to a destination, which affects congestion,
wherein said congestion flow determination circuit determines said flow with reference to said received congestion information and said routing table,
wherein said determined flow is a flow having a congestion level which is not less than a predetermined level, and
wherein said congestion flow determination circuit produces an estimated result indicative of the determined flow;
classification processing circuit for classifying flows on said network into restriction candidate flows where a transmission amount is restricted and non-restriction candidate flows where the transmission amount is not restricted;
flow number measuring circuit, connected to said classification processing means, for measuring the number of said restriction candidate flows and of said non-restriction candidate flows, said flow number measuring means producing a measured result;
weighting determining circuit, connected to said flow number measuring means, for determining a weighting of restriction in the transmission amount for said restriction candidate flows on the basis of said measured result, said weighting determining means producing a weighted result; and
output adjusting circuit, connected do said weighting determining circuit and said congestion flow determination circuit, for restricting the transmission amount on the basis of said estimated result and said weighted result for each of said restriction candidate flows.

* * * * *